(12) United States Patent
Isshiki et al.

(10) Patent No.: US 10,797,867 B2
(45) Date of Patent: Oct. 6, 2020

(54) SYSTEM AND METHOD FOR ELECTRONIC BIDDING

(75) Inventors: Toshiyuki Isshiki, Tokyo (JP); Kazue Sako, Tokyo (JP)

(73) Assignee: NEC CORPORATION, Tokyo (JP)

( * ) Notice: Subject to any disclaimer, the term of this patent is extended or adjusted under 35 U.S.C. 154(b) by 2286 days.

(21) Appl. No.: 12/085,923

(22) PCT Filed: Nov. 29, 2006

(86) PCT No.: PCT/JP2006/323779
§ 371 (c)(1),
(2), (4) Date: May 30, 2008

(87) PCT Pub. No.: WO2007/063876
PCT Pub. Date: Jun. 7, 2007

(65) Prior Publication Data
US 2009/0083190 A1 Mar. 26, 2009

(30) Foreign Application Priority Data
Dec. 1, 2005 (JP) .................. 2005-348321

(51) Int. Cl.
*H04L 9/08* (2006.01)
*G06Q 30/08* (2012.01)
(Continued)

(52) U.S. Cl.
CPC ......... *H04L 9/085* (2013.01); *G06Q 20/3829* (2013.01); *G06Q 30/08* (2013.01);
(Continued)

(58) Field of Classification Search
CPC .... H04L 9/085; H04L 9/0847; G06Q 20/3829
See application file for complete search history.

(56) References Cited

U.S. PATENT DOCUMENTS 6,363,365 B1 * 3/2002 Kou .................. G06Q 20/0855
705/26.3
7,346,171 B2 * 3/2008 Numao .................. H04L 9/085
380/286
(Continued)

FOREIGN PATENT DOCUMENTS

EP 1 020 809 7/2000
JP 2000-200311 7/2000
(Continued)

OTHER PUBLICATIONS

PCT/IB/326.
(Continued)

*Primary Examiner* — Jay Huang
(74) *Attorney, Agent, or Firm* — McGinn I.P. Law Group, PLLC

(57) ABSTRACT

In an electronic bidding system and method, it is unnecessary to disclose to bidders a list of public keys matched to bid prices, and in which price secrecy may be proved. In a function of encryption of a bidding device 300, a public key is generated using a bid price and an IBE public key, based on an ID-Based Encryption (IBE) system having a bid value as an ID. IBE public key is obtained on combining a plurality of partial public keys matched to partial secret keys generated by a plural number of partial bid opening devices based on a combination condition enabling group decryption. A preset message for bidding is then encrypted. In a function of decryption of a bid opening device 400, a number of partial bid opening devices, which is in keeping with a satisfying number of the group decryption, perform calculations for decryption for winning bid value candidates, beginning from such candidate, the allowable bid value closest to the bid closing condition. Decrypted data obtained on combining the resulting output partial bid opening data are collated to the message for bidding to decide on winning bid value.

8 Claims, 29 Drawing Sheets

(51) Int. Cl.
*H04L 9/30* (2006.01)
*G06Q 20/38* (2012.01)

(52) U.S. Cl.
CPC .......... *H04L 9/0847* (2013.01); *H04L 9/3073* (2013.01); *H04L 2209/466* (2013.01)

(56) References Cited

U.S. PATENT DOCUMENTS

| | | | |
|---|---|---|---|
| 2002/0112171 A1* | 8/2002 | Ginter | G06Q 20/085 713/185 |
| 2003/0074330 A1 | 4/2003 | Asokan et al. | |
| 2003/0081785 A1 | 5/2003 | Boneh et al. | |
| 2004/0139029 A1 | 7/2004 | Zhang et al. | |
| 2005/0262009 A1 | 11/2005 | Han et al. | |
| 2005/0262355 A1* | 11/2005 | Banet | H04L 63/08 713/180 |
| 2006/0153369 A1* | 7/2006 | Beeson | H04L 9/3066 380/30 |

FOREIGN PATENT DOCUMENTS

| | | |
|---|---|---|
| JP | 2004-208263 | 7/2004 |
| JP | 2005-500740 | 1/2005 |
| WO | WO 03/017559 A2 | 2/2003 |

OTHER PUBLICATIONS

PCT/IB/373.
PCT/IB/338.
PCT/ISA/237.
Sako, Kazue, "An Auction Protocol which Hides Bids of Losers", C&C Research Laboratories, Lecture Notes in Computer Science, 2000, No. 1751, pp. 422-431.
Boneh, Dan, et al., "Identity-Based Encryption from the Weil Pairing", Appears of Siam J. of Computing, vol. 32, No. 3, pp. 1-31.
Boneh, Dan, et al., "Secure Identity Based Encryption without Random Oracles", Springer-Verlag, Crypto 2004, Lecture Notes in Computer Science, 2004, No. 3152, pp. 1-24.
Schnorr, C.P., "Efficient Signature Generation by Smart Card", Facbereich Mathematik/Informatik, Journel of Cryptology, Mar. 1991, vol. 4, pp. 1-22.
Identity-based Chameleon Hash and Applications. [Online]. Cryptology ePrint Archive 2003/167, 2003. [retrived on Mar. 2, 2007]. Retrieved from the Internet: <URL: http:// eprint.iacr.org/2003/167.pdf> especially 5.2 The auction scheme.
European Extended Search Report dated Jun. 25, 2012.
Adi Shamir, *"How to Share a Secret"*, Communications of the ACM, vol. 22(11), pp. 612-613, Association for Computing Machinery, 1979.

* cited by examiner

SYSTEM AND METHOD FOR ELECTRONIC BIDDING

TECHNICAL FIELD

This invention relates to a system and a method for electronic bidding in which a winning (successful) bid value may be determined without explicitly indicating bid values other than the winning bid value. More particularly, this invention relates to a system and a method for electronic bidding in which a list of public keys matched to the bid prices is not disclosed at the time of bidding and in which proving of price secrecy is possible.

BACKGROUND ART

Representative of the conventional electronic bidding methods is the method disclosed in Non-Patent Document 1. With the electronic bidding method, shown in this Non-Patent Document 1, a bidder encrypts a preset message for bidding, using a public key corresponding to his/her bid price. A bid opening entity finds a secrete key that can be decrypted to the message for bidding to give a decision that the price matched to the secret key is the bid price of the bidder. The bid opening entity attempts decrypting sequentially from a value closest to the bid-closing condition, for example, the highest price, whereby the bid-closing value, that is, the winning bid value, may be determined without confirming the bid prices of all of bidders. The Non-Patent Document 1 has proposed an electronic bidding method employing an encryption system called ElGamal system and an electronic bidding method employing an encryption system called RSA system.

In the electronic bidding method, employing the ElGamal system, disclosed in Non-Patent Document 1, the bid opening entity determines a secret key, from one bid price to another, and calculates, from the so determined secret key, a public key matched to each bid price. The bid opening entity discloses a bid price-public key list that lists up bid prices and public keys matched to the bid prices. The secret keys, determined by the center, are kept secret by the bid opening entity. Each bidder decides on a bid price and, using the public key included in the bid price-public key list, and which is matched to the bid price as determined by the bidder, encrypts a preset message for bidding, for example, a message reading: 'I want to buy certain and certain goods', and sends the so encrypted message to the bid opening entity.

The bid opening entity decrypts the cryptotexts, received from all bidders, sequentially using secret keys, beginning from those corresponding to the highest bid price for which the bid may be concluded, for instance. If the cryptotext has been decrypted with the secret key matched to a value corresponding to the bid price by a given bidder, the cryptotext can correctly be decrypted to the message for bidding. Thus, the bid price of the bidder may be found from the secret key used for decryption. The bid opening entity may determine the sender of the cryptotext, which could be decrypted for the first time, as being the winner (winning bidder), and also determine the value, matched to the secret key, used for the decryption, as being the winning bid price.

In the electronic bidding method, employing the RSA system, disclosed in Non-Patent Document 1, a bidder may generate a public key, on his or her own, the public key he or she desires. The method exploits the property of the RSA system that "a person aware of a certain 'secret' is able to generate a secret key from an arbitrary public key". Thus, with the electronic bidding method, employing the RSA system, disclosed in Non-Patent Document 1, a bidder is able to generate a public key corresponding to the bid price, such that there is no necessity of generating and disclosing the public key corresponding to the bid price.

The bid opening entity may generate from the secret key a 'secret' necessary to calculate a secret key, and keep the so generated 'secret'. At the time of bid opening, the bid opening entity may use the 'secret' thus kept to generate the secret key corresponding to the bid price to decrypt the cryptotext. It should be noted that Patent Document 1 discloses an electronic bidding system that exploits the electronic bidding method according to Non-Patent Document 1.

Patent Document 1:
  JP Patent Kokai Publication No. JP-P2000-200311A (paragraphs 0015 to 0017)
Non-Patent Document 1:
  K. Sako, "An auction Protocol Which hides Bids of Losers", PK C2000, Lecture Notes in Computer Science, 2000, No. 1751, pp. 422-432
Non-Patent Document 2:
  D. Boneh and M. Franklin, "Identity-Based Encryption from the Weil Pairing", SLAM J. of Computing, 2003, Vol. 32, No. 3, pp. 586-615
Non-Patent Document 3:
  D. Boneh and X. Boyen, "Secure Identity Based Encryption Without Random Oracles", CRYPTO2004, Lecture Notes in Computer Science, 2004, No. 3152, pp. 443-459
Non-Patent Document 4:
  C. P. Schnorr, "Efficient Signature Generation by Smart Cards", Journal of Cryptology, 1991, Vol. 4, pp. 161-174

DISCLOSURE OF THE INVENTION

Problems to be Solved by the Invention

With the method exploiting the ElGamal system in the electronic bidding method, disclosed in Non-Patent Document 1, the bid price-public key list needs to be disclosed for the bidders. This is not efficient because the bid price-public key list is generally bulky in size.

With the electronic bidding method, employing the RSA system, it is unnecessary to disclose the list of the prices and public keys. However, even supposing that the RSA system satisfies a sort of safety, it cannot be mathematically proved that the electronic bidding method employing the RSA system is free from fragility. That is, it cannot be mathematically proved that the method satisfies price secrecy, which is the property required of electronic bidding that no leakage of the information on the bid prices may occur from bid data.

It is therefore an object of the present invention to provide a system and a method for electronic bidding in which there is no necessity of disclosing a list of public keys corresponding to bid prices to bidders, and in which price secrecy may be proved.

Means to Solve the Problems

In a first aspect of the present invention, there is provided an electronic bidding system comprising a bidding device for each bidder to tender a bid, and a bid opening device to be connected to the bidding device over a communication network. The bidding device includes IBE encrypting means, such as IBE encrypting means 302, for undertaking encryption using an ID-Based Encryption (IBE) system in which a bid value as entered by the bidder is used as an ID, and transmitting means, such as transmitting/receiving section 301, for transmitting encrypted data, output as a result of encryption by the IBE encrypting means, to the bid opening device. The bid opening device includes IBE decrypting means, such as bid opening data generating means 404 and IBE decrypting means 405, for decrypting the encrypted data transmitted from the bidding device, using the IBE system in which an allowable price for bidding (termed herein "allowable bidding price") is used as the ID, and decision means, such as decision means 406, for giving a decision on a winning bid value and on a winner based on decrypted data output as a result of decryption by the IBE decrypting means.

Preferably, the IBE encrypting means executes calculations on public parameters that include at least the information indicating allowable bidding, a preset message for bidding and encryption parameters indicating the information used for encryption and decryption in the IBE system, and a bid value entered by a bidder, based on a cryptographic theory of the IBE system having the bid value as an ID, in such a manner as to generate an encryption key matched to the bid value. The IBE encrypting means encrypts the preset message for bidding, using the encryption key thus generated. The public parameters represent the information disclosed in advance of bidding by a bid opening entity. The IBE decrypting means executes calculations on the secret information for decryption indicating a secret necessary for decryption, the public parameters, encrypted data of each bidder, and on a candidate value selected out of allowable bidding in accordance with a preset condition, based on the cryptographic theory of the IBE system having the candidate value as ID, in such a manner as to decrypt the encrypted data. The decision means gives a decision that the candidate value used for decryption is a bid value kept in secrecy when decrypted data obtained by the IBE decrypting means coincides with the message for bidding.

In a second aspect of the present invention, there is provided an electronic bidding system comprising a bidding device for each bidder to tender a bid, one or more partial bid opening devices having stored secret information for decryption, indicating a secret necessary for decryption, and a bid opening device to be connected to the bidding device(s) and the partial bid opening device or devices over a network. The partial bid opening device includes partial public key generating means, such as partial public key generating means 104, for generating, with public parameters as inputs, a partial public key needed for generating an IBE public key used for encryption in an ID-Based Encryption (IBE) system. The partial public key represents information corresponding to the secret information for decryption. The partial bid opening device also includes partial bid opening data generating means, such as partial bid opening data generating means 105, for performing calculations for decryption on the secret information for decryption, with the public parameters and encrypted data as inputs, to generate partial bid opening data indicating the results of calculations for decryption. The bidding device includes encrypted data generating means, such as IBE encrypting means 302, for generating encrypted data, with the public parameters, the IBE public key generated using the partial public key generated by the partial public key generating means, and a bid value entered by each bidder, as inputs, based on the cryptographic theory of the IBE system having the bid value as an ID. The encrypted data represents a preset encrypted message for bidding. The bid opening device includes decrypted data generating means, such as IBE decrypting means 405, for generating decrypted data, indicating the result of decryption of the encrypted data, with the public parameters, an IBE public key generated using the partial public key generated by the partial public key generating means, the encrypted data and partial bid opening data generated by the partial bid opening data generating means, as inputs. The bid opening device also includes winning bid decision means, such as decision means 406, for deciding on a winning bid value and on a winner, based on the decrypted data generated by the decrypted data generating means.

Preferably, the bid opening device includes a bid opening device side IBE public key generating means, such as IBE public key generating means 202, for generating an IBE public key by collecting partial public keys from the partial bid opening devices and by combining the collected partial public keys in accordance with a preset condition for combination.

Preferably, the partial bid opening device includes a partial bid opening device side IBE public key generating means, such as partial public key generating means 114, operating so that, if the partial bid opening device is installed as a first base point, the partial bid opening device sends a partial public key, generated by partial key generating means of the partial bid opening device, as an IBE public key, to another partial bid opening device as a second or further following base point. The partial bid opening device side IBE public key generating means also operates so that, if the partial bid opening device is installed as a second or a further following base point, the partial bid opening device combines the IBE public key, received from a previous base point, and a partial public key, generated by partial public key generating means of the partial bid opening device, under a preset condition for combination, in such a manner as to update an IBE public key, to combine sequentially a number of partial public keys corresponding to a satisfying number needed for group decryption, thereby generating an IBE public key.

Preferably, the bid opening device includes bid opening device side bid opening data generating means, such as bid opening data generating means 404, for collecting a number of the partial bid opening data corresponding to a satisfying number needed for group decryption and for combining the collected partial bid opening data in accordance with a preset condition for combination, such as to generate bid opening data indicating the result of faultless calculations for decryption of the distributed secret information for decryption.

Preferably, the partial bid opening device includes partial bid opening device side bid opening data generating means, such as partial bid opening data generating means 115. The partial bid opening device side bid opening data generating means operates so that, if the partial bid opening device is installed as a first base point, the partial bid opening device side bid opening data generating means sends a partial bid opening data, generated by partial bid opening data generating means of the partial bid opening device, as bid opening data, to another partial bid opening device as a second or further following base point. The partial bid opening device side bid opening data generating means also operates so that, if the partial bid opening device is installed as a second or further following base point, the partial bid opening device side bid opening data generating means combines the partial bid opening data, received from a previous base point, and partial bid opening data, generated by partial bid opening data generating means of the partial bid opening device, under a preset condition for combination, such as to update (refresh) partial bid opening data and to combine sequentially a number of partial bid opening data corresponding to a satisfying number needed for group decryption, thereby generating a bid opening data.

In a third aspect of the present invention, the electronic bidding system further comprises bid value proof verification means to be connected to the bidding device and the bid opening device over a communication network. The bidding device includes bid value knowledge proof generating means, such as bid value knowledge proving means 323, for generating bid value knowledge proof data, as data for proving knowledge concerning a bid value, using pre-assigned information proper to each bidder and arbitrary encryption information selectable at random by the bidding device from among encryption parameters used for encryption; and bid value knowledge proof data appending means, such as bid value knowledge proving means 323, for appending the bid value knowledge proof data, generated by the bid value knowledge proof generating means, to an encrypted data generated by encrypted data generating means. The bid value knowledge proof verification means includes: verification means, such as verification means 523, for verifying the bid value knowledge proof data based on the information proper to the bidder, with public parameters and encrypted data with bid value knowledge proof data, appended by the bid value knowledge proof data appending means, as inputs; and verification result accommodating means, such as verification means 523, for transmitting encrypted data to which a correct bid value knowledge proof data has been found to have been appended on verification by the verification means, to the bid opening device. The verification result accommodating means rejects, if otherwise, the encrypted data, and outputs that effect of refection.

In a fourth aspect of the present invention, there is provided an electronic bidding method used in an electronic bidding system including a bidding device for each bidder to tender a bid, and a bid opening device connected to the bidding device over a communication network. The electronic bidding method includes a step of the bidding device undertaking the encryption using an ID-Based Encryption (IBE) system in which a bid value as entered by the bidder is used as an ID, and a step of the bidding device transmitting encrypted data, output as a result of encryption, to the bid opening device. The bid opening device decrypts the encrypted data transmitted from the bidding device, using an IBE system in which a bidding price coped with by bidding is used as an ID. The electronic bidding method also includes a step of the bid opening device giving a decision on a winning bid value and a winner based on decrypted data output as a result of decryption.

In a fifth aspect of the present invention, there is provided an electronic bidding method used in a bidding system including a bidding device for each bidder to enter a bid, one or more partial bid opening devices having stored the secret information for decryption indicating a secret necessary for decryption, and a bid opening device connected to the bidding device and the partial bid opening device or devices over a communication network. The method includes a step of the partial bid opening device or devices generating, with the public parameters as input, a partial public key needed for generating an IBE public key used for encryption in an ID-Based Encryption (IBE) system. The partial public key represents the information corresponding to the secret information for decryption. The method also includes a step of the partial bid opening device or devices performing calculations for decryption on the secret information for decryption, with the public parameters and encrypted data as inputs, and the bidding device generating encrypted data, with the public parameters, an IBE public key generated using a partial public key or keys generated by the partial bid opening device or devices, and a bid value as entered by each bidder, as inputs. The encrypted data is a preset message for bidding, encrypted in accordance with a cryptographic theory of the IBE system having the bid value as ID. The method also include a step of the bid opening device generating decrypted data, with the public parameters, the IBE public key generated using a partial public key or keys generated by the partial bid opening device or devices, encrypted data and partial bid opening data generated by the partial bid opening device or devices, as inputs. The decrypted data indicates the result of decryption of the encrypted data. The method further include a step of the bid opening device deciding on a winning bid value and a winner based on the decrypted data.

In a sixth aspect of the present invention, preferably the electronic bidding method further includes a step of the bidding device generating bid value knowledge proof data, as data for proving the knowledge concerning a bid value, using a pre-assigned information proper to each bidder and an arbitrary encryption information selectable at random by the bidding device from among encryption parameters used for encryption. The electronic bidding method further includes a step of the bidding device appending the bid value knowledge proof data generated to the encrypted data to send the resulting data to a bid value knowledge proof verification device connected to the bidding device over a communication network. The electronic bidding method further includes a step of the bid value knowledge proof verification means verifying the bid value knowledge proof data based on the information proper to the bidder, with public parameters and the encrypted data with bid value knowledge proof data, as inputs. The electronic bidding method further includes a step of the bid value knowledge proof verification means transmitting encrypted data, to which the correct bid value knowledge proof data has been found to have been appended on verification, to the bid opening device. The bid value knowledge proof verification means rejects, if otherwise, the encrypted data, and outputs that effect of rejection.

In a seventh aspect of the present invention, there are provided the bidding device, bid opening device, partial bid opening device or the bid value knowledge proof verification device that make up each of the above-described electronic bidding system.

In an eighth aspect of the present invention, there are provided a computer program for executing each of the above-described electronic bidding methods, and a recording medium having stored the computer program.

Effect of the Invention

According to the present invention, in which encryption is by an ID-Based Encryption (IBE) system, having the bid value as ID, it is unnecessary for the bid opening entity to disclose a list of public keys matched to the bid prices, while it is possible to prove the price secrecy.

In addition, since the secret information for decryption may be stored distributed in multiple partial bid opening devices, the act of illicitly finding bid values other than the winning bid value may be prohibited more effectively.

Moreover, since knowledge proof data concerning the bid value is appended to encrypted data and verified, it is possible to prevent illicit use of encrypted data of other bidders.

Figure 1:
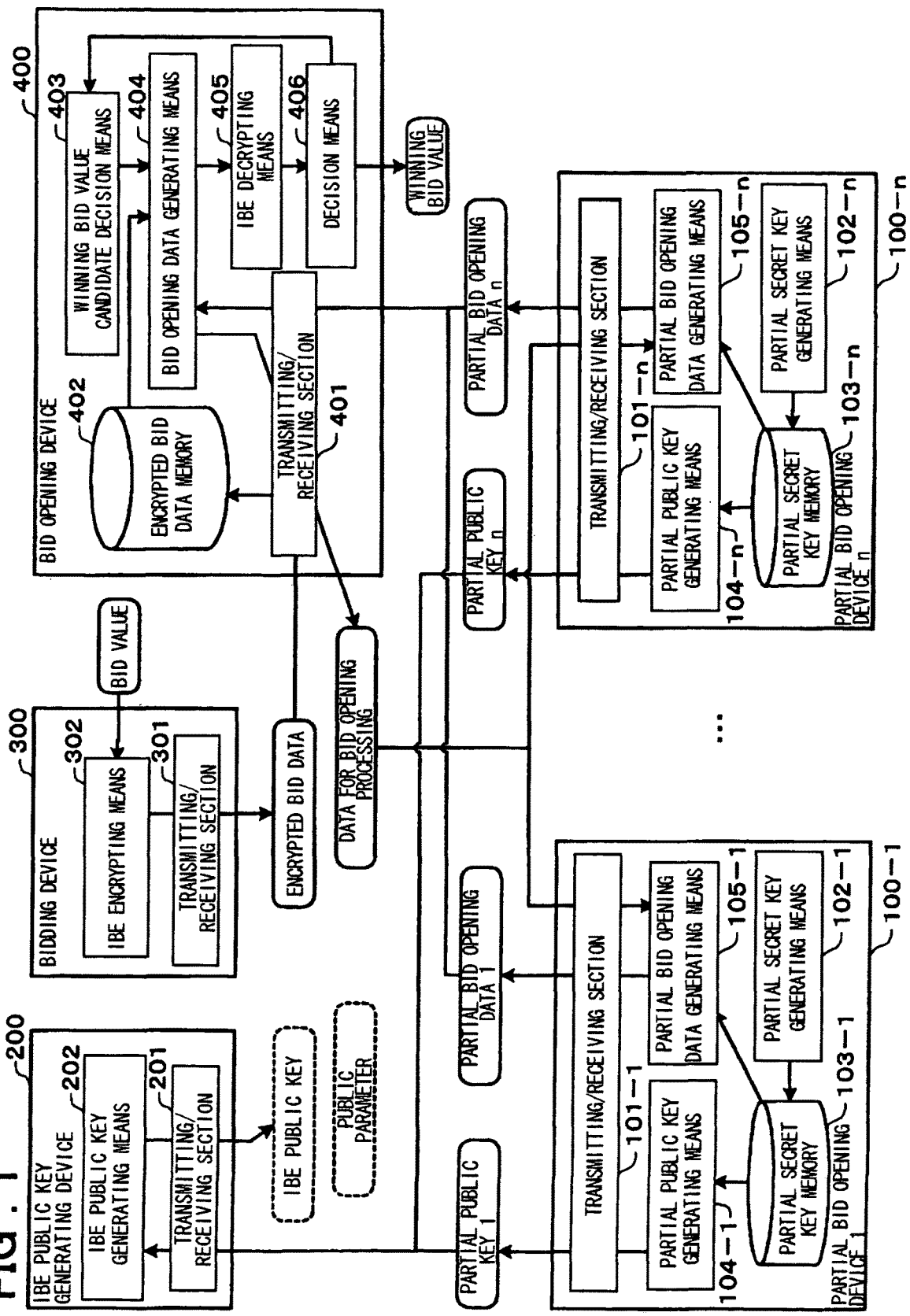
FIG. 1 is a block diagram showing an illustrative configuration of an electronic bidding system according to the present invention.

EXPLANATIONS OF SYMBOLS 100 partial bid opening device
101 transmitting/receiving section
102 partial secret key generating means
103 partial secret key memory
104 partial public key generating means
105 partial bid opening data generating means
200 IBE public key generating device
201 transmitting/receiving section
202 IBE public key generating means
300 bidding device
301 transmitting/receiving section
302 IBE encrypting means
400 bid opening device
401 transmitting/receiving section
402 encrypted bid data memory
403 winning bid value candidate decision means
404 bid opening data generating means
405 IBE decrypting means
406 decision means
323 bid value knowledge proving means
520 bid value knowledge proof verification device
521 transmitting/receiving section
522 memory for storing the encrypted bid data with bid value knowledge proof
523 verification means

PREFERRED MODES FOR CARRYING OUT THE INVENTION

First Exemplary Embodiment

Initially, the schematics of the present invention are described. The present invention is characterized by the use of an ID-Based Encryption (IBE) system for encryption for keeping secrecy of bid prices in electronic bidding. The ID-based encryption is an encryption system M which a sender generates an encryption key (hereinafter a public key) using an ID proper, such as his/her e-mail address or a membership number, to a receiver, and in which a message may be encrypted using this public key. According to the present invention, the electronic bidding, which is more safe and efficient, may be realized by using a bid value (a value indicating a bid price) as an ID.

In short, with the IBE system, having a bid value as ID, each bidder may generate a public key, using his/her own bid value. It is thus unnecessary for the bid opening entity to disclose the list of public keys matched to the bid prices, thus allowing efficient electronic bidding.

Further, as the IBE system, the IBE system described in D. Boneh and M. Franklin, "Identity-Based Encryption from the Weil Pairing", SLAM J. of Computing, 2003, Vol. 32, No. 3, pp. 586-615 (Non-Patent Document 2), referred to below as Boneh-Franklin IBE system, for example, may be used in the present invention. The Boneh-Franklin IBE system is an IBE system that uses pairing. It is an IBE system capable of proving safety by presupposing the presence of an ideal hash function, termed random oracle, and by further putting a mathematical hypothesis.

With the Boneh-Franklin IBE system, safety proof that there occurs no leakage of the information on the public key used for encryption from the cryptotext is mathematically possible. It is thus possible to prove price secrecy that no leakage of the information concerning the bid value occurs by entering a cryptotext obtained using a public key generated in accordance with the Boneh-Franklin IBE system having the bid value as ID.

Moreover, according to the present invention, it is possible to use not only the Boneh-Franklin IBE system, disclosed in Non-Patent Document 2, but also the ID-based IBE system described in D. Boneh and X. Boyen, "Secure Identity Based Encryption Without Random Oracles", CRYPTO2004, Lecture Notes in Computer Science, 2004, No. 3152, pp. 443-459 (Non-Patent Document 3), referred to below as Boneh-Boyen IBE system. This Boneh-Boyen IBE system is an IBE system that similarly uses pairing, and the mathematical hypothesis, on which is based the safety, is stronger with the Boneh-Boyen IBE system than with the Boneh-Franklin IBE system. However, it is an IBE system with which safety may be proved without presupposing the presence of a random oracle which is an ideal hash function. It should be noticed that the above two IBE systems are merely illustrative and any other suitable IBE system may be used if safety proof that no leakage of the information concerning the public key used for encryption occurs from the cryptotext is mathematically possible.

According to the present invention, there is also provided an electronic bidding system in which the secret information for decryption, indicating a "secret" necessary for decryption, may be managed distributed in multiple devices. For implementing such electronic bidding, it is essential that the IBE system used satisfies not only the above-mentioned property of the IBE system but also the property that group decryption (distributed decryption) is possible. By the 'group decryption being possible' is meant the property of the cryptographic theory that the secret information for decryption may be generated distributed in multiple devices, and that, if a preset satisfying number, for example, 7 out of 10, of the groups of the distributed secret information is used, decryption is possible. Meanwhile, both of the above two IBE systems allow for group decryption.

According to the present invention, a bid opening entity discloses an IBE public key as a parameter used for encryption. This IBE public key has been combined from multiple partial public keys, matched to partial secret keys, generated by multiple partial bid opening devices, based on preset conditions for combination. The bidders encrypt preset messages for bidding using the IBE public key and the bid prices to realize group decryption. The partial secret keys mean distributed secret keys generated based on the secret information for decryption as set by respective devices with arbitrariness. The secret key may also be no other than the secret information for decryption. By arbitrariness is meant the property that at least one of parameters used by each partial bid opening device in generating the partial secret key may be extracted at random. The partial public key is the information matched to the partial secret key and which is to be an element of the IBE public key. The IBE public key is the information necessary for decryption using the partial secret key generated by the partial bid opening device and is a parameter on the encryption system disclosed by the bid opening entity before bidding. The condition for combination for generating the IBE public key, referred to below as the condition for combination of the IBE public key, is the condition for calculations in the mathematical theory that enables distributed calculations for decryption of the encrypted message for bidding using a number of partial secret keys in meeting with the satisfying number of distributed decryption. It should be noticed that the concrete conditions for preparing the IBE public key by combination depends on the cryptographic theory of the IBE system.

In bid opening, the bid opening entity causes a number of partial bid opening devices, which is in meeting with the satisfying number of distributed decryption, to carry out calculations for decryption of the partial secret keys, and to combine the resulting output data to yield correct results of decryption. The output data are referred to below as partial bid opening data. By this distributed management of the secret keys for decryption, the act of illicitly finding bid values other than the winning bid value may be prohibited effectively. In short, a cryptoanalyst, trying to illicitly confirm bid values other than the winning bid value, has to acquire all of the partial bid opening data for the values that can be assumed by the bid value, and combine the data, otherwise the cryptoanalyst is unable to confirm the bid values of the other bidders faultlessly. Thus, in view of difficulties encountered in illicitly acquiring the needed partial bid opening data and in correctly combining them together, it is possible to prohibit the act of illicitly acquiring bid values other than the winning bid value, in contradistinction from the case of managing the secret information for decryption by a single device.

Preferred exemplary embodiments of the present invention will now be described with reference to the drawings. FIG. 1 is a block diagram showing an illustrative configuration of an electronic bidding system according to the present invention. The electronic bidding system, shown in FIG. 1, includes one or more partial bid opening devices 100-1 to 100-$n$, where n is a number corresponding to the number of the partial bid opening devices, an IBE public key generating device 200, a bidding device 300, and a bid opening device 400. These devices are interconnected via a communication network, for example, the Internet or specialized networks. Although only one bidding device 300 is shown in FIG. 1, there may also be multiple bidding devices, depending on the number of bidders. It should be noted that, even if there are multiple bidders for the sole bidding device 300, these bidders may individually tender bids via the sole bidding device, provided that the bidders enter user IDs, for example, at the log-in time. In FIG. 1, data shown surrounded by broken lines indicate data disclosed for the respective devices.

The partial bid opening device 100-1 is an information processing device, for example, a personal computer, for supervising mainly a partial secret key and for carrying out calculations for decryption of the partial secret key. It includes a transmitting/receiving section 101-1, a partial secret key generating means 102-1, a partial secret key memory 103-1, a partial public key generating means 104-1 and a partial bid opening data generating means 105-1. The transmitting/receiving section 101-1 performs protocol control for communication with other devices over a communication network to transmit/receive data. The partial secret key generating means 102-1 generates a partial secret key based on public parameters.

The public parameters means the information necessary for bidding and which is disclosed by the bid opening entity in advance of bidding. The public parameters include the information concerning the bidding and the information concerning the encryption system. The information concerning the bidding at least includes bid prices that may be coped with by bidding and a message for bidding. It may also include the bidding time as necessary. The bid prices that may be coped with by bidding may be a list of bid prices that may be assumed by bid values, or may be designation of the minimum and maximum values of the bid prices with rising steps, depending on particular bid values. The information concerning the encryption system includes parameters necessary for calculations for encryption and decryption, such as security parameters, and may differ from one IBE system to another.

The partial secret key memory 103-1 has stored a partial secret key #1 as generated by the partial secret key generating means 102-1. The partial public key generating means 104-1 generates a partial public key #1, matched to the partial secret key #1, based on the partial secret key #1 generated by the partial secret key generating means 102-1, and on the public parameters, and transmits the so generated partial public key to the IBE public key generating device 200. The partial bid opening data generating means 105-1 opens the encrypted messages for bidding of respective bidders, referred to below as encrypted bid data, using the partial secret key #1, stored in the partial secret key memory 103-1, in order to generate partial bid opening data #1. The processing for bid opening means calculations for decryption carried out for obtaining a bid value from the encrypted bid data. The partial bid opening data means output data obtained on executing the processing for bid opening, using the partial secret key, as already described.

Although the partial bid opening device 100-1 has been described here, the same applies for other partial bid opening devices. If matters common to all of the partial bid opening devices are described in the following, "-1" and so forth may sometimes be omitted, such as, for example, "partial bid opening device or devices 100". Meanwhile, in the configuration shown in FIG. 1, the partial secret key generating means 102, partial public key generating means 104 and the partial bid opening data generating means 105 may be implemented by a CPU of the partial bid opening device 100 operated under a preset program. The transmitting/receiving section 101 may be implemented by a CPU of the partial bid opening device 100 operated under a preset program, and by a hardware communication device. The partial secret key memory 103 may be implemented by a memory of the partial bid opening device 100.

The IBE public key generating device 200 is an information processing device, such as a personal computer, generating an IBE public key from partial public keys, managed by the partial bid opening devices 100 in a distributed fashion, and disclosing the so generated IBE public key. The IBE public key generating device 200 includes a transmitting/receiving section 201 and an IBE public key generating means 202. The transmitting/receiving section 201 performs protocol control in communicating with other devices, over a communication network, to transmit/receive data. The IBE public key generating means 202 generates an IBE public key, based on the public parameters and the partial public keys #1 to # n, respectively generated by the partial bid opening devices 100-1 to 100-n. The IBE public key is among the parameters concerning the encryption system, and is obtained on combining the partial public keys #1 to # n, as already explained, under the conditions for combination of the IBE public key that allow for group decryption.

Meanwhile, in the configuration shown in FIG. 1, the IBE public key generating means 202 may be implemented by a CPU of the IBE public key generating device 200 operated under a preset program. The transmitting/receiving section 201 may be implemented by a CPU of the IBE public key generating device 200, which is operated under a preset program, and by a hardware communication device.

The bidding device 300 is an information processing apparatus, used by a bidder tendering a bid, and includes a transmitting/receiving section 301 and an IBE encrypting means 302. The transmitting/receiving section 301 performs protocol control in communicating with other devices over a communication network, and transmits/receives data. The IBE encrypting means 302 generates encrypted bid data, based on the public parameters, the IBE public key generated by the IBE public key generating device 200, and on the bid value as entered by a bidder. In the configuration shown in FIG. 1, the IBE encrypting means 302 may be implemented by a CPU of the bidding device 300 operated under a preset program. The transmitting/receiving section 301 may be implemented by a CPU of the bidding device 300 operated under a preset program, and by the hardware communication device. The program for implementing the function of the bidding device 300 may not only be the program stored in a memory, provided in the bidding device 300, but may also be a client-side application program that may be downloaded and executed on accessing a Web server providing a bid site for tendering a bid.

The bid opening device 400 is an information processing device, such as a personal computer, for opening the encrypted bid data sent from the bidding device 300 to decide on the bid price and identify the bidder. The bid opening device includes a transmitting/receiving section 401, an encrypted bid data memory 402, a winning bid value candidate decision means 403, a bid opening data generating means 404, an IBE decrypting means 405 and a decision means 406. The transmitting/receiving section 401 performs protocol control in communicating with other devices over a communication network to transmit/receive data. The encrypted bid data memory 402 stores the encrypted bid data sent from the bidding device 300.

When opening the encrypted bid data, the winning bid value candidate decision means 403 decides on a bid value which is to be a candidate of a winning bid value, referred to below as a winning bid value candidate. The bid opening data generating means 404 sends data needed for calculations for decrypting the partial secret key to each of the partial bid opening devices 100. The bid opening data generating means combines partial bid opening data, sent from the partial bid opening devices 100, based on the combining conditions as determined in response to the combining conditions for the IBE public key, such as to generate the bid opening data. The IBE decrypting means 405 decrypts the encrypted bid data, based on the bid opening data generated by the bid opening data generating means 404, such as to collect the results together to form a list of decrypted data. The decision means 406 decides on whether or not the winning bid value candidate may prove a bid value, based on the list of decrypted data output from the IBE decrypting means 405.

In the configuration shown in FIG. 1, the encrypted bid data memory 402 is implemented by a memory of the bid opening device 400. The winning bid value candidate decision means 403, bid opening data generating means 404, IBE decrypting means 405 and the decision means 406 are implemented by a CPU of the bid opening device 400. The transmitting/receiving section 401 is implemented by a CPU of the bid opening device 400 and a hardware communication device.

The operation of the electronic bidding system of the present exemplary embodiment will now be described. The operation of the electronic bidding system of the present exemplary embodiment is roughly classed into an IBE public key generating operation of generating an IBE public key before bidding, a bidding operation of sending bid data, encrypted based on the bid value as entered by the bidder, to the bid opening entity, and a bid opening operation of decrypting received encrypted bid data to decide on the bid value. It is assumed that the public parameters are entered in advance of bidding to the devices provided in the present system. The public parameters may be pre-stored in the memories provided in the respective devices. Or, if these public parameters are distributed stored in recording mediums, such as CD-ROMs, to respective bidders, by a business entity undertaking the bidding, the parameters may be read-in from the recording mediums. The public parameters may also be received by accessing a device supervising the public parameters at a preset timing, such as at startup or when commencing the respective operations, or in response to a command from an owner. The supervising device may be an IBE public key generating device or a bid opening device.

Figure 2:
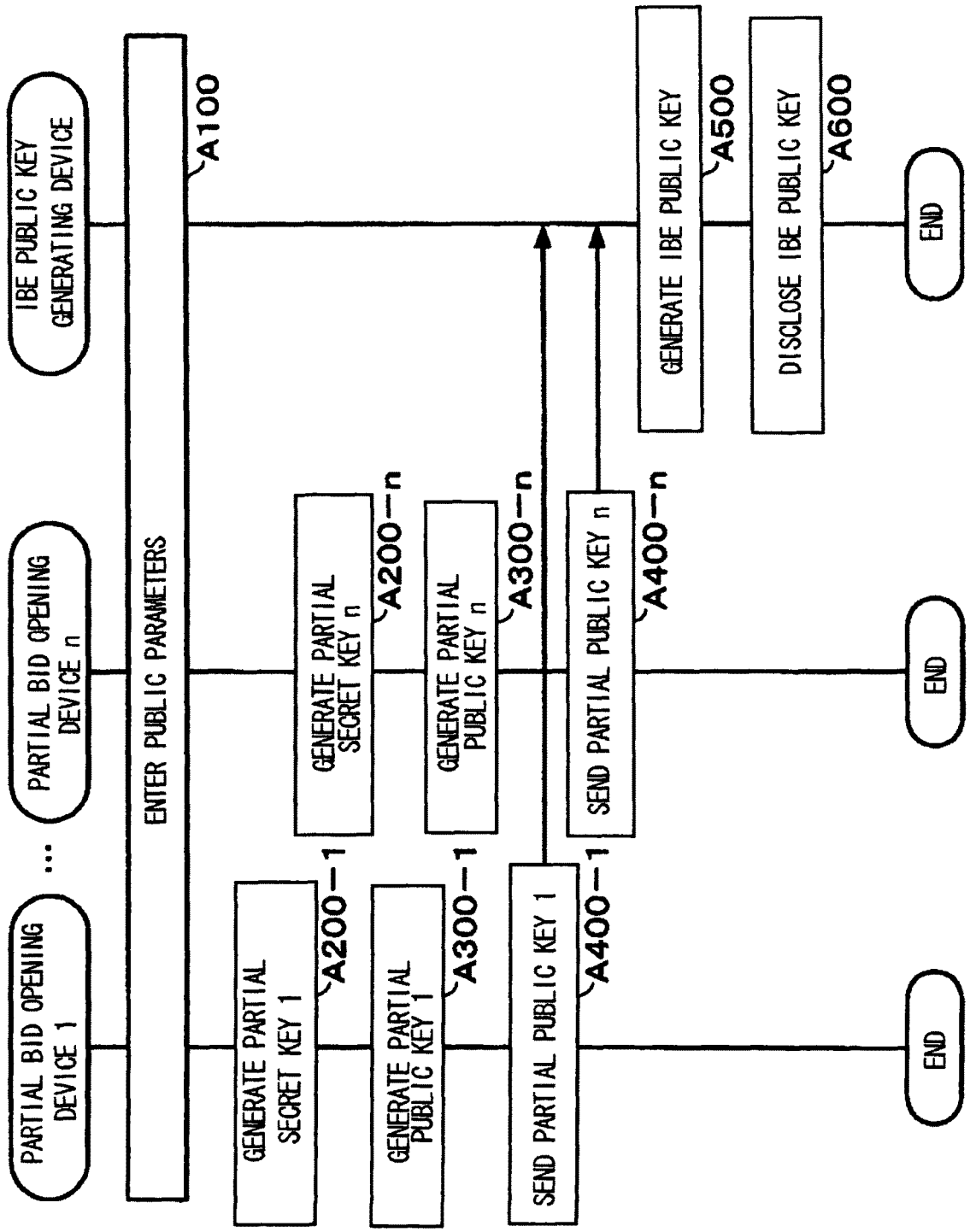
FIG. 2 is a flowchart showing an example of an IE public key generating operation of an exemplary embodiment of the present invention.

Initially, the operation of generating an IBE public key is now described with reference to FIG. 2, which is a flowchart showing an example of generating the IBE public key in accordance with the present exemplary embodiment. Here, a case in which there exist a plural number of partial bid opening devices 100 in order to perform distributed management of the secret information for decryption is taken as an example. The public parameters are entered to the partial bid opening devices 100-1 to 100-$n$ and to the IBE public key generating device 200 (step A100). Initially, the partial bid opening devices 100-1 to 100-$n$ are run in operation. In the following, the partial bid opening device 100-1 is taken as an example for explanation.

On receipt of the public parameters, the partial secret key generating means 102-1 first generates a partial secret key #1 (step A200-1). The partial secret key generating means 102-1 generates the partial secret key #1, by extraction or calculations, based on the cryptographic theory of the IBE system, using the public parameters. The concrete generating method differs from one IBE system to another. The partial secret key generating means 102-1 causes the generated partial secret key #1 to be stored in the partial secret key memory 103-1.

On receipt of the public parameters and the partial secret key #1, generated by the partial secret key generating means 102-1, the partial public key generating means 104-1 generates the partial public key #1 (step A300-1). The partial public key generating means 104-1 performs calculations, based on the cryptographic theory, according to the IBE system, for example, to generate the partial public key #1, matched to the partial secret key #1, using the public parameters and the partial secret key #1. The concrete method for generation differs from one IBE system to another. The partial public key generating means 104-1 sends the so generated partial public key #1 via the transmitting/receiving section 101 to the IBE public key generating device 200 (step A400-1).

The other partial bid opening devices are run in similar manner. For example, the partial secret key generating means 102-$n$ of the partial bid opening device 100-$n$ receives the public parameters as input to generate the partial secret key # n (step A200-$n$) to store it in the partial secret key memory 103-$n$. The partial public key generating means 104-$n$ then receives the public parameters and the partial secret key # n as inputs to generate the partial secret key # n (step A-300$n$) to send the so generated partial secret key to the IBE public key generating device 200 (step A400-$n$).

The IBE public key generating device 200 receives partial public keys #1 to # n from the partial bid opening devices 100-1 to 100-$n$. The public key generating means 202 of the IBE public key generating device 200 generates a combined IBE key, with the public parameters and the received partial public keys #1 to # n as inputs (step A500). The public key generating means 202 performs calculations, based on, for example, the conditions for combination of the IBE public key, conforming to e.g. the IBE system, using the public parameters and the partial public keys #1 to # n, to generate the IBE public key. The concrete method for generation differs from one IBE system to another. If the Boneh-Franlkin IBE system, for example, is used, the IBE public key, enabling group decryption, may be generated by multiplying the respective partial public keys together.

The public key generating means 202 proceeds to disclose the IBE public key generated (step A-600). For example, the public key generating means 202 may disclose it by transmitting the IBE public key to the bidding device 300 and the bid opening device 400 via the transmitting/receiving section 201. It is also possible to provide a dedicated Web site adapted for distributing the IBE public key in order to disclose the IBE public key. It is moreover possible to print the IBE public key in order for the bid opening entity to distribute the public key, while it is likewise possible to get the IBE public key stored in a recording medium to disclose the IBE public key.

It should be noticed that, in case of not performing distributed management of the secret information, that is, in case the sole partial bid opening device is used, only one partial public key #1 is used to generate the IBE public key.

Figure 3:
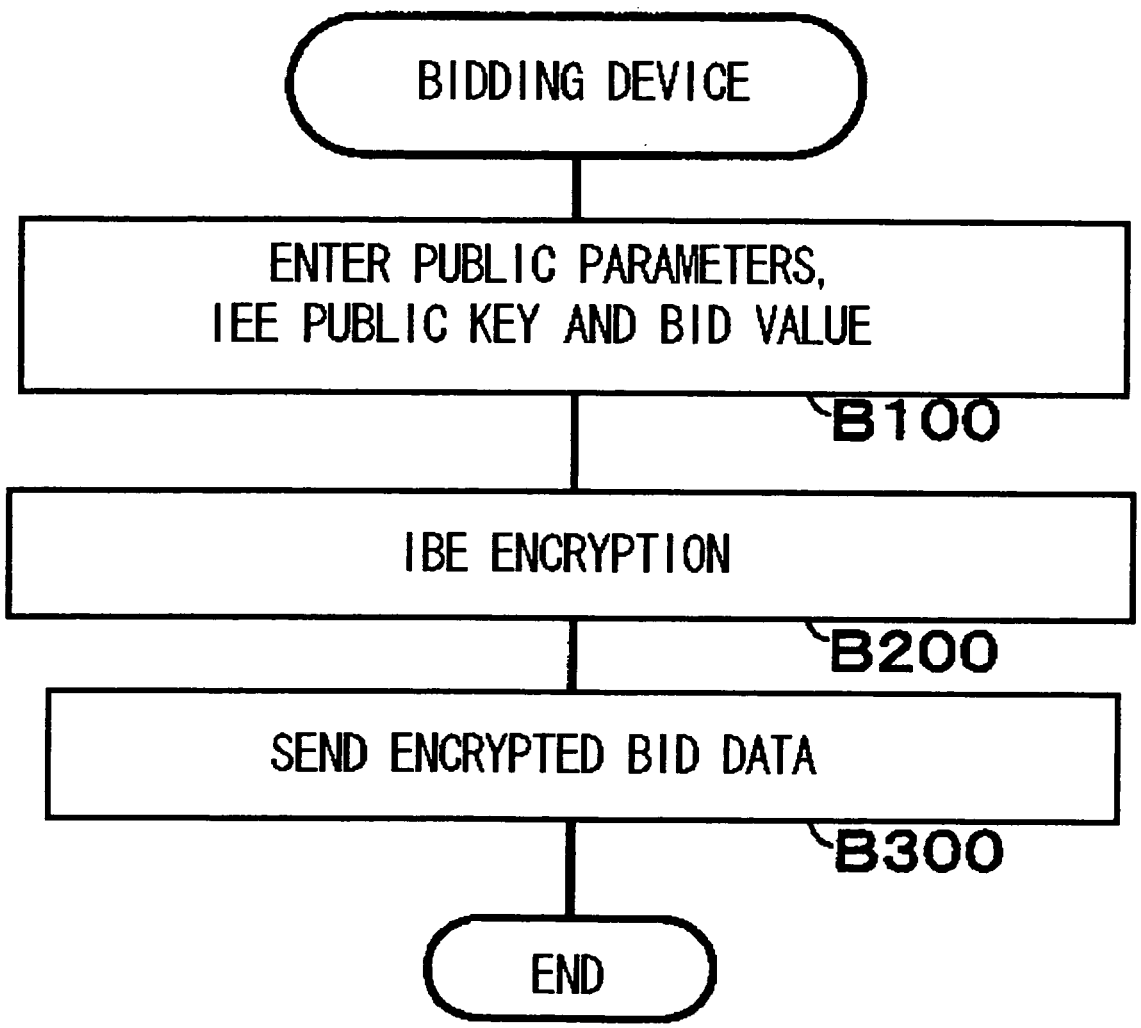
FIG. 3 is a flowchart showing an example of a bidding operation of the exemplary embodiment of the present invention.

The bidding operation is now described with reference to FIG. 3, which shows a flowchart illustrating a typical bidding operation according to the present exemplary embodiment. The public parameters, the IBE public key and the bid value are entered to the bidding device 300 (step B100). The IBE public key may be received from the IBE public key generating device 200, as already explained in connection with the operation for generating the IBE public key. In case the IBE public key generating device 200 provides a dedicated Web site, the IBE public key may be received by accessing the site. The IBE public key may be read in from a recording medium. Or, an input picture image may be displayed for the bidder to input the IBE public key printed on e.g. a paper sheet. The bid value is to be input by the bidder on an input picture image surface displayed, for instance.

Initially, the IBE encrypting means 302 of the bidding device 300 generates encrypted bid data, with the public parameters, IBE public key and the bid value as inputs (step B200). The IBE encrypting means 302 performs calculations, using the public parameters, IBE public key and the bid value, based on the cryptographic theory, conforming to the IBE system, for example, to generate encrypted bid data. The IBE encrypting means 302 generates a public key, matched to the bid value, using the public parameters, IBE public key and the bid values, for example, and encrypts the message for bidding, using the so generated public key, such as to generate the encrypted bid data. The IBE encrypting means 302 sends the generated encrypted bid data to the bid opening device 400 via the transmitting/receiving section 301 (step B300).

The bid opening device 400 receives encrypted bid data from the bidding device 300. The bid opening device 400 causes the received encrypted bid data to be stored in the encrypted bid data memory 402, so that the bidder may be identified, such as by correlating the encrypted bid data with the information indicating the bidder.

Figure 4:
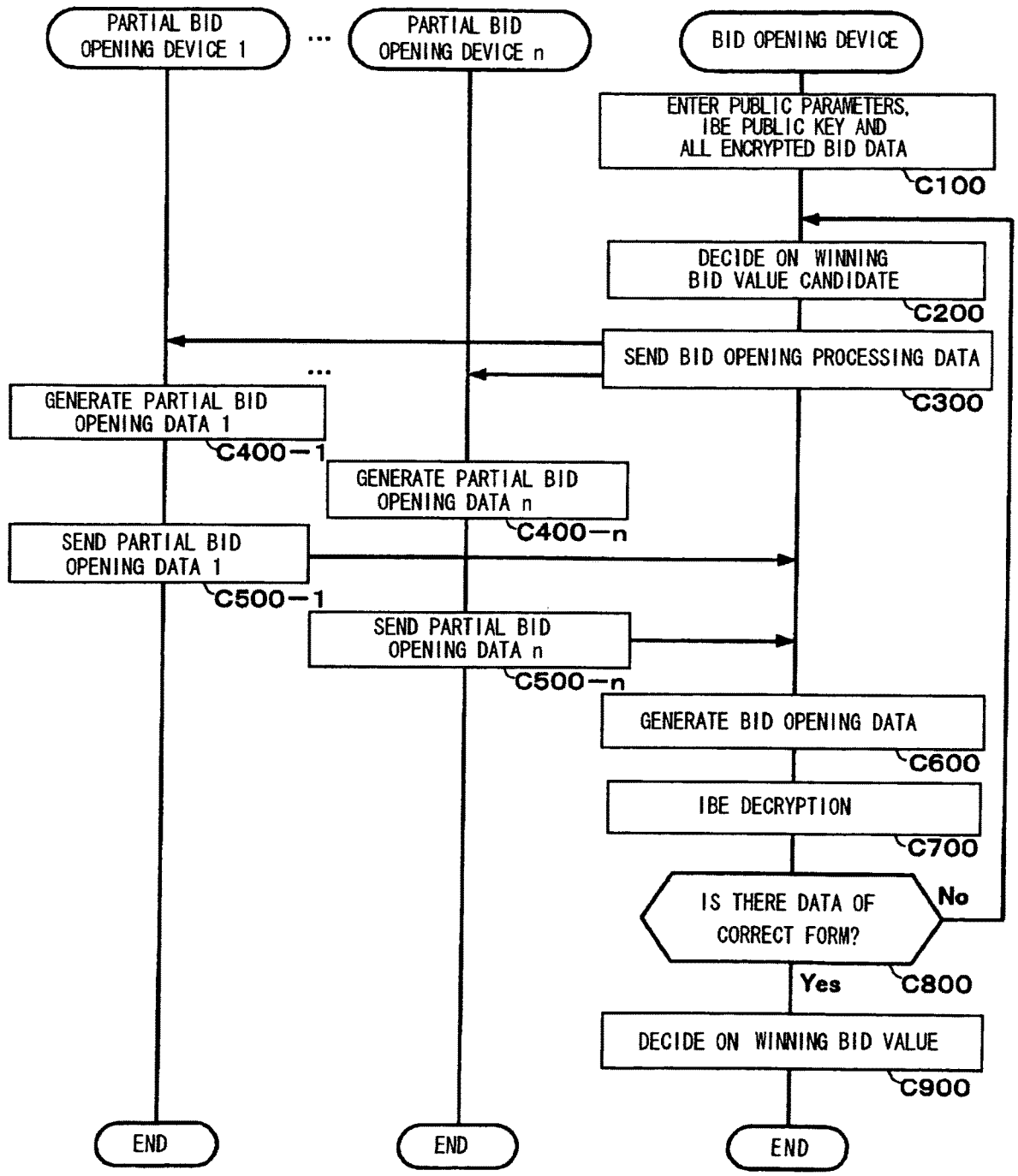
FIG. 4 is a flowchart showing an example of a bid opening operation of the exemplary embodiment of the present invention.

The bid opening operation will now be described with reference to FIG. 4, which shows a flowchart illustrating a typical bid opening operation of the present exemplary embodiment. The public parameters, the IBE public key and the encrypted bid data of all bidders are already entered to the bid opening device 400 (step C100). The encrypted bid data of all bidders have been stored in the encrypted bid data memory 402 of the bid opening device 400, as already explained in connection with the bidding operation.

Initially, the winning bid value candidate decision means 403 of the bid opening device 400 decides on a winning bid value candidate (step C200). This decision of the winning bid value candidate is equivalent to the action of selecting a decryption key used for decryption. It is here assumed that decryption is tried beginning from a value closest to the bid closing condition. The winning bid value candidate decision means 403 decides on the highest value of the bidding prices, which may be coped with by bidding, as being the initial winning bid value candidate.

The bid opening data generating means 404 collects together the data needed for the partial bid opening devices to perform the processing for bid opening, employing the partial secret keys, as being data for processing for bid opening, and sends the so collected data to the partial bid opening devices 100-1 to 100-*n* (step C300). The data for processing for bid opening includes at least the winning bid value candidate, as determined by the winning bid value candidate decision means 403, and the encrypted bid data of all bidders. There are however cases where a part of the encrypted bid data of all bidders are extracted and used. Although it has been stated above that the collected data are sent to the partial bid opening devices 100-1 to 100-*n*, it is also possible to send the data only to a number of the partial bid opening devices corresponding to the satisfying number of the group decryption. In case of not doing distributed management for the secret information for decryption, that is, in case there is only one partial bid opening device, it is sufficient to send the data only to the partial bid opening device 100-1. Here, a case in which the number of the satisfying number of the distributed management is equal to n, that is, a case in which all partial bid opening devices are needed, is taken for explanation.

The partial bid opening devices 100-1 to 100-*n* respectively receive data for processing for bid opening. The partial bid opening devices 100-1 to 100-*n*, which have received the data for processing for bid opening, respectively operate as hereinafter described. The partial bid opening device 100-1 is taken as an example. The partial bid opening data generating means 105-1 of the partial bid opening device 100-1 receives, as inputs, the data for processing for bid opening received (the winning bid value candidate and the encrypted bid data of all bidders), public parameters, the IBE public key and the partial secret key #1, as stored in the partial secret key memory 103-1, to generate the partial bid opening data #1, and sends the so generated data to the bid opening device 400 (step C400-1, C500-1). The partial bid opening data generating means 105-1 performs calculations, based on a cryptographic theory, conforming to the IBE system, for example, using the winning bid value candidate, encrypted bid data of all bidders, public parameters, IBE public key and the partial secret key #1. Thus, the partial bid opening data #1, representing the results of the calculations for decryption of the partial secret key, matched to the winning bid value candidate, is generated from one encrypted bid data to another.

The other partial bid opening devices operate in a similar manner. For example, the partial bid opening data generating means 105-*n* of the partial bid opening device 100-*n* receives, as inputs, the data for processing for bid opening received (winning bid value candidate and the encrypted bid data of all bidders), public parameters, IBE public key and the partial secret key # n, as stored in the partial secret key memory 103-*n*, to generate the partial bid opening data # n, and sends the data to the bid opening device 400 (step C400-*n*, C500-*n*).

The bid opening device 400 receives the partial public keys #1 to # n from the partial bid opening devices 100-1 to 100-*n*. The bid opening data generating means 404 of the bid opening device 400 receives, as inputs, the partial public keys #1 to # n, public parameters, IBE public key and bid data of all bidders stored in the encrypted bid data memory 402, such as to generate bid opening data (step C600). The bid opening data is data combined from the partial bid opening data generated by the partial bid opening devices, and also are data representing the results of calculations for decryption of the secret key, matched to the winning bid value candidate, from one encrypted bid data to another. The bid opening data generating means 404 performs calculations, using the partial bid opening data #1 to −n, public parameters, IBE public key and bid data of all bidders, based on the condition for combination for group decryption, conforming to e.g. the IBE system, for example, to generate bid opening data. Although it has been stated above that all of the partial bid opening data are used, it is also possible to generate bid opening data using only to a number of the partial bid opening data corresponding to the satisfying number of the group decryption, as mentioned above. In case of not doing distributed management for the secret information for decryption, that is, in case there is only one partial bid opening device 100, the partial bid opening data #1 itself proves bid opening data.

The IBE decrypting means 405 decrypts all encrypted bid data, with the bid opening data, generated by the bid opening data generating means 404, public parameters, IBE public key and all of the encrypted bid data, as inputs, to generate a list of decrypted data (step C700). The list of decrypted data means a list of output decrypted data obtained on decrypting the respective encrypted bid data using the bid opening data, or a set of decrypted data for all bidders, obtained on correctly decrypting the respective encrypted bid data using the secret key matched to the winning bid value candidate. The IBE decrypting means 405 performs calculations, using the bid opening data, public parameters, the IBE public key and the encrypted bid data of all bidders, based e.g. on the cryptographic theory conforming to the IBE system, to generate decrypted data.

The decision means 406 then verifies, with the public parameters and the list of decrypted data, as inputs, whether or not there is any decrypted data of the correct form in the list of the decrypted data (step C800). Specifically, the decision means 406 verifies that the decrypted data is of the correct form in case the decrypted data coincides with the message for bidding contained in the public parameters. If there is the decrypted data of the correct form, the decision means 406 decides that the winning bid value candidate, used for decrypting the data, is the winning bid value (step C900). The bidder of the decrypted data of the correct form becomes the winner. If a plural number of bids of the same bid value are tendered, the winners may be determined correctly because the decrypted data is generated from one bidder to another.

If no data of the correct form has been found, it is assumed that no bidder has tendered a bid with the winning bid value candidate as the bid value. In this case, the winning bid value candidate is updated, and the processing for decryption (C300 to C700) is repeatedly carried out until the winning bid value candidate is determined, as reversion is made to the step C200. It should be noticed that, if it is probable that there are multiple winners, the above processing is repeated until all of the winners are determined.

The present exemplary embodiment uses the IBE system, in which the bid value is used as ID for encryption for keeping the bid prices in secrecy. Thus, there is no necessity of having the list of public keys corresponding to the bid prices included in the public parameters. It is because the public key corresponding to the bid value may be generated by the bidding device 300 using the bid value as entered by the bidder. Moreover, the act of illicitly finding a bid value different than the winning bid value may be inhibited because the partial secret keys, used for bid opening, are stored distributed by the partial bid opening devices.

Since the disclosed message for bidding is encrypted with the public key, matched to the bid value, it is possible to prove authenticity of the bid opening by proving that none of the results of decryption of the encrypted bid data of all bidders with decryption keys matched to bid values which may be coped with by bidding and which are nearer to the bid closing condition than the winning bid value is of the correct form. If, at a time point the bidding has been closed, the encrypted bid data of all bidders are disclosed and, at a time the winning bid value has been determined, the decryption keys matched to bid values which may be coped with by bidding and which are nearer to the bid closing condition than the winning bid value are all disclosed, any bidder can test the decryption of encrypted bid data of all bidders. It is thus possible to verify that no bid value nearer to the bid closing condition than the winning bid value has been tendered.

For example, if the highest bid value is to be the winning bid value, it is possible to prove authenticity by disclosing decryption keys matched to values which may be coped with by bidding and which are larger than the winning bid value. In similar manner, if the lowest bid value is to be the winning bid value, it is possible to prove authenticity by disclosing all decryption keys matched to values which may be coped with by bidding and which are smaller than the winning bid value. On the other hand, the decryption key matched to the winning bid value may be disclosed to permit verification of whether or not the encrypted bid message of the winner may correctly be decrypted.

Second Exemplary Embodiment

Figure 5:
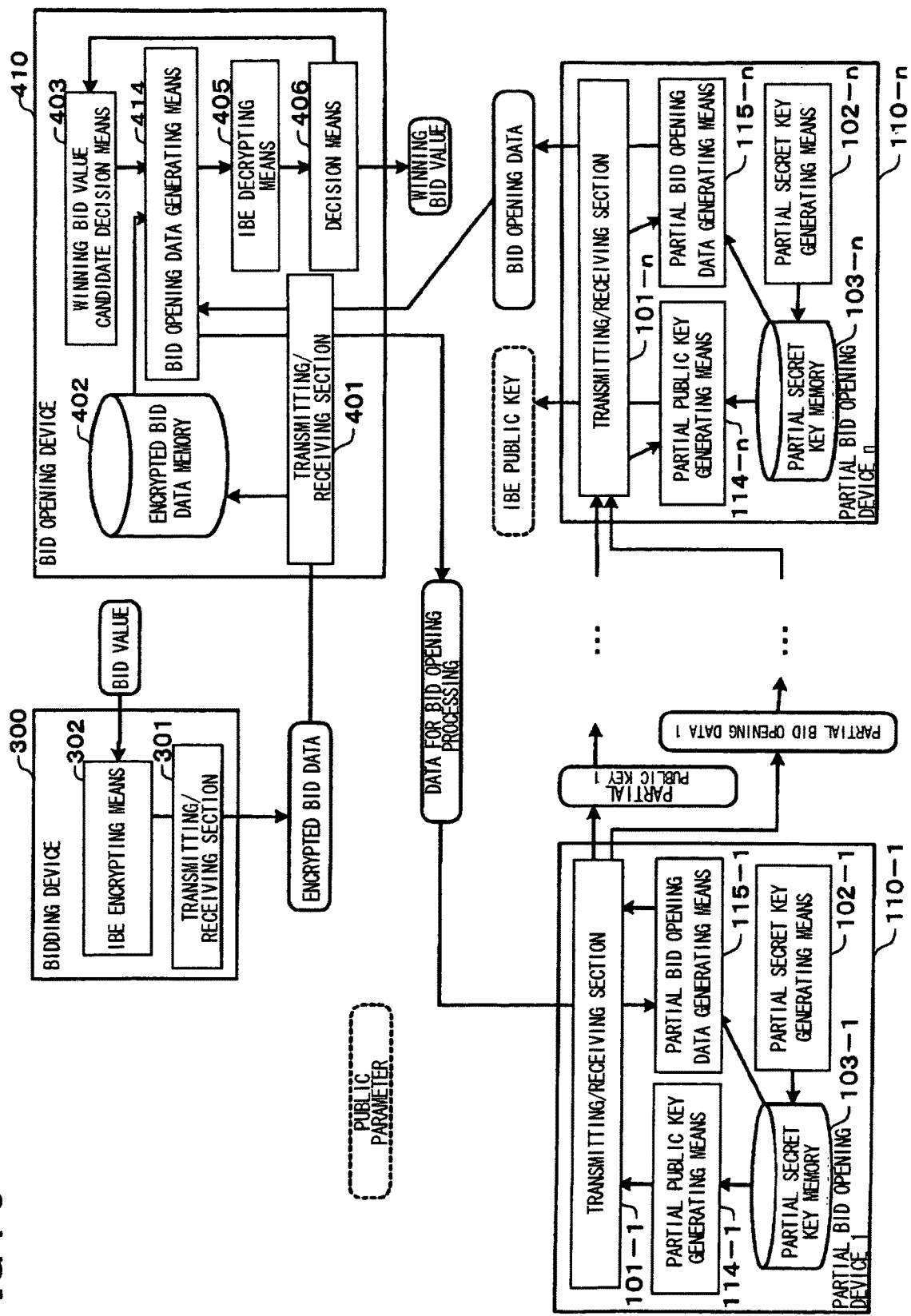
FIG. 5 is a block diagram showing an illustrative configuration of an electronic bidding system according to a second exemplary embodiment.

A second exemplary embodiment of the present invention will now be described with reference to the drawings. FIG. 5 shows a block diagram showing an illustrative configuration of an electronic bidding system of the present second exemplary embodiment. The electronic bidding system, shown in FIG. 5, includes one or more partial bid opening devices 110-1 to 110-n, where n denotes the number of the partial bid opening devices, a bidding device 300 and a bid opening device 410. The respective devices are interconnected via a communication network, such as the Internet or specialized networks. The electronic bidding system, shown in FIG. 5, differs from the first exemplary embodiment, shown in FIG. 1, in not having the IBE public key generating device 200. The partial bid opening devices 110 as well as the bid opening device 410 also differs in part from the first exemplary embodiment. The bidding device 300 is similar to the corresponding device of the first exemplary embodiment. As in the first exemplary embodiment, there may be provided a plural number of the bidding devices, depending on the number of the bidders. In FIG. 5, data surrounded by broken lines indicate data disclosed for the respective devices.

In the present exemplary embodiment, the calculations for combining the IBE public key and the bid opening data, which are the processing for combination for group decryption, are sequentially carried out as the results of the calculations are transferred from one partial bid opening device 110 to the next. The partial bid opening devices 110-1 to 110-n each include a transmitting/receiving section 101, a partial secret key generating means 102, a partial secret key memory 103, a partial public key generating means 114 and a partial bid opening data generating means 115. The present exemplary embodiment differs from the first exemplary embodiment as to the partial public key generating means 114 and the partial bid opening data generating means 115.

In the present exemplary embodiment, the partial public key generating means 114 generates a partial public key, matched to the partial secret key, based on the partial secret key as generated by the partial secret key generating means 102, and on the public parameters. The partial public key generating means 114 combines the IBE public key, sent from the previous partial bid opening device 110, as the previous base point, with the partial public key, generated by the partial public key generating means itself, to update the IBE public key, and sends the so updated IBE public key to the partial bid opening device 110 as the next base point. If the partial public key generating means is the first base point, it sends the IBE public key generated to the next base point as being the IBE public key. If the partial public key generating means is the final base point, it discloses the updated IBE public key. That is, the partial public key generating means 114 generates the IBE public key, as it sequentially transfers partial public keys, combined as described above, from one base point to the next. The conditions for combination of the IBE combination key are the same as those for the first exemplary embodiment.

Like the partial public key generating means 114, the partial bid opening data generating means 115 sequentially combines the partial bid opening data to generate the bid opening data, as the partial bid opening data generating means sequentially transfers the partial bid opening data combined from the previous base point to the next. It should be noticed that, with the partial bid opening data generating means 115, the bid opening data, finally updated at the last base point, is sent to the bid opening device 410. In the configuration of FIG. 5, the partial public key generating means 114 and the partial bid opening data generating means 115 are implemented by a CPU of the partial bid opening device 110 which is operated under a preset program.

The bid opening device 410 includes a transmitting/receiving section 401, an encrypted bid data memory 402, a winning bid value candidate decision means 403, a bid opening data generating means 414, an IBE decrypting means 405 and a decision means 406. The bid opening data generating means 414 of the present exemplary embodiment differs from the first exemplary embodiment in that the bid opening data are sequentially combined by the partial bid opening device 110. The bid opening data generating means 414 sends data necessary for processing for bid opening employing partial secret key to the partial bid opening device 110 as the first base point, and receives the bid opening data sent from the partial bid opening device 110 as the last base point, such as to generate bid opening data. It should be noticed that, in the configuration shown in FIG. 5, the bid opening data generating means 414 is implemented by a CPU of the bid opening device 410 operated under a preset program.

The operation of the electronic bidding system of the present exemplary embodiment will now be described. As in the first exemplary embodiment, the operation of the electronic bidding system of the present exemplary embodiment is roughly grouped into the operation of generating the IBE public key, the bidding operation and the bid opening operation. The bidding operation of the present exemplary embodiment is the same as that of the first exemplary embodiment and hence will not be described. It is assumed that, as in the first exemplary embodiment, the public parameters are entered to the respective devices from the outset.

Figure 6:
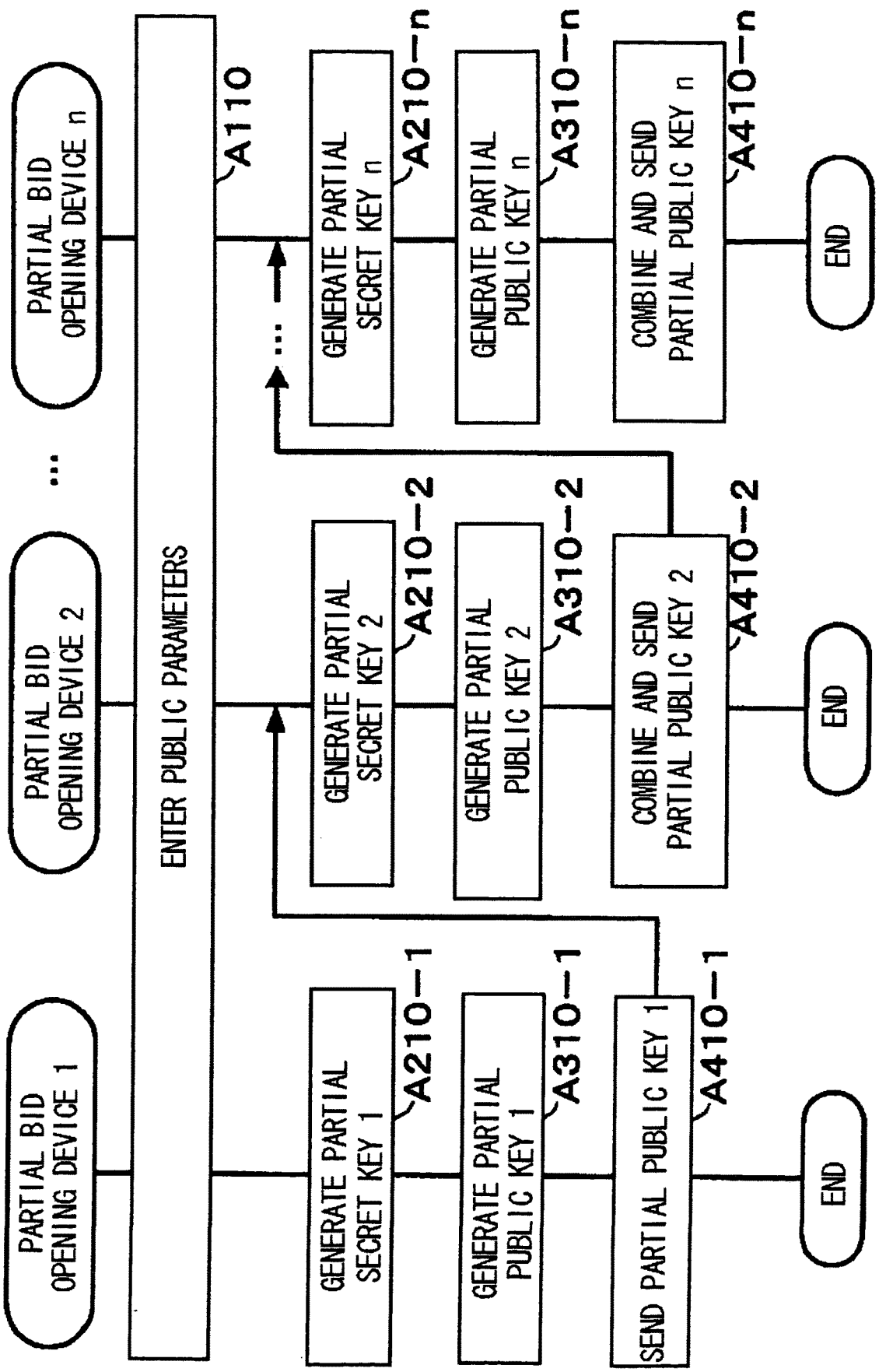
FIG. 6 is a flowchart showing an example of an IBE public key generating operation of the second exemplary embodiment.

Initially, the operation of generating the IBE public key will be described with reference to FIG. 6, which shows a flowchart for illustrating the typical operation of generating the IBE public key according to the second exemplary embodiment. The case described here is such a case in which, for distributed management of the secret information for decryption, there are provided a plural number of the partial bid opening devices 110, and in which the partial bid opening devices 110 formulate the IBE public keys and the bid opening data by combination sequentially. Now, it is assumed that a partial bid opening device 110-1 is arranged as a first base point, a partial bid opening device 110-2 is arranged as a second or further following base point and so forth until a partial bid opening device 110-$n$ is arranged as an n'th base point.

The public parameters are entered in the partial bid opening devices 110-1 to 110-$n$ (step A110). The partial bid opening devices 110-1 to 110-$n$ are operated in a manner as now described. Initially, the partial bid opening device 110-1 is run in operation. As in the first exemplary embodiment, the partial secret key generating means 102-1 of the partial bid opening device 110-1 receives the public parameters, as inputs, to generate the partial secret key #1 (step A210-1). Then, as in the first exemplary embodiment, the partial public key generating means 114-1 generates the partial public key #1, with the public parameters and the partial secret key #1, generated by the partial secret key generating means 102-1, as inputs (step S310-1). Since the partial bid opening device 110-1 is the first base point, it sends the generated partial public key #1, as the IBE public key #1, to the partial bid opening device 110-2 as the next base point (step A410-1).

The partial bid opening device 110-2 receives the IBE public key #1 from the partial bid opening device 110-1 as the previous base point. As in the partial bid opening device 110-1, the partial secret key generating means 102-2 of the partial bid opening device 110-2 generates a partial secret key #2, with the public parameters as inputs (step A210-2), and causes the so generated key to be stored in a partial secret key memory 103-2. As in the partial bid opening device 110-1, a partial public key generating means 114-2 generates a partial public key #2, with the public parameters and with the partial secret key #2, generated by the partial secret key generating means 102-2, as inputs (step A310-2).

Since the partial bid opening device 110-2 is the second or further following base point, the partial public key generating means 114-2 generates an IBE public key #2 by combining the partial public key #2 with the IBE public key #1, received from the partial bid opening device 110-1, as the previous base point, to transmit the so generated key to the partial bid opening device 110-3 as the next base point (A410-2). The partial public key generating means 114-2 performs calculations, on the IBE public key #1 received and the partial public key #2 generated, based on the conditions for combination of the IBE public key conforming to the IBE system, such as to generate an IBE public key #2. The similar sequence of operations is continued up to the partial bid opening device 110-($n$−1).

The partial bid opening device 110-$n$ receives an IBE public key #(n−1) from the partial bid opening device 110-($n$−1) as the previous base point. As in the partial bid opening device 110-1, a partial secret key generating means 102-$n$ of the partial bid opening device 110-$n$ generates a partial secret key # n, with the public parameters as inputs (step S210-$n$), to store it in a partial secret key memory 103-$n$. Then, as in the partial bid opening device 110-1, a partial public key generating means 114-$n$ generates a partial secret key # n (step A310-$n$), with the public parameters and the partial secret key # n, generated by the partial secret key generating means 102-$n$, as inputs (step A310-$n$).

Since the partial bid opening device 110-$n$ is the last base point, the partial public key generating means 114-$n$ combines the partial public key # n with the partial secret key #(n−1), received from the partial bid opening device 110-($n$−1) as the previous base point, to generate an IBE public key # n. The partial public key generating means then discloses the so generated IBE public key # n as the IBE public key (step A410-$n$). For example, the partial public key generating means 114-$n$ may perform the disclosing operation by sending the IBE public key to the bidding device 300 and to the bid opening device 410 via the transmitting/receiving section 101-$n$. Or, the partial public key generating means may perform the disclosing operation by providing a dedicated Web site used for distributing the IBE public key, printing the IBE public key or by storing it in a recording medium, such as to enable its distribution by the bid opening entity.

Figure 7:
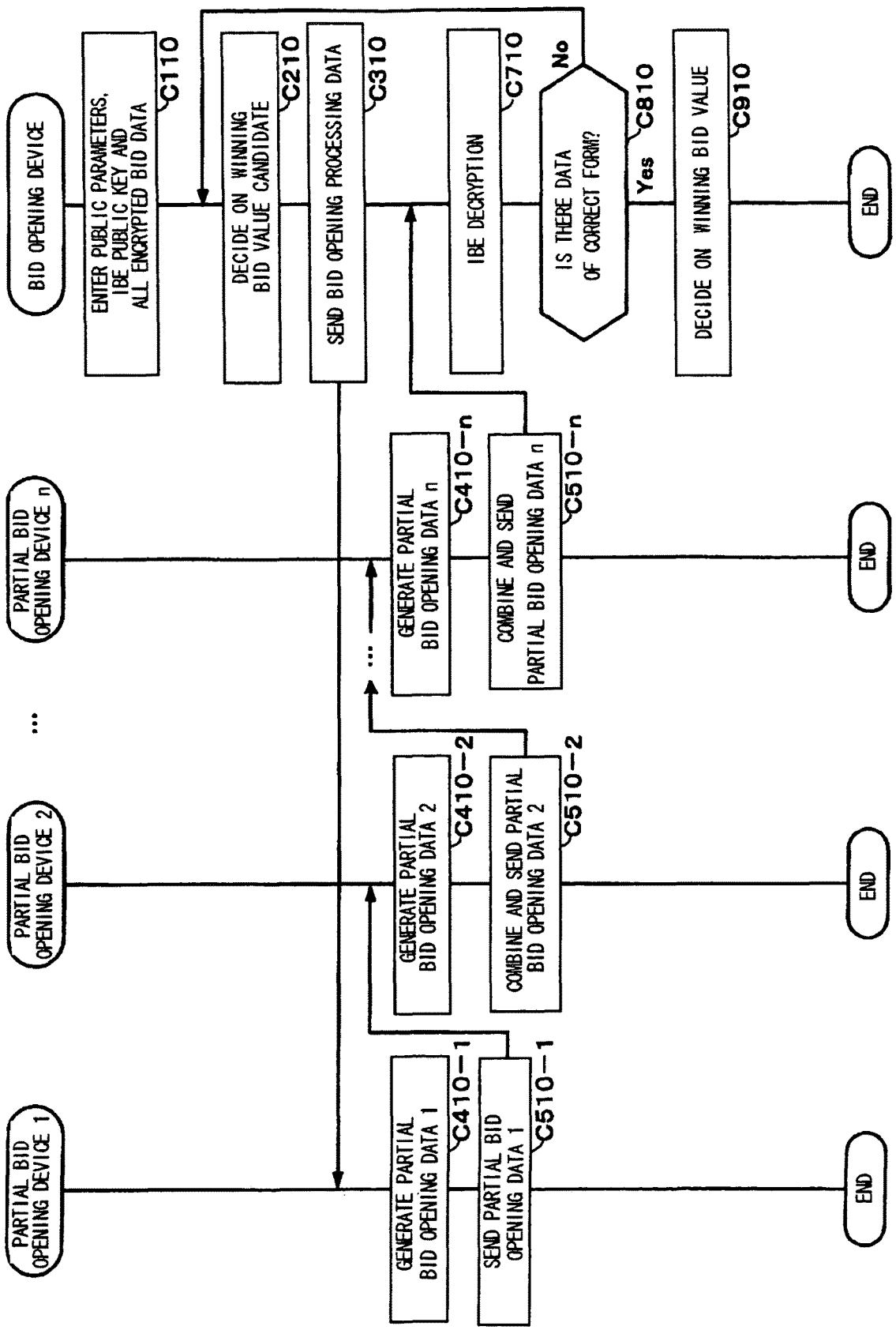
FIG. 7 is a flowchart showing an example of a bid opening system according to the second exemplary embodiment.

The bid opening operation will now be described with reference to FIG. 7, which shows a flowchart illustrating an exemplary bid opening operation of the second exemplary embodiment. The bid opening device 410 receives public parameters, the IBE public key and the encrypted bid data of all the bidders, as inputs (step C110). Initially, the winning bid value candidate decision means 403 of the bid opening device 410 decides on a winning bid value candidate, as in the first exemplary embodiment (step C210). For example, the winning bid value candidate decision means 403 sets the highest value of the bidding prices, coped with by bidding, as being the first candidate bid value. The bid opening data generating means 414 then collects together the data needed for the partial bid opening device to carry out the processing for bid opening employing the partial secret key, and sends the so collected data to the partial bid opening device 110-1 as the first base point (step C310).

The partial bid opening device 110-1 receives data for processing for bid opening. A partial bid opening data generating means 115-1 of the partial bid opening device 110-1 generates partial bid opening data #1, with the data for processing for bid opening, public parameters, IBE public key received, and the partial secret key #1, stored in the partial secret key memory 103-1, as inputs (step C410-1), as in the first exemplary embodiment. Since the partial bid opening device 110-1 is the first base point, the partial bid opening data generating means 115-1 sends the generated partial bid opening data #1 unchanged as the bid opening data #1 to the partial bid opening device 110-2 which is the next base point (step C510-1). It should be noticed that, when the opening data are sent to the next base points, the data needed for carrying out the processing for bid opening in the next following base points are also sent as data for carrying out the processing for bid opening.

The partial bid opening device 110-2 receives the bid opening data #1 from the partial bid opening device 110-1 as the previous base point. As in the partial bid opening device 110-1, the partial bid opening data generating means 115-2 of the partial bid opening device 110-2 generates the partial bid opening data #2, with the data for processing bid opening, public parameters, IBE public key and the partial secret key #2, stored in the partial secret key memory 103-2, as inputs (step C410-2). Since the partial bid opening device 110-2 is the second or further following base point, the partial bid opening data generating means 115-2 combines the partial bid opening data #2 with the partial bid opening data #1, received from the partial bid opening device 110-1, as the previous base point, to generate partial bid opening data #2, which is sent to the partial bid opening device 110-3 as the next base point (step C510-2). The partial bid opening data generating means 115-2 performs calculations on the bid opening data #1 and the partial bid opening data #2 received, based on the conditions for combination for group decryption, conforming to, for example, the IBE system, to update the bid opening data. A similar sequence of operations are carried out up to the partial bid opening device 110-($n$−1).

The partial bid opening device 110-$n$ receives bid opening data # (n−1) from the partial bid opening device 110-($n$−1) which is the previous base point. The partial bid opening data generating means 115-$n$ of the partial bid opening device 110-$n$ generates partial bid opening data # n, with the data for processing for bid opening, public parameters, IBE public key and the partial secret key # n, stored in the partial secret key memory 103-$n$, as inputs (step C410-$n$). Since the partial bid opening device 110-$n$ is the last base point, the partial bid opening data generating means 115-$n$ combines the partial bid opening data # n with the partial bid opening data # (n−1), received from the partial bid opening device 110-($n$−1), as the previous base point, to generate bid opening data # n. The so generated bid opening data is sent to the bid opening device 410 (step C510-$n$).

The bid opening device 410 receives the bid opening data from the partial bid opening device 110-$n$. The bid opening data generating means 414 of the bid opening device 410 outputs the received bid opening data to the IBE decrypting means 405. As in the first exemplary embodiment, the IBE decrypting means 405 decrypts the encrypted bid opening data, in their entirety, with the bid opening data, public parameters, IBE public key and the totality of the encrypted bid data, as inputs, to generate a list of decrypted data (step C710). As in the first exemplary embodiment, the decision means 406 checks to see whether or not there is decrypted data of the correct form in the list of the decrypted data, with the public parameters and with the list of the decrypted data as inputs (step C810). If there is the decrypted data of the correct form, the decision means 406 sets the winning bid value candidate, used for decryption of the data, as being the winning bid value (step C910).

With the present exemplary embodiment, as in the first exemplary embodiment, the IBE system, having the bid value as the ID, is used for encryption in order to keep the bid prices secret. Hence, the list of public keys, matched to the bid prices, need not be included in the public parameters. Moreover, since the partial secret keys, used for bid opening, are stored distributed by the partial bid opening devices, it is possible to inhibit the act of illicitly finding bid values other than the winning bid value.

Moreover, by the partial bid opening devices 11 sequentially performing the processing for combination for group decryption, it is possible to dispense with the labor of collecting the partial public keys or partial bid opening data for combination. The present exemplary embodiment is directed to the case of the partial bid opening devices 11 sequentially combining both the IBE public key and the bid opening data. However, only one of the IBE public key and the bid opening data may be sequentially combined by the partial bid opening devices 110. The other may be combined simultaneously by a parallel operation, as in the first exemplary embodiment. As a method for combination sequentially, such a method of transferring sequentially from the first base point up to the last base point for combination has been described. Alternatively, such a base point corresponding to a satisfying number of the group decryption may be the last base point, without transferring to the n'th base point. In other respects, the present exemplary embodiment is the same as the first exemplary embodiment.

Third Exemplary Embodiment

Figure 8:
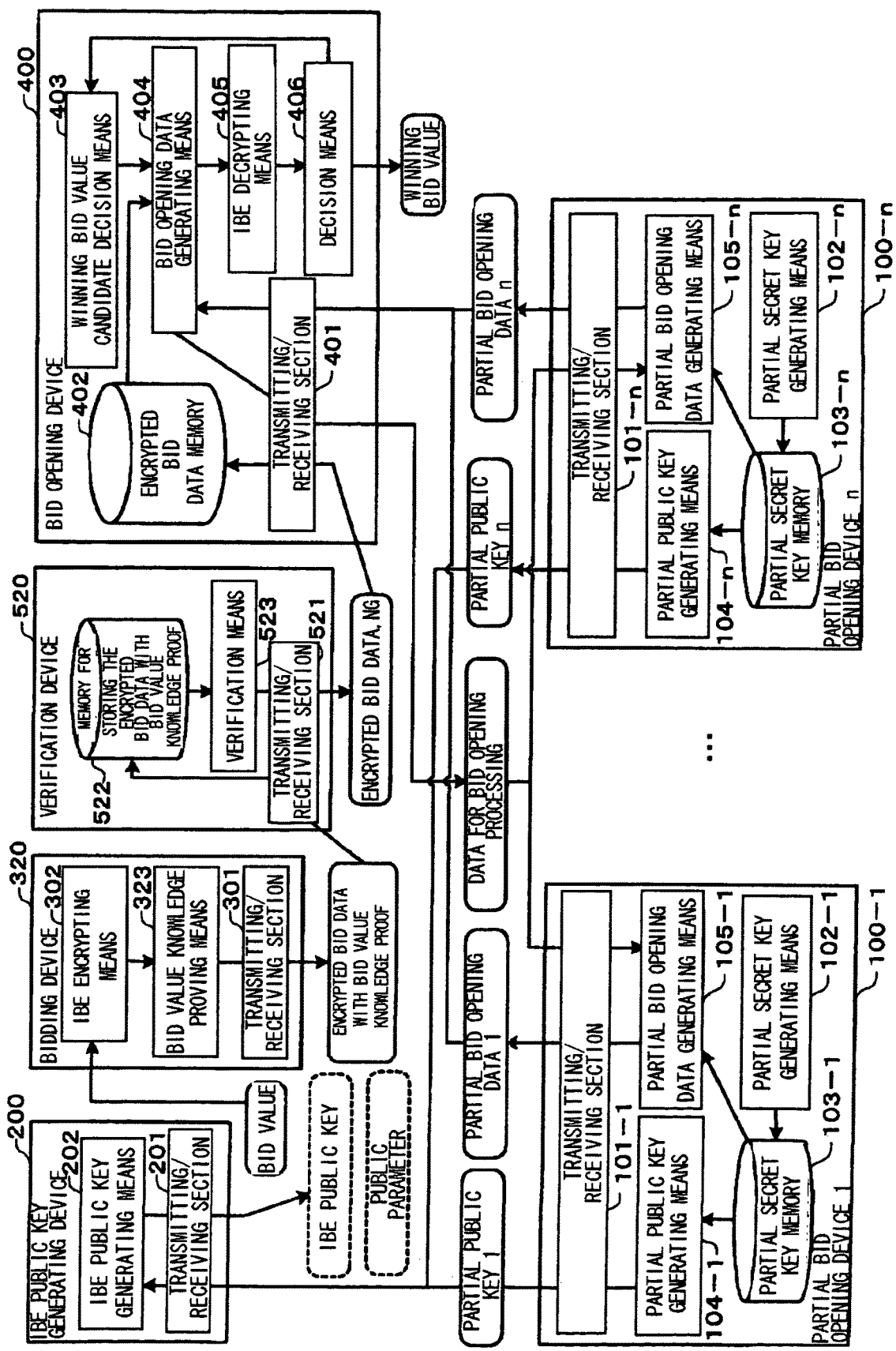
FIG. 8 is a block diagram showing an illustrative configuration of an electronic bidding system according to a third exemplary embodiment.

The third exemplary embodiment of the present invention will now be described with reference to the drawings. FIG. 8 shows a block diagram showing an illustrative configuration of an electronic bidding system according to the third exemplary embodiment. The electronic bidding system, shown in FIG. 8, includes one or more partial bid opening devices 100-1 to 100-$n$, where n denotes the number of the partial bid opening devices, an IBE public key generating device 200, a bidding device 320, a bid opening device 400 and a verification device 520. The respective devices are interconnected via a communication network, such as the Internet or specialized networks. The electronic bidding system, shown in FIG. 8, differs from the first exemplary embodiment of FIG. 1 in having the verification device 520, and in the bidding device 320 having a bid value knowledge proving means 323. The partial bid opening devices 100-1 to 100-$n$, IBE public key generating device 200 and the bid opening device 400 are the same as those of the first exemplary embodiment. Although FIG. 8 shows the sole bidding device 320, a plural number of the bidding devices 320 may also be provided, depending on the number of the bidders, for instance. In FIG. 8, data surrounded by broken lines in FIG. 8 represent data disclosed to the respective devices.

In the present exemplary embodiment, data for proving the knowledge of the bid values are added to encrypted bid data in carrying out bidding. Proving the knowledge of the bid values here means a method of proving the knowledge of the bid value without disclosing the bid value. By using, as knowledge proving concerning the bid value, such a proving method according to which knowledge proving of passing verification without knowledge of the bid value cannot be generated, such as zero knowledge proof, it is possible to prevent the act of tendering a bid using another person's encrypted bid data.

In the present exemplary embodiment, the identification information proper to each bidder, such as user ID, is assigned to each bidder in order to prove the knowledge about the bid value. In addition, when the bidding device 320 has generated encrypted bid data, it also generates data for proving the knowledge about the bid value, using the user ID and the information which is used for encryption, and which is different than the bid value and arbitrary from bidder to bidder. This information, exemplified by a random number used for encryption, is referred to below as the arbitrary information for encryption. The data for proving the knowledge about the bid value is referred to below as bid value knowledge proving data. The bidding device affords the bid value knowledge proving data to the encrypted bid data. The bid value knowledge proving data may be generated based on the proving logic of zero knowledge proof as described in Publication "C. P. Schnorr, 'Efficient Signature Generation by Smart Cards', Journal of Cryptography, 1991, Vol. 14, pp. 161-174 (Non-Patent Document 4). The zero knowledge proof, disclosed in Non-Patent Document 4, is a method for proving the knowledge of an exponential part of a discrete logarithm as the exponential part remains hidden. It should be noticed that the knowledge proving as used in the present exemplary embodiment is not limited to the zero knowledge proof as defined above and may be any other suitable proving method whereby it is possible to prove the knowledge of the secret information without disclosing the secrecy.

The bidding device 320 includes a transmitting/receiving section 301, an IBE encrypting means 302, and a bid value knowledge proving means 323. The present exemplary embodiment differs from the first as to the bid value knowledge proving means 323 which is a newly added component. When the IBE encrypting means 302 has generated encrypted bid value data, the bid value knowledge proving means 323 generates bid value knowledge proving data, using the arbitrary information for encryption, as used by the IBE encrypting means 302 for encryption, and the bidder's user ID, and affords the so generated data to the encrypted bid data. The encrypted bid data with the bid value knowledge proving data added thereto are herein termed the encrypted bid data with bid value knowledge proof. It should be noticed that, in the configuration shown in FIG. 8, the bid value knowledge proving means 323 is implemented by a CPU of the bidding device 320 dictated in its operation by a preset program.

The verification device 520 is an information processing apparatus, such as a personal computer, for verifying the encrypted bid data with bid value knowledge proof, and includes a transmitting/receiving section 521, a memory that stores the encrypted bid data with bid value knowledge proof 522, and a verification means 523. The transmitting/receiving section 521 exercises protocol control in communicating with other devices over a communication network to transmit/receive data. The memory that stores the encrypted bid data with bid value knowledge proof 522 stores the encrypted bid data with bid value knowledge proof as supplied from the bidding device 320. The verification means 523 verifies the encrypted bid data with bid value knowledge proof based on the proving logic for the bid value knowledge proving data.

In the configuration shown in FIG. 8, the memory that stores the encrypted bid data with bid value knowledge proof 522 is implemented by a memory of the verification device 520. The verification means 523 is implemented by a CPU of the verification device 520, and the transmitting/receiving section 521 is implemented by a CPU of the verification device 520 and by a hardware communication device.

The operation of the electronic bidding system of the present exemplary embodiment is now described. The operation of the electronic bidding system is roughly grouped into the operation of generating an IBE public key, the bidding operation, the operation for verification, and the bid opening operation. The operation for verification verifies whether or not the encrypted bid data as entered is correct. The present exemplary embodiment is directed to a case in which the verification device 520 receives the encrypted bid data with bid value knowledge proof to perform verification before processing by the bid opening device 400. The operation of generating the IBE public key and the bid opening operation are similar to those in the first exemplary embodiment and hence the description thereof is dispensed with. Meanwhile, it is assumed that public parameters are entered to the respective devices from the outset, as in the first exemplary embodiment.

Figure 9:
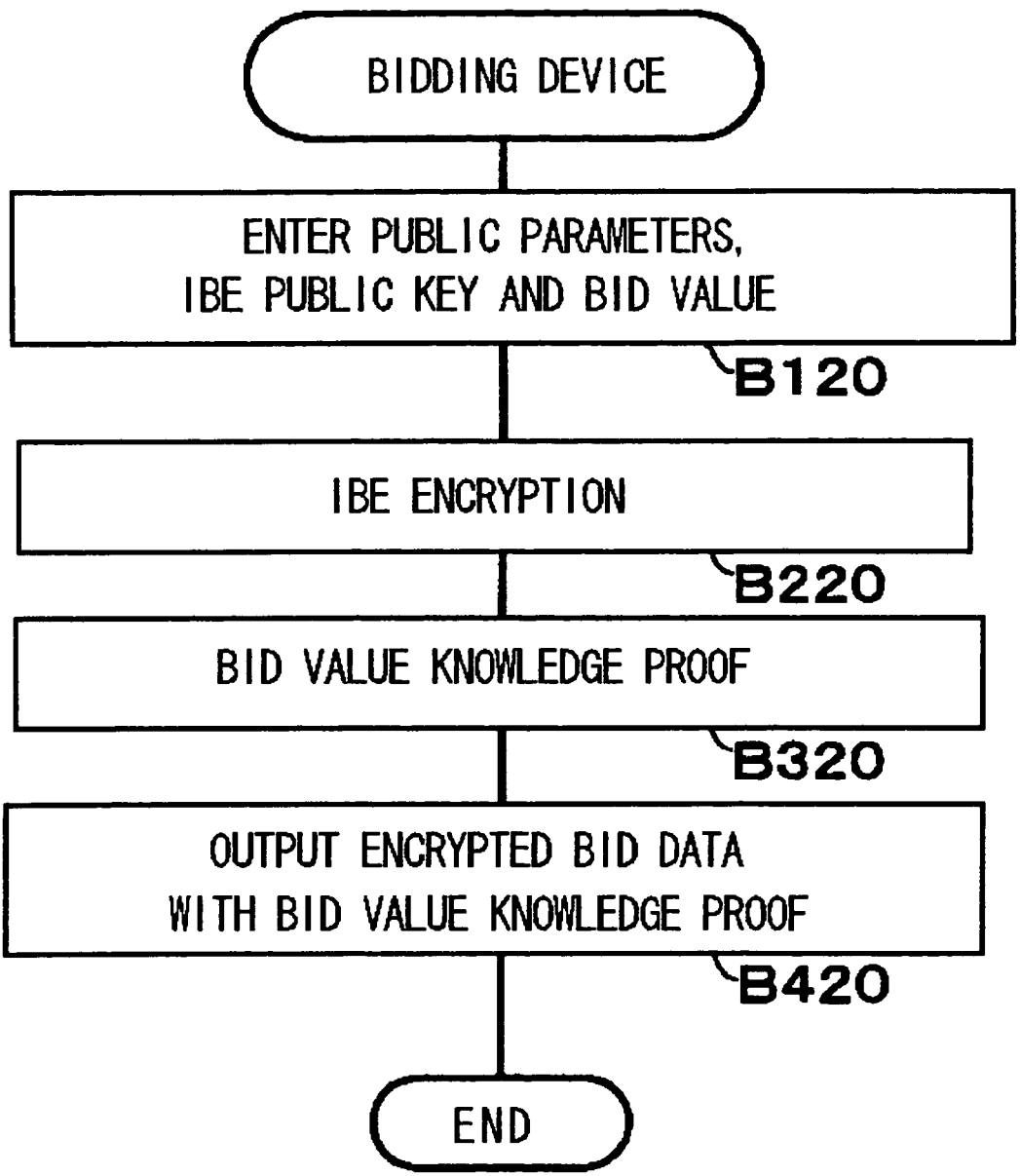
FIG. 9 is a flowchart showing an example of a bidding operation according to the third exemplary embodiment.

Initially, the bidding operation is described with reference to FIG. 9, which shows a flowchart for illustrating a typical bidding operation of the third exemplary embodiment. Although only one bidding device 320 is shown in FIG. 9, there may also be provided a plural number of the bidding devices 320, depending on the number of the bidders.

The public parameters, the IBE public key, the bid values and the user ID are entered to the bidding device 320 (step B120). Initially, the IBE encrypting means 302 of the bidding device 320 generates encrypted bid data, with the public parameters, IBE public key and the bid value as inputs, as in the first exemplary embodiment (step B220). The bid value knowledge proving means 323 then generates encrypted bid data with bid value knowledge proof, with the encrypted bid data and the arbitrary information for encryption, as the subject for knowledge proof, output from the IBE encrypting means 302, the user ID, public parameters, IBE public key and the bid value, as inputs, and sends the generated data to the verification device 520. The bid value knowledge proving means 323 performs calculations on the encrypted bid data, the arbitrary information for encryption, user ID, public parameters, IBE public key and the bid value, in accordance with the proof theory of the proving method used, for example, to generate the bid value knowledge proving data proper to the bidder (step B320). The encrypted bid data added by the so generated bid value knowledge proving data, that is, the encrypted bid data with bid value knowledge proof, is sent to the verification device 520 (step B420).

The verification device 520 receives the encrypted bid data with bid value knowledge proof from the bidding device 320. If there are a plural number of the bidding devices 320, depending on the number of the bidders, the verification device 520 receives the encrypted bid data with bid value knowledge proof from the respective bidders from the respective bidding devices 320. The verification device 520 causes the encrypted bid data with bid value knowledge proof received to be stored in the memory that stores the encrypted bid data with bid value knowledge proof 522 so that the bidders may be identified, such as by correlating the data with the user ID. The verification device may also directly proceed to the verification operation without storing the encrypted bid data with bid value knowledge proof in the memory 522.

Figure 10:
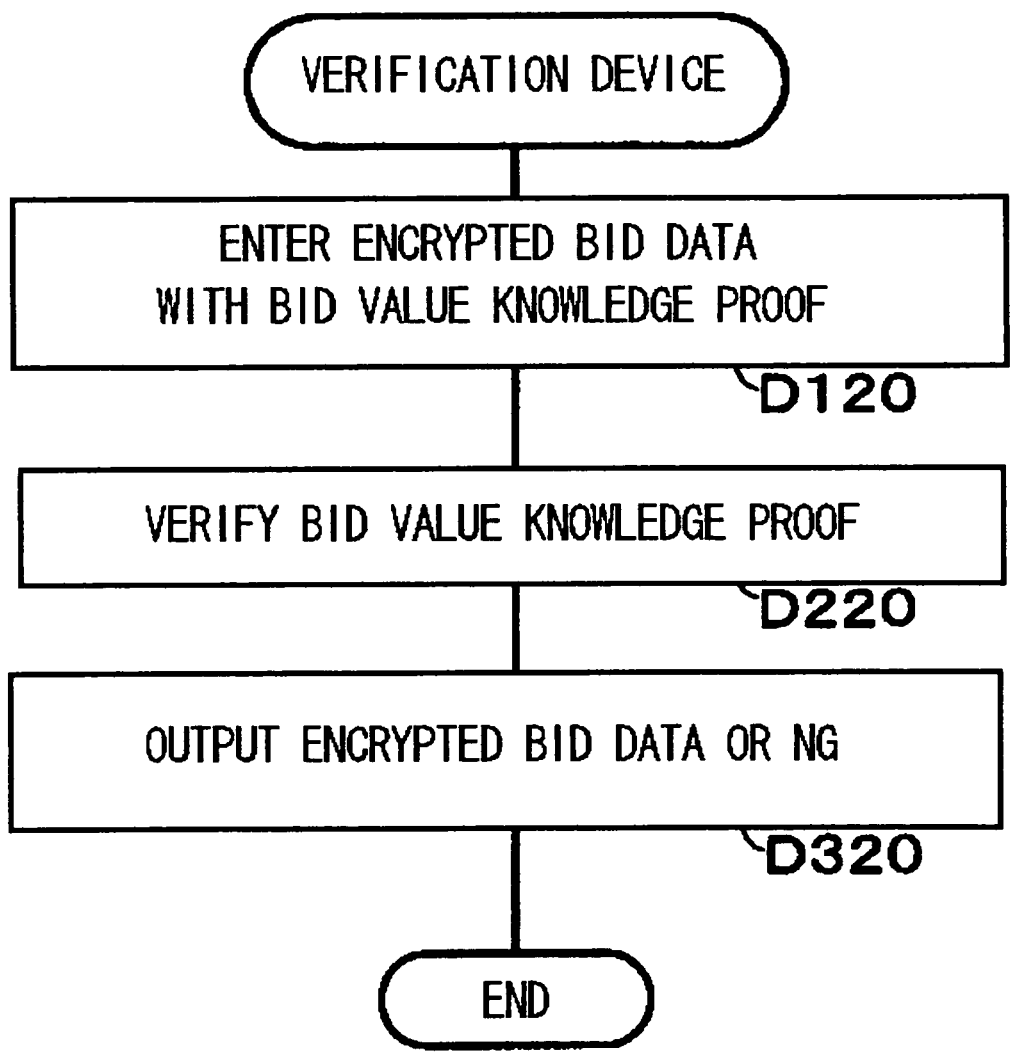
FIG. 10 is a flowchart showing an example of the verification operation according to the third exemplary embodiment.

The verification operation will now be described with reference to FIG. 10, which shows a flowchart illustrating a typical verification operation of the third exemplary embodiment. The verification device 520 has been supplied with the public parameters and with the IBE public key. On receipt from the bidding device 320 of the encrypted bid data with bid value knowledge proof (D120), the verification means 523 of the verification device 520 verifies the bid value knowledge proof data, with the encrypted bid data with bid value knowledge proof, user ID, public parameters and the IBE public key as inputs (step D220). The verification means 523 performs calculations on the bid value knowledge proof data, appended to the encrypted bid data with bid value knowledge proof, in accordance with the method for verification of the proving method used, to analyze the so calculated data. If, as a result of the analysis, the verification means has found that the bid value knowledge proof data appended is correct, it presumes that the correct encrypted bid data has been entered, and sends the encrypted bid data, devoid of the bid value knowledge proof data, to the bid opening device 400 (D320). If the bid value knowledge proof data appended is not correct, the verification means may presume that illicit encrypted bid data has been entered, and may treat the so entered encrypted bid data as unacceptable. The encrypted bid data, determined to be unacceptable, may be disclosed with the corresponding statement that it is unacceptable.

Thus, with the present exemplary embodiment, the bid value knowledge proof data, which allows for knowledge proving concerning the bid value, is appended to the encrypted bid data generated by the bidding device 320 on entry from the bidder. It is thus possible to inhibit the act of copying encrypted bid data of another person to tender a bid with the same amount as that of the source of copying without knowledge of the bid value of the source of copying. In other respects, the present third exemplary embodiment is similar to the first exemplary embodiment.

Fourth Exemplary Embodiment

Figure 11:
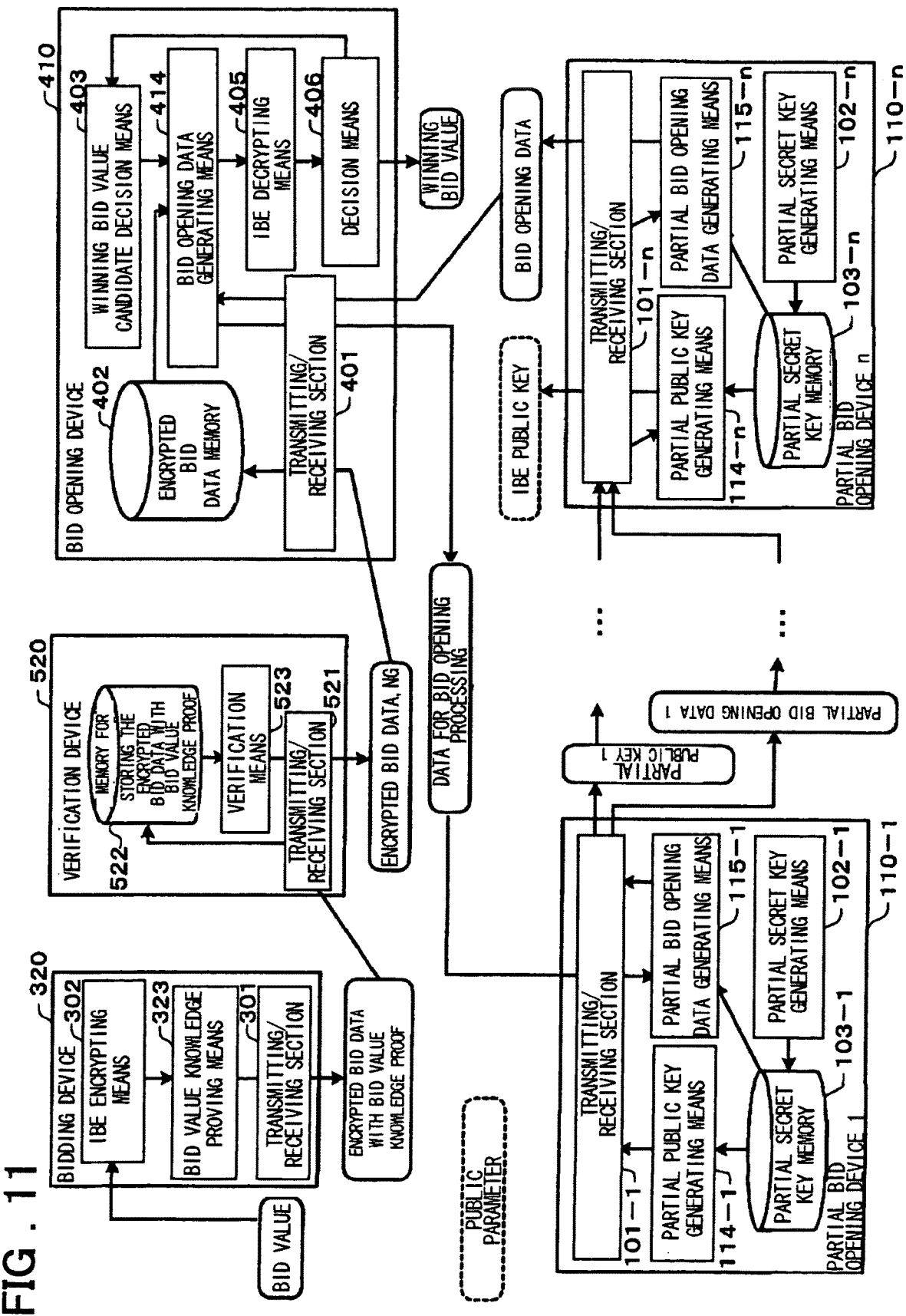
FIG. 11 is a block diagram showing an illustrative configuration of an electronic bidding system according to a fourth exemplary embodiment.

In the third exemplary embodiment, the bid value knowledge proof is added to the electronic bidding system of the first exemplary embodiment. In similar manner, the bid value knowledge proof may be added to the electronic bidding system of the second exemplary embodiment. FIG. 11 shows a block diagram illustrating a typical configuration of the electronic bidding system of the fourth exemplary embodiment for this case. The electronic bidding system, shown in FIG. 11, includes one or more partial bid opening devices 130-1 to 131-$n$, where n is the number corresponding to the number of the partial bid opening devices, a bidding device 330, a bid opening device 430 and a bid value knowledge proof verification device 530. These devices are interconnected via a communication network, such as the Internet or specialized networks. Although the sole bidding device 320 is shown, there may be provided a plural number of the bidding devices 320 depending on the number of the bidders.

The electronic bidding system, shown in FIG. 11, differs from the exemplary embodiment shown in FIG. 5 in that a verification device 520 has been added, and in that the bidding device 320 includes a bid value knowledge proving means 323. The partial bid opening devices 100-1 to 100-$n$ and the bid opening device 410 are similar to those of the second exemplary embodiment. The bidding device 320 and the verification device 520 are similar to those of the third exemplary embodiment.

In this case, the partial bid opening devices may sequentially perform the processing for combination for group decryption, so that the partial secret keys may be managed distributed without providing special interfaces for combination between the neighboring partial bid opening devices, thus allowing prevention of illicit acts of finding the bid values other than the winning bid values. Moreover, the act of illicitly using another person's encrypted bid data to submit a bid may be prohibited by appending the bid value knowledge proof data to the encrypted bid data of each bidder for verification.

Example 1

The operation of carrying out the present invention will now be described with reference to a concrete Example which shows implementation of the electronic bidding system of the first exemplary embodiment of the present invention in accordance with the Boneh-Franklin IBE system. It is assumed that, in the present Example, there are n partial bid opening devices 100 that take part in distributed management of the secret information for decryption, and that the satisfying number for the distributed management of the present exemplary embodiment is n.

Figure 12:
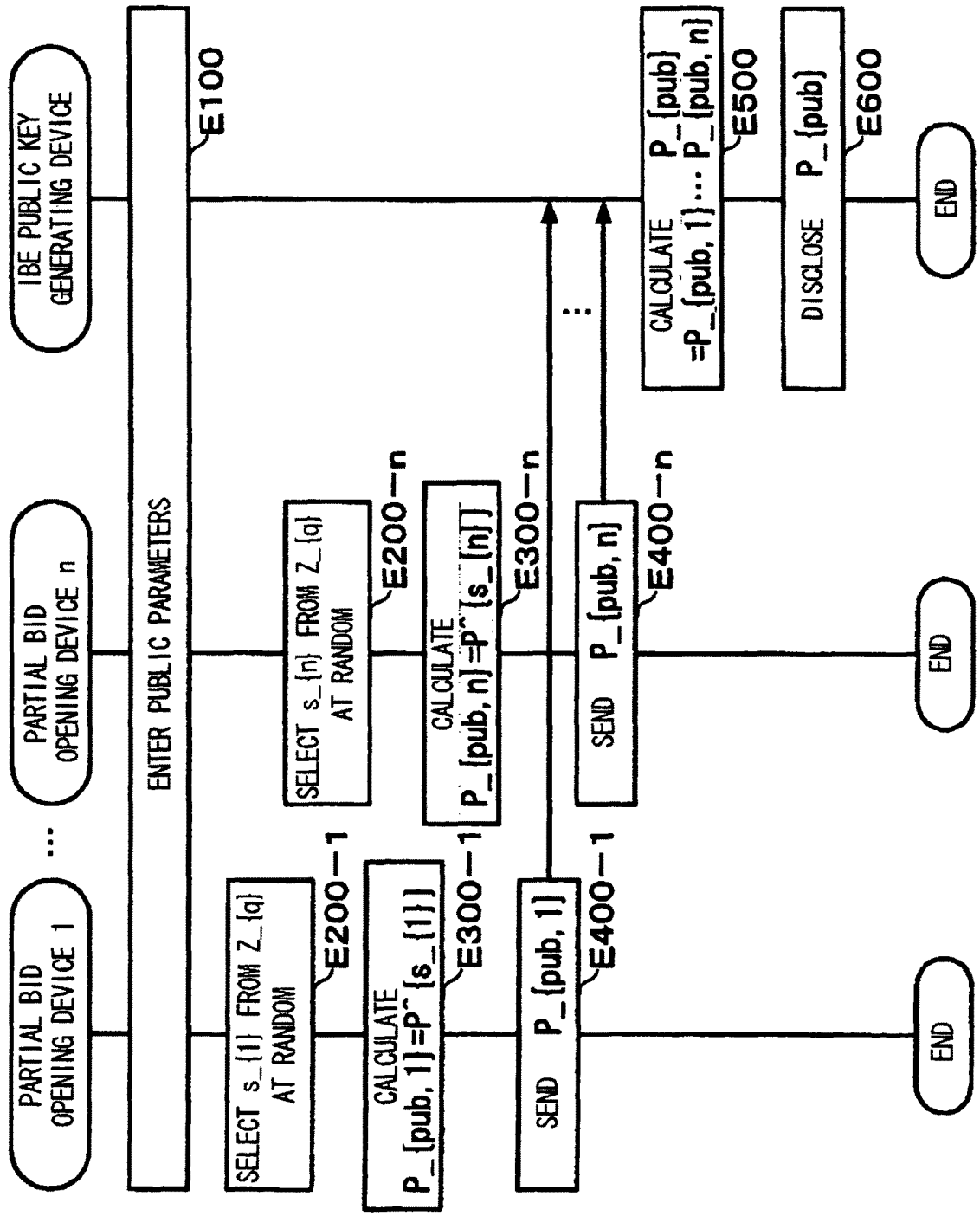
FIG. 12 is a flowchart showing an example of the bid opening operation in the present exemplary embodiment.

First, the operation for generating the IBE public key will be described with reference to FIG. 12, which shows a flowchart for illustrating a typical operation of generating an IBE public key of the present exemplary embodiment. To the partial bid opening devices 100-1 to 100-$n$ and to the bid opening device 400 are entered public parameters (step E100). Here, a list of bid prices $v\_\{t\}=\{v\_1, \ldots, v\_t\}$, the size m of a message for bidding, a m-bit message for bidding M, a security parameter k (1≤k), a prime q, a pairing set $(G\_\{1\}, G\_\{T\}, e(\cdot,\cdot))$, a generator P, a hash function $H\_\{1\}$ and a hash function $H\_\{2\}$, are entered as public parameters.

The list of bid prices $v\_\{t\}$ is a set of possible bid values and $v\_t$ denotes the highest price in a bid price band. The message for bidding M is an arbitrary bit sequence composed of m bits. The prime q denotes the number of elements $G\_\{1\}, G\_\{T\}$ in the pairing set. The pairing set$(G\_\{1\}, G\_\{T\}, e(\cdot,\cdot))$ is a finite group in which $G\_\{1\}$ and $G\_\{1\}$ have the same order q, and $e(\cdot,\cdot)$ is a mapping from $G\_\{1\} \times G\_\{1\}$ to $G\_\{T\}$. For arbitrary g, h, x and y, $e(g^x, h^y) = e(g,h)^{\{xy\}}$ holds and, in case g is a generator of $G\_\{1\}$, $e(g,g) \neq 1$ holds. The notation $g^x$ means x powers of g. The generator P is the generator of $G\_\{1\}$. The hash function $H\_\{1\}$ is a hash function from a set of binary sequences of an arbitrary length to $G\_\{1\}$. The hash function $H\_\{2\}$ is a hash function from $G\_\{T\}$ to a set of binary sequences with a bit length equal to m. The residue group modulo prime q is denoted "$Z\_\{q\}$". The exclusive OR from bit to bit is denoted "XOR". The bit concatenation is labeled "∥". For example, if a=10 and b=01 in binary notation, a∥b=1001.

The partial bid opening devices 100-1 to 100-$n$ operate as follows. The partial bid opening device 100-1 is taken as an example for explanation. Initially, the partial secret key generating means 102-1 selects $s\_\{1\}$ from $Z\_\{q\}$ at random (step E200-1). The $s\_\{1\}$ selected is then stored in the partial secret key memory 103-1. The partial public key generating means 104-1 then calculates $P\_\{pub,1\}=P^{\{s\_\{1\}\}}$ (step E300-1). The partial public key generating means 104-1 transmits the so calculated $P\_\{pub,1\}$ to the IBE public key generating device 200 as partial public key #1 (step E400-1).

The other partial bid opening devices are in operation in a similar manner. For example, the partial secret key generating means 102-$n$ of the partial bid opening device 100-$n$ selects $s\_\{n\}$ from $Z\_\{q\}$ at random (step E200-1) and causes the so selected $s\_\{n\}$ to be stored in the partial secret key memory 103-$n$. The partial secret key generating means 104-$n$ then calculates $P\_\{pub,n\}=P^{\{s\_\{n\}\}}$ (step E300-$n$) and transmits the so calculated $P\_\{pub,n\}$ to the IBE public key generating device 200 (step E400-$n$).

The IBE public key generating device 200 receives $P\_\{pub,1\}, \ldots, P\_\{pub,n\}$ from the partial bid opening devices 100-1 to 100-$n$. The IBE public key generating means 202 of the IBE public key generating device 200 calculates $P\_\{pub\}=P^{\wedge}\{s\_\{1\}\} \cdot P^{\wedge}\{s\_\{2\}\} \cdot \ldots \cdot P^{\wedge}\{s\_\{n\}\}$ with the $P\_\{pub,1\}, \ldots, P\_\{pub,n\}$ as an input, and discloses the so calculated $P\_\{pub\}$ as the IBE public key (steps E500, E600).

Figure 13:
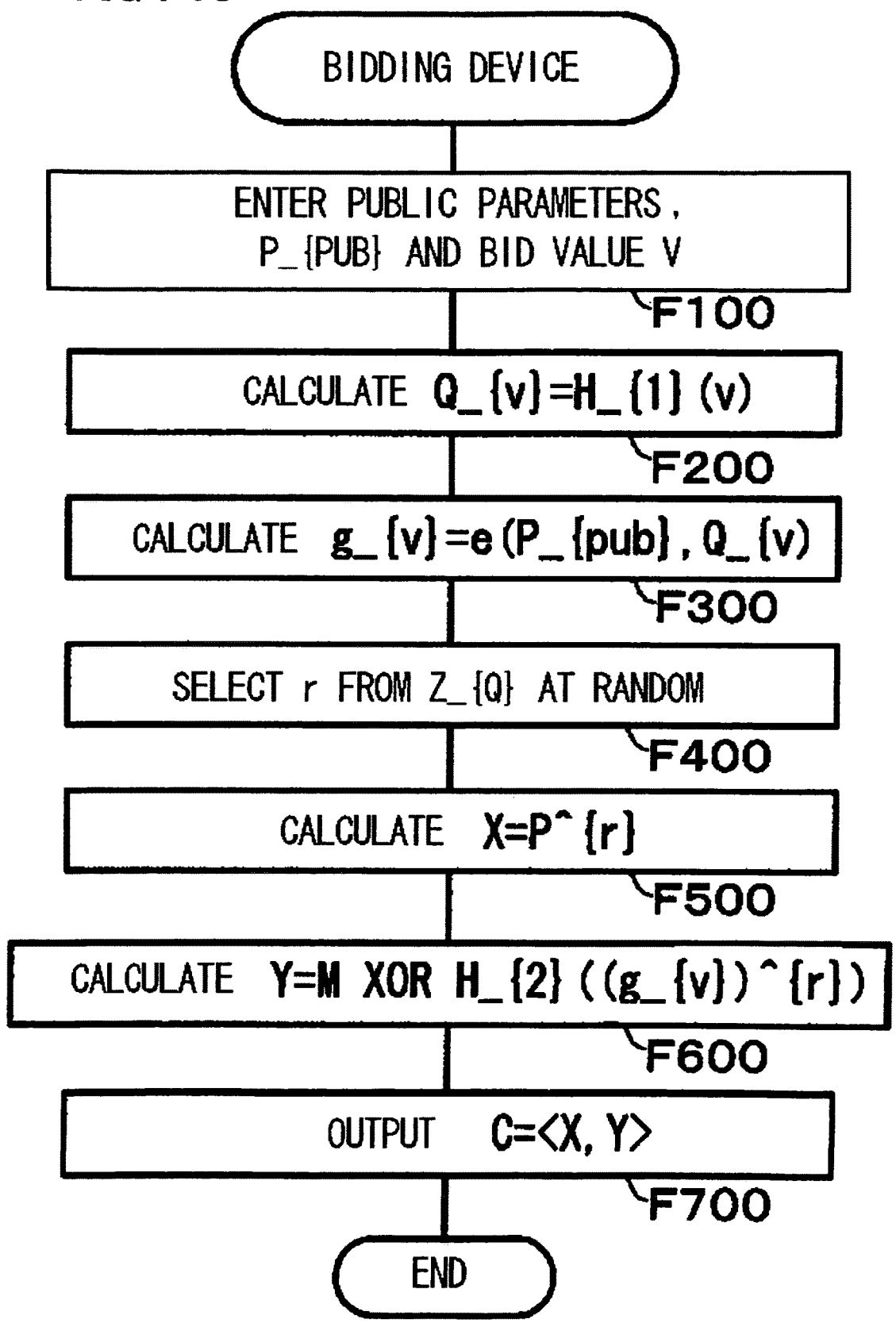
FIG. 13 is a flowchart showing an example of the bidding operation of the present exemplary embodiment.

The bidding operation is now described with reference to FIG. 13, which is a flowchart for illustrating an example of a bidding operation in the present Example. The public parameters, the IBE public key $P\_\{pub\}$ and the bid value v, described above, have been entered to the bidding device 300 (step F100). Initially, the IBE encrypting means 302 of the bidding device 300 calculates $Q\_\{v\}=H\_\{1\}(v)$ (step F200), and then calculates $g\_\{v\}=e(P\_\{pub\},Q\_\{v\})$ (step F300). The IBE encrypting means then calculates $g\_\{v\}=e(P\_\{pub\},Q\_\{v\})$ (step F300). The IBE encrypting means then selects r from $Z\_\{q\}$ at random (F400). The IBE encrypting means then calculates $X=P^{\wedge}\{r\}$ (F500) and then $Y=M \text{ XOR } H\_\{2\}((g\_\{v\})^{\wedge}\{r\})$ (F600). The IBE encrypting means then transmits $C=<X,Y>$ as encrypted bid data to the bid opening device 400 (F700). The IBE encrypting means 302 may at this time transmit a bit string, obtained on concatenating X and Y in accordance with a preset rule, as encrypted bid data C.

The bid opening device 400 receives encrypted bid data of each bidder from the bidding device 300. It is assumed that the bid opening device 400 has received encrypted bid data from a bidders before closing the bidding. In the following, the encrypted bid data of the respective bidders are denoted $C\_\{j\}=<X\_\{j\},Y\_\{j\}>$, where $1 \leq j \leq a$. The bid opening device 400 causes the received encrypted bid data $C\_\{1\}, \ldots, C\_\{a\}$ to be stored in the bid data memory 402.

Figure 14:
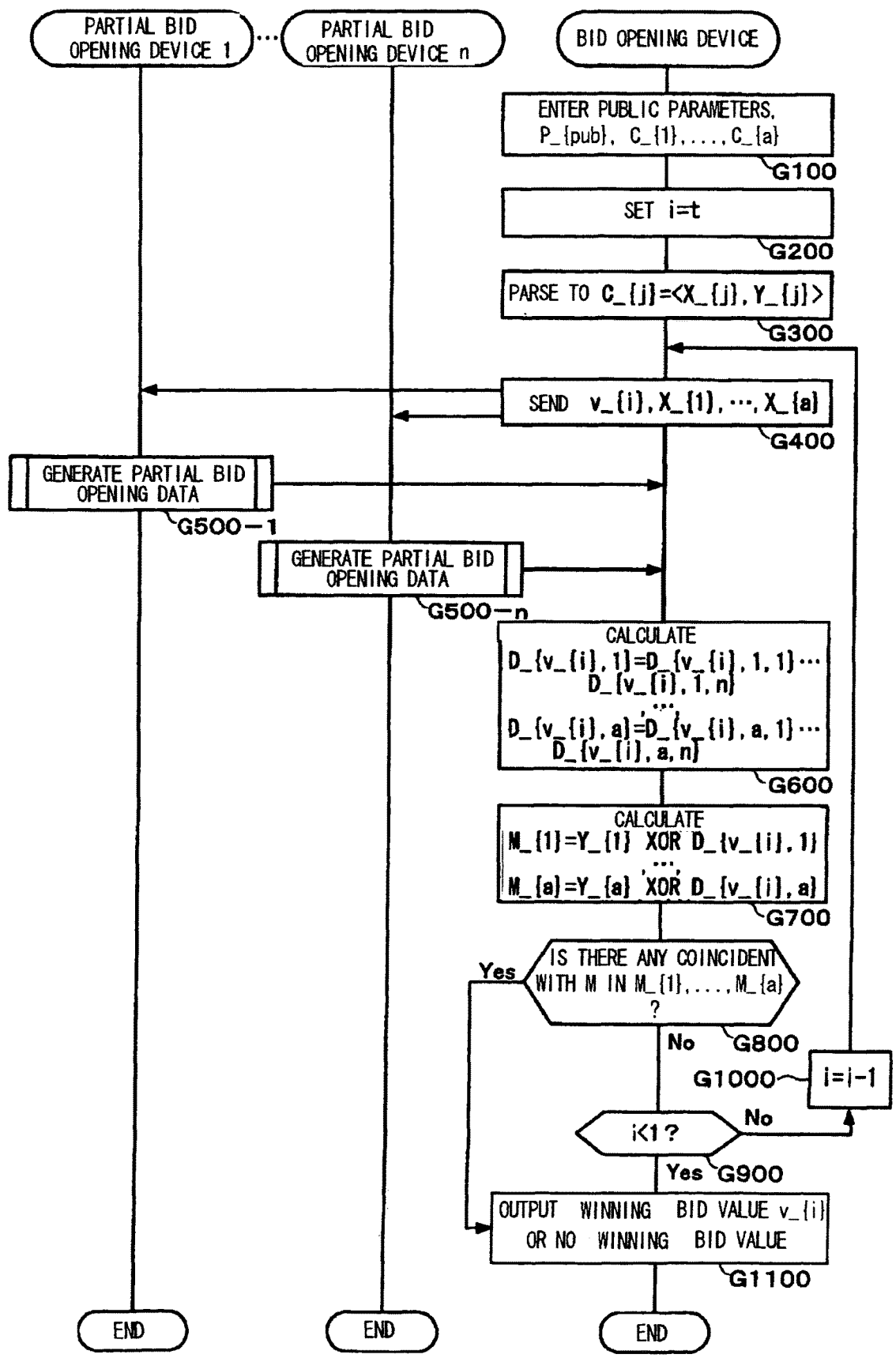
FIG. 14 is a flowchart showing an example of the bid opening operation of the present exemplary embodiment.
Figure 15:
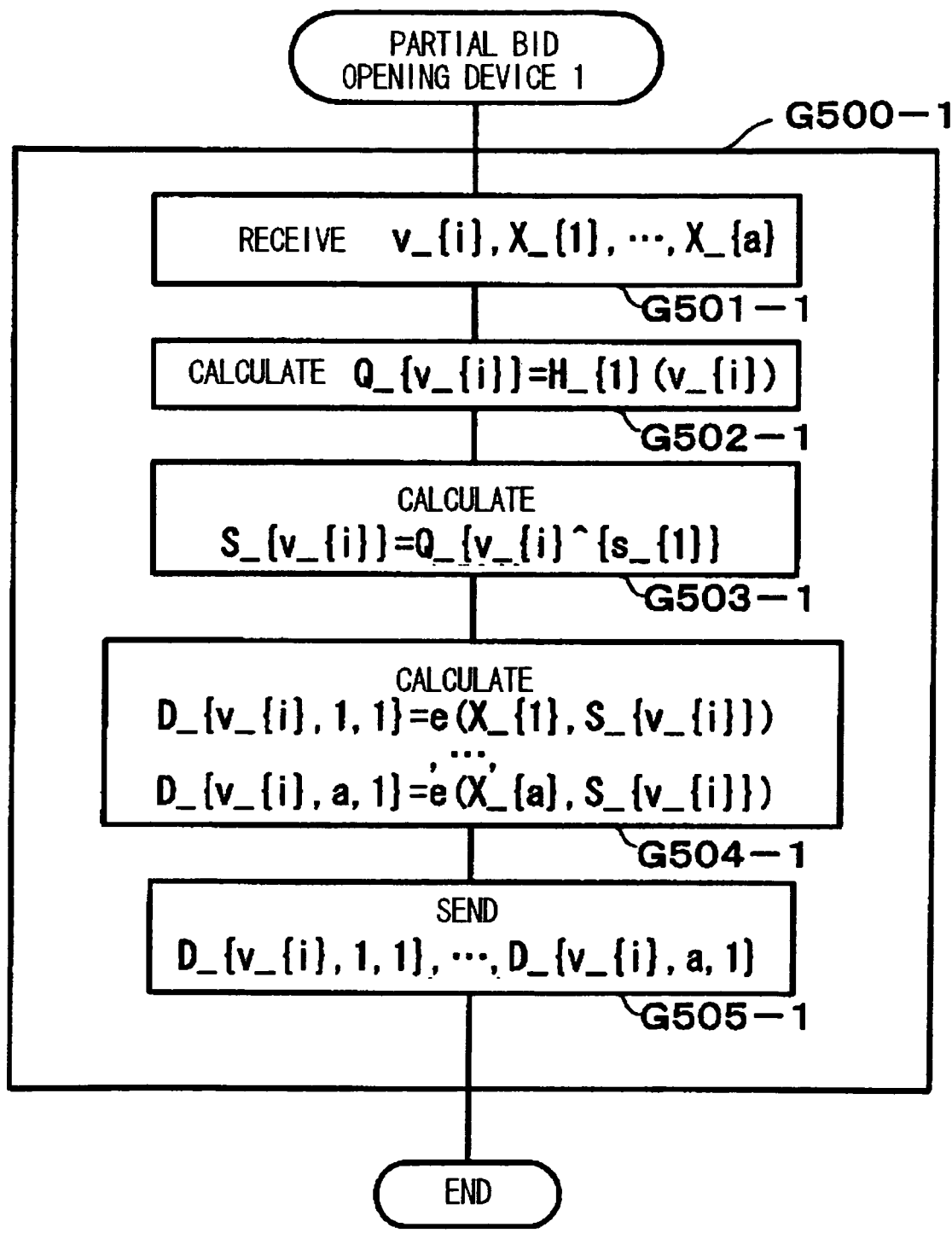
FIG. 15 is a flowchart showing an example of a bid opening data combining operation of the bid opening operation of the present exemplary embodiment.

Referring to FIGS. 14 and 15, the bid opening operation is now described. FIG. 14 is a flowchart for illustrating an exemplary operation of the present Example. FIG. 15 is a flowchart for illustrating an exemplary operation for generating partial bid opening data by the partial bid opening device 100-1 which is among the bid opening operations of the present Example. In the bid opening device 400, the public parameters, IBE public key $P\_\{pub\}$ and the encrypted bid data of all bidders $C\_\{1\}, \ldots, C\_\{a\}$ have been entered (step G100). Initially, the winning bid value candidate decision means 403 of the bid opening device 400 decides on the winning bid value candidate $v\_\{i\}$ (step C200). Here, the winning bid value candidate decision means 403 decides on a highest bid price $v\_\{t\}$ as being the winning bid value candidate (sets i=t).

The bid opening data generating means 404 then parses each j ($1 \leq j \leq a$) of the encrypted bid data of all bidders to be such that $C\_\{j\}=<X\_\{j\},Y\_\{j\}>$ (step C300), that is, decomposes $C\_\{j\}$ into $X\_\{j\},Y\_\{j\}$. The bid opening data generating means 404 then transmits the winning bid value candidate $v\_\{i\}$ and $X\_\{1\}, \ldots, X\_\{a\}$ as bid opening processing data to the partial bid opening devices 100-1 to 100-$n$ (step C400).

On receipt of the bid opening processing data, the partial bid opening devices 100 perform partial bid opening data generating processing (step G500). In the following, the partial bid opening device 100-1 is taken as an example for explanation. FIG. 15 is a flowchart for illustrating exemplary partial bid opening data generating processing by the partial bid opening device 100-1. Initially, the partial bid opening device 100-1 receives the winning bid value candidate $v\_\{i\}$ and $X\_\{1\}, \ldots, X\_\{a\}$ as bid opening processing data from the bid opening device 400 (step G501-1). The partial bid opening data generating means 105-1 of the partial bid opening device 100-1 first calculates $Q\_\{v\_\{i\}\}=H\_\{1\}(v\_\{i\})$ (step G502-1), and then calculates $S\{v\_\{1\}\})=Q\_\{v\_\{i\}\}^{\wedge}\{s\_\{1\}\}$ (step G502-1). The partial bid opening data generating means then calculates $D\_\{v\_\{i\},1,1\}=e(X\_\{1\},S\_\{v\_\{i\}\})$. The partial bid opening data generating means also calculates $D\_\{v\_\{i\},2,1\}, \ldots, D\_\{v\_\{i\},a,1\}$, for all bidders, in the same way as it calculates $D\_\{v\_\{i\},1,1\}$ (step G503-1). The partial bid opening data generating means 105-1 transmits the so calculated $D\_\{v\_\{i\},2,1\}, \ldots, D\_\{v\_\{i\},a,1\}$ as partial bid opening data #1 to the bid opening device 400 (step G504-1).

The other bid opening devices operate in similar manner. For example, the partial bid opening data generating means 105-$n$ of the partial bid opening device 100-$n$ calculates $Q\_\{v\_\{i\}\}=H\_\{1\}(v\_\{i\})$, $S\_\{v\_\{i\}\}=Q\_\{v\_\{i\}\}^{\wedge}\{s\_\{n\}\}$ and $D\_\{v\_\{i\}, 1,n\}=e(X\_\{1\},S\_\{v\_\{i\}\})$, while similarly calculating $D\_\{v\_\{i\},2,n\}, \ldots, D\_\{v\_\{i\},a,n\}$. The partial bid opening data generating means 105-$n$ transmits $D\_\{v\_\{i\},1,n\}, \ldots, D\_\{v\_\{i\},a,n\}$ as partial bid opening data # n to the bid opening device 400.

The bid opening device 400 receives partial bid opening data from the partial bid opening devices 100-1 to 100-$n$. The bid opening data generating means 404 of the bid opening device 400 calculates $D\_\{v\_\{i\},1\}=D\_\{v\_\{i\},1,1\} \cdot D\_\{v\_\{i\},1,2\} \cdot \ldots \cdot D\_\{v\_\{i\},1,n\}$, while calculating $D\_\{v\_\{i\},2\}, \ldots, D\_\{v\_\{i\},a\}$ for all bidders, in the same way as it calculates $D\_\{v\_\{i\},1\}$ (step G600-1). The IBE decrypting means 405 calculates $M\_\{1\}=Y\_\{1\} \text{ XOR } H\_\{2\} (D\_\{v\_\{i\},1\})$, with the bid opening data $D\_\{v\_\{i\}, 1\}, \ldots, D\_\{v\_\{i\},a\}$, public parameters and the encrypted bid opening data $C\_\{1\}, \ldots, C\_\{a\}$ of all bidders as inputs, while also calculating $M\_\{2\}, \ldots, M\_\{a\}$ for all bidders, in the same way as it calculates $M\_\{1\}$ (step G700).

The decision means 406 checks to see whether or not there is any among $M\_\{1\}, \ldots, M\_\{a\}$ that is coincident with the message for bidding M included in the public parameters (step G800). If there is any that is coincident with the message for bidding M, the decision means in a step G300 sets the winning bid value candidate $v\_\mu l$, decided on in step G200, as being the winning bid value (Yes of G800 and G1100). If there is none that is coincident with the message for bidding M, the decision means performs similar processing with the next winning bid value candidate. If there is no value which may prove the next winning bid value candidate (i<1), the decision means verifies that there is no winning bid value (Yes of step G900, G0100). If not, the decision means updates the winning bid value candidate to a value next closest to the bid closing condition, that is, sets i-i for i, and reverts to G400 (No of step G900, G1000).

Example 2

The operation in case the present invention is implemented using Example 2 is now described. In this Example, the electronic bidding system of the second exemplary embodiment of the present invention is implemented using the Boneh-Franklin IBE system. In the present Example, it is again presumed that there exist n partial bid opening devices 110 that execute distributed management of the secret information for decryption. It is further presumed that the partial bid opening device 110-1, partial bid opening device 110-2, . . . , partial bid opening device 110-$n$ are installed as the first, second, . . . , n'th base points, respectively. In the present example, the case of sequentially combining the IBE public key and the bid opening data, involved in group decryption, by the partial bid opening devices, is explained. The satisfying number of group decryption of the present exemplary embodiment is again n.

It should be noticed that the public parameters, similar to those of the first exemplary embodiment, are stored in the respective partial bid opening devices.

Figure 16:
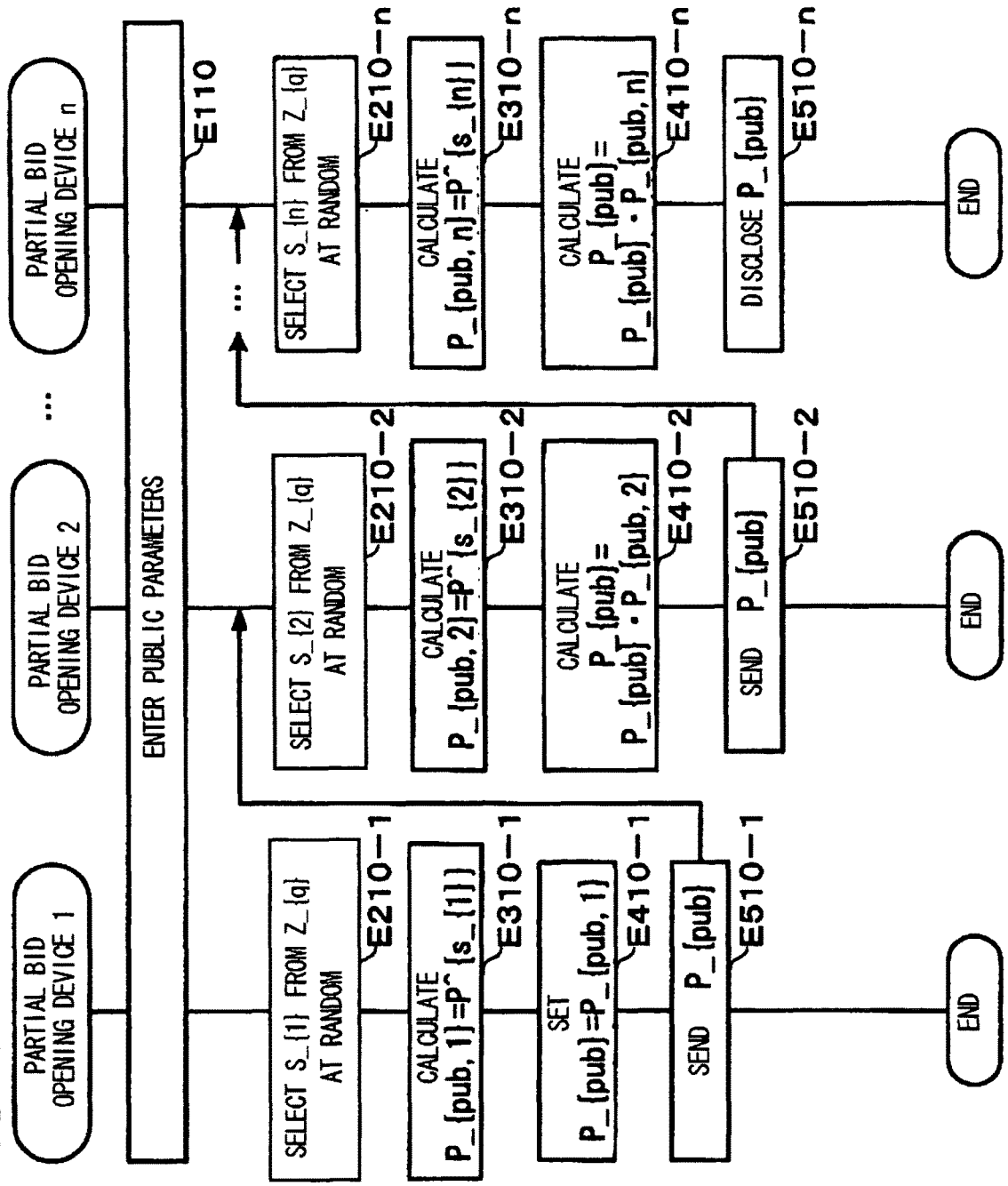
FIG. 16 is a flowchart showing an example of an IBE public key generating operation of the second exemplary embodiment.

Referring to FIG. 16, the operation of generating the IBE public key generating operation is described. FIG. 16 depicts a flowchart for illustrating an exemplary IBE public key generating operation in Example 2. The public parameters are already stored in the partial bid opening devices 110-1 to 110-$n$ (step E110). Initially, the partial bid opening device 110-1 is run in operation. The partial key generating means 102-1 of the partial bid opening device 110-1 selects $s\_\{1\}$ from $Z\_\{q\}$ at random (step E210-1) to cause the so selected $s\_\{1\}$ to be stored in the partial secret key memory 103-1. The partial public key generating means 114-1 then calculates $P\_\{pub,1\}=P^\{s\_\{1\}\}$ (step E310-1). Since the partial bid opening device 110-1 is the first base point, the partial public key generating means 114-1 sets $P\_\{pub\}=P\_\{pub,1\}$ and sends the so set $P\_\{pub\}$ to the partial bid opening device 110-2 as the next base point (step E410-1, E510-1).

The partial bid opening device 110-2 receives $P\_\{pub\}$ from the partial bid opening device 110-1 as the previous base point. The partial secret key generating means 102-2 of the partial bid opening device 110-2 selects $s\_\{2\}$ from $Z\_\{q\}$ at random (step E210-2) to cause the so selected $s\_\{2\}$ to be stored in the partial secret key memory 103-2. The partial public key generating means 114-2 then calculates $P\_\{pub,2\}=P^\{s\_\{2\}\}$ (step E310-2). Since the partial bid opening device 110-2 is the second or further following base point, the partial public key generating means 114-2 calculates $P\_\{pub\}=P^\{s\_\{2\}\}\cdot P\_\{pub\}$, and transmits the so calculated $P\_\{pub\}$ to the partial bid opening device 110-3 as the next base point (step E410-2, E510-2). A similar sequence of operations continues up to the partial bid opening device 110-($n$-1).

The partial bid opening device 110-$n$ receives $P\_\{pub\}$ from the partial bid opening device 110-($n$-1) as the previous base point. The partial secret key generating means 102-$n$ of the partial bid opening device 110-$n$ selects $s\_\{n\}$ from $Z\_\{q\}$ at random (step E210-$n$) to cause the so selected $s\_\{n\}$ to be stored in the partial secret key memory 103-$n$. The partial public key generating means 114-$n$ then calculates $P\_\{pub,n\}=P^\{s\_\{n\}\}$ (step E310-$n$). Since the partial bid opening device 110-$n$ is the last base point, the partial public key generating means 114-$n$ calculates $P\_\{pub\}=P^\{s\_\{n\}\}\cdot P\_\{pub\}$ and discloses the so calculated $P\_\{pub\}$ as an IBE public key (step E410-$n$, E510-$n$).

Figure 17:
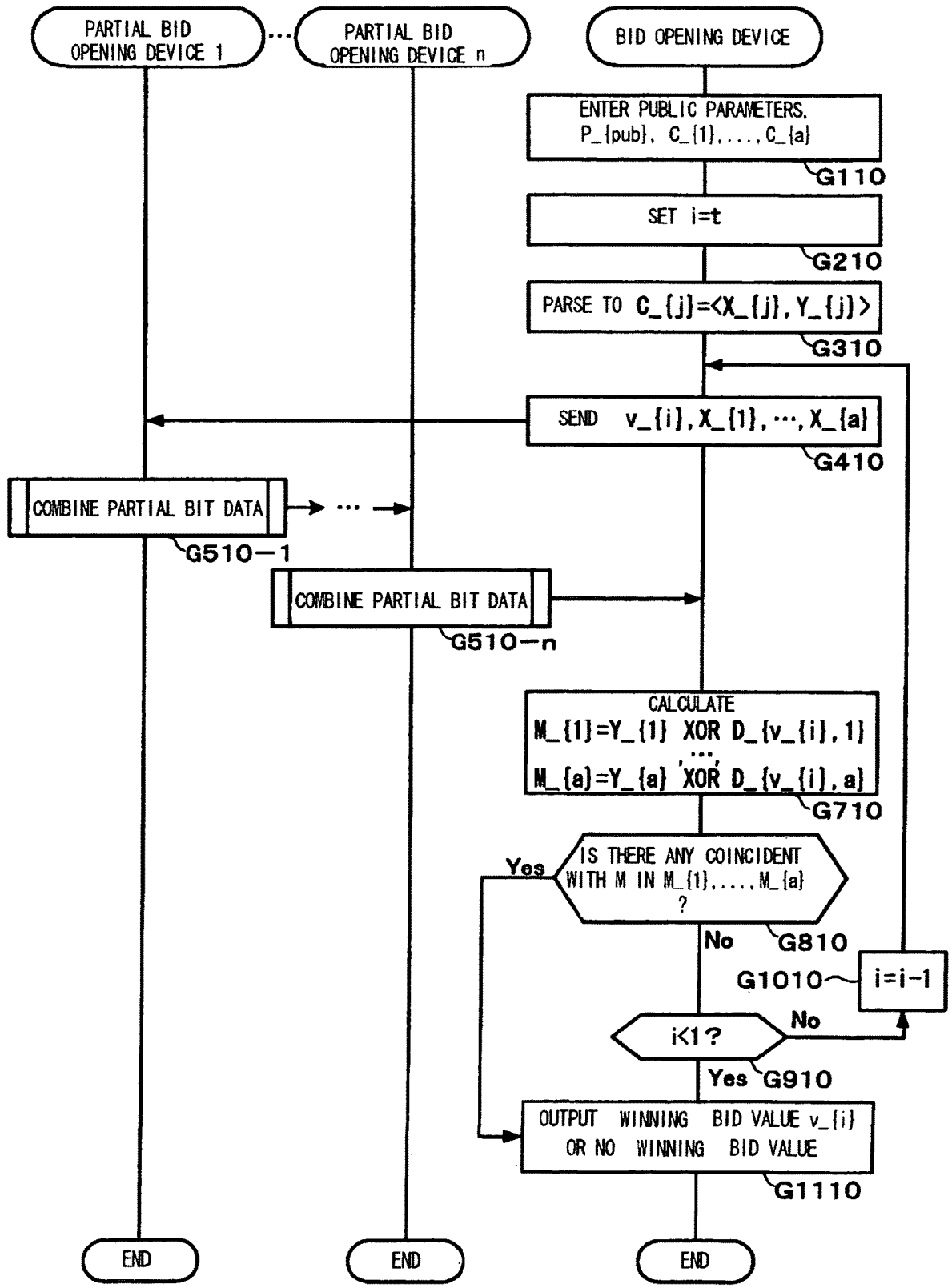
FIG. 17 is a flowchart showing an example of the bid opening operation of the second exemplary embodiment.
Figure 18:
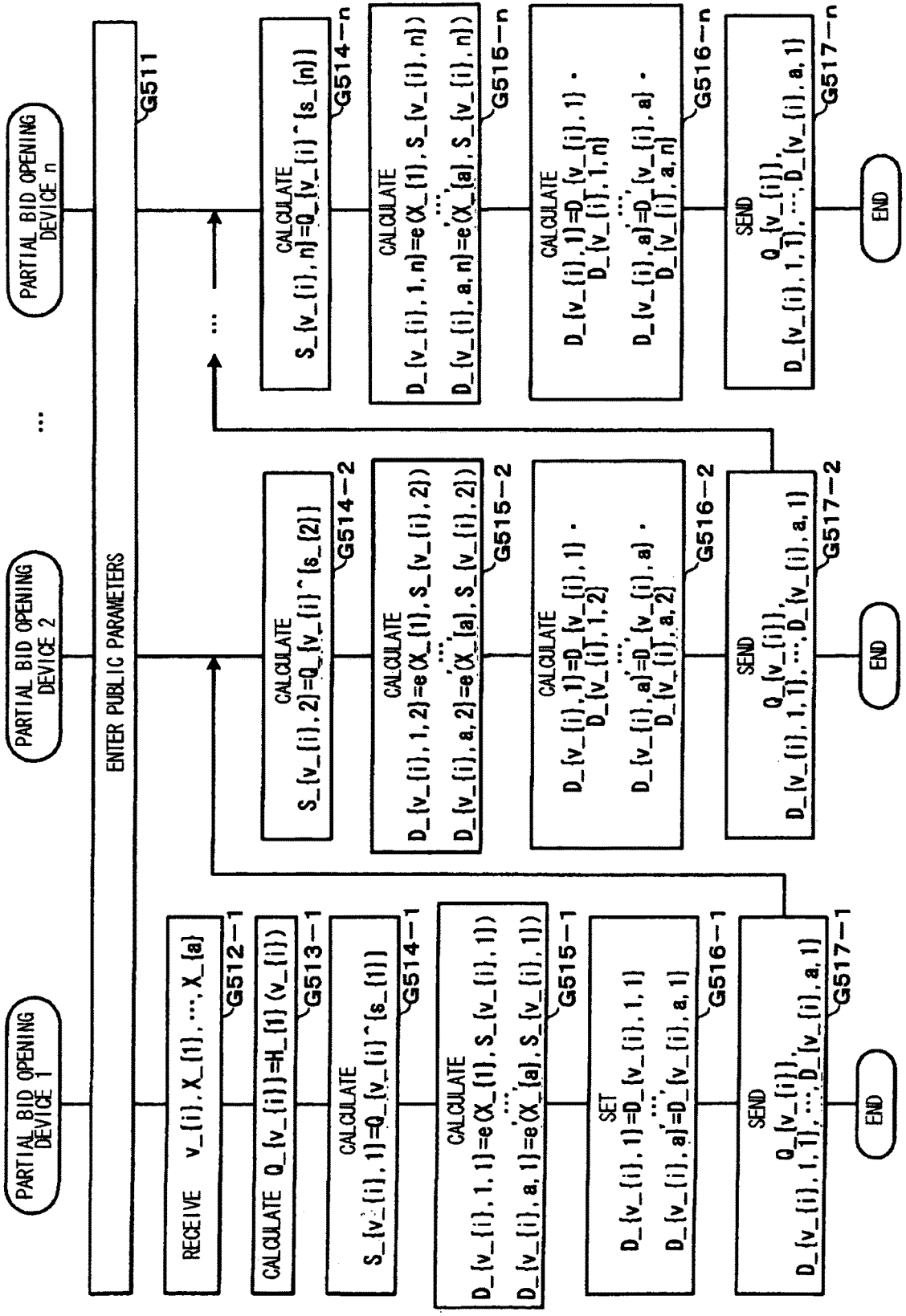
FIG. 18 is a flowchart showing an example of a bid opening data combining operation in the bid opening operation of the second exemplary embodiment.

Referring to FIGS. 17 and 18, the bid opening operation is now described. The bidding operation is the same as that of Example 1 and hence the description thereof is dispensed with. It is assumed here that the bid opening device has accepted bids from n bidders. FIG. 17 depicts a flowchart showing an example of the bid opening operation in Example 2. FIG. 18 is a flowchart for illustrating an exemplary operation of combination of bid opening data by the partial bid opening device 110 which is among the bid opening operations of the second exemplary embodiment. In the bid opening device 410, there are entered public parameters, IBE public key $P\_\{pub\}$ and encrypted bid data $C\_\{1\}, \ldots , C\_\{a\}$ of all bidders (step G110). Initially, the winning bid value candidate decision means 403 of the bid opening device 410 decides on the winning bid value candidate $v\_\{i\}$ (step G210). Here, the winning bid value candidate decision means 403 of the bid opening device 410 decides on the highest bid value $v\_\{t\}$ as the winning bid value candidate, that is, sets i=t.

The bid opening data generating means 414 then parses each j (1≤j≤a) of the encrypted bid data of all bidders to be such that $C\_\{j\}=<X\_\{j\},Y\_\{j\}>$ (step C310), that is, decomposes $C\_\{j\}$ into $X\_\{j\},Y\_\{j\}$. The bid opening data generating means 414 then transmits the winning bid value candidate $v\_\{i\}$ and $X\_\{i\}, \ldots , X\_\{a\}$ as bid opening processing data to the partial bid opening device 110-1 as the first base point (step G410).

On receipt of the bid opening processing data, the partial bid opening device 110-1 commences the operation of combining the bid opening data (step G510). There are initially entered public parameters and the IBE public key $P\_\{pub\}$ in each partial bid opening device 110 (step G511). On receipt of the bid opening processing data (step G512-1), the partial bid opening data generating means 115-1 of the partial bid opening device 110-1 initially calculates $Q\_\{v\_\{i\}\}=H\_\{1\}(v\_\{i\})$ (step G513-1). The partial bid opening means then calculates $S\_\{v\_\{i\},1\}=Q\_\{v\_\{i\}\}^\{s\_\{1\}\}$ (step G514-1), followed by $D\_\{v\_\{i\},1,1\}=e(X\_\{1\},S\_\{v\_\{i\},1\})$. It also calculates $D\_\{v\_\{i\},2,1\}, \ldots , D\_\{v\_\{i\},a,1\}$ for all bidders, in the same way as it calculates $D\_\{v\_\{i\},1,1\}$ (G515-1).

Since the partial bid opening device 110-1 is the first base point, the partial bid opening data generating means 115-1 sets $D\_\{v\_\{i\},1\}=D\_\{v\_\{i\},1,1\}$. It also sets $D\_\{v\_\{i\},2\}, \ldots , D\_\{v\_\{i\},a\}$, in the same way as it sets $D\_\{v\_\{i\}, 1\}$, and transmits the data to the partial bid opening device 110-2 as the next base point (steps G516-1, G517-1). Meanwhile, in transmitting the bid opening data to the next base point, the partial bid opening means transmits $Q\_\{v\_\{i\}\}$ and $X\_\{1\}, \ldots , X\_\{a\}$ included in the bid opening processing data.

The partial bid opening device 110-2 receives the bid opening data #1 and the bid opening processing data from the partial bid opening device 110-1 as the previous base point. The partial bid opening data generating means 115-2 of the partial bid opening device 110-2 calculates $S\_\{v\_\{i\},2\}=Q\_\{v\_\{i\}\}^\{s\_\{2\}\}$ (step G514-2). The partial bid opening means then calculates $D\_\{v\_\{i\},1,2\}=e(X\_\{1\},S\_\{v\_\{i\},2\})$. It also calculates $D\_\{v\_\{i\},2,2\}, \ldots , D\_\{v\_\{i\},a,2\}$, in the same way as it calculates $D\_\{v\_\{i\},1,2\}$ (G515-2). The partial public key generating means 114-2 calculates $D\_\{v\_\{i\},\}=D\_\{v\_\{i\},1,2\}\cdot D\_\{v\_\{i\},1\}$, using the bid opening data #1 as received from the partial bid opening device 110-1 as the previous base point. The partial public key generating means calculates $D\_\{v\_\{i\},2\}, \ldots , D\_\{v\_\{i\},a\}$ in the same way as it calculates $D\_\{v\_\{i\},1\}$ (step G516-2). It also transmits the so calculated $D\_\{v\_\{i\},1\}, \ldots , D\_\{v\_\{i\},a\}$ as bid opening data 2 to the partial bid opening device 110-3 as the next base point. The processing continues to the partial bid opening device 110-($n$-1) by a similar sequence of operations.

The partial bid opening device 110-$n$ receives the bid opening processing data and the bid opening data #(n-1) from the partial bid opening device 110-($n$-1) as the previous base point. The partial bid opening data generating means 115-$n$ of the partial bid opening device 110-$n$ calculates $S\_\{v\_\{i\},n\}=Q\_\{v\_\{i\}\}^\{s\_\{n\}\}$ (step S514-$n$). It then calculates $D\_\{v\_\{i\},1,n\}=e(X\_\{1\}S\_\{v\_\{i\},n\})$, and calculates $D\_\{v\_\{i\},2,n\}, \ldots , D\_\{v\_\{i\},a,n\}$, in the same way as it calculates $D\_\{v\_\{i\},1,n\}$ (step S515-$n$). The partial public key generating means 114-$n$ calculates $D\_\{v\_\{i\},1\}=D\_\{v\_\{i\},1,n\}\cdot D\_\{v\_\{i\},1\}$, using the bid opening data #(n-1) received from the partial bid opening device 110-($n$-1) as the previous base point. It also calculates $D\_\{v\_\{i\},2\}, \ldots , D\_\{v\_\{i\},a\}$ in the same way as it calculates $D\_\{v\_\{i\},1\}$ (step G516-2). Since the partial bid opening device 110-$n$ represents the last base point, the partial public key generating means 114-*n* sends D_{v_{i}, 1}, ..., D_{v_{i},a}, as bid opening data, to the bid opening device 410 (step G517-*n*).

The bid opening data generating means 414 of the bid opening device 410, which has received the bid opening data from the partial bid opening device 110-*n*, outputs the so received bid opening data to the IBE decrypting means 405. The subsequent operations are the same as those of the first exemplary embodiment and hence detailed description thereof is dispensed with.

Example 3

With reference to Example 3, the operation of the present invention is now described. This Example 3 is for a case of implementing an electronic bidding system of the third exemplary embodiment of the present invention using the Boneh-Franklin IBE system. It is assumed that, in the present Example 3, there are provided a bidding devices 320, depending on the number of bidders, and that an ID proper to each bidder is assigned to each bidding device 320. The ID of a bidding device 320-1 is labeled ID_{1}, while the ID of a bidding device 320-2 is labeled ID_{2}. The ID may, for example, be a name or a membership number and may be issued subject to pre-registration or by any other suitable method.

The public parameters of the present Example comprise a hash function H_{3}, in addition to the public parameters shown in the Example 1. The hash function H_{3} is a hash function from a set of binary sequences of arbitrary lengths to G_{1}. It should be noticed that the hash function H_{3} is a hash function different from H_{i}.

Figure 19:
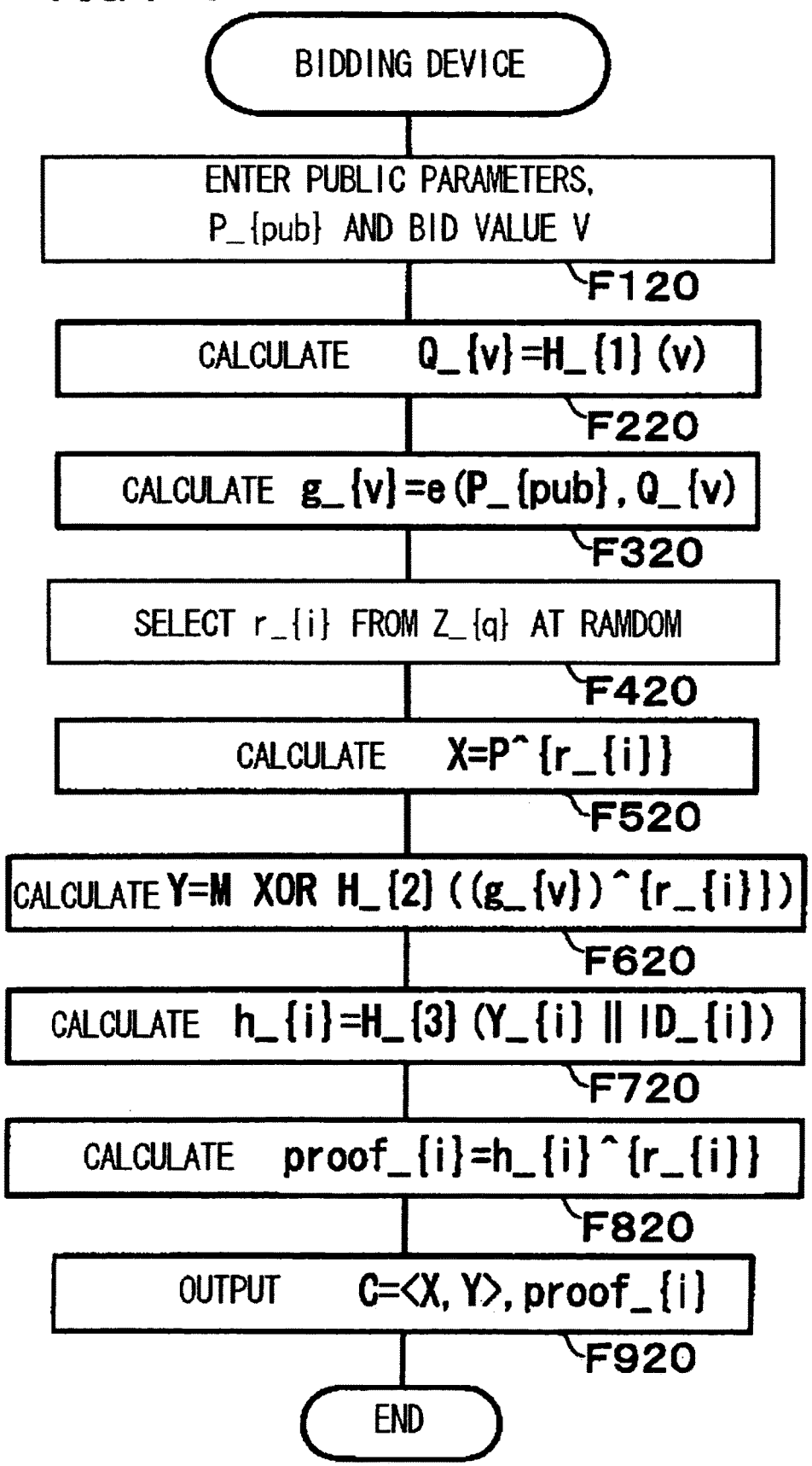
FIG. 19 is a flowchart showing an example of the bid opening operation of the third exemplary embodiment.

The present Example represents a concrete Example of the bidding operation and the verification operation in an electronic bidding system capable of proving the knowledge as regards the bid value. Meanwhile, the IBE public key generating operation and the bid opening operation are similar to those of the Example 1 and hence the description thereof is dispensed with. First, the bid opening operation is described with reference to FIG. 19, which is a flowchart showing an example of the bidding operation of Example 3. In the bidding device 320, the public parameters, the IBE public key P_{pub} and the bid value v are entered (step F120). In the bidding device 320, ID_{i}, an ID proper to a bidder, is also entered (1≤i≤a).

The IBE encrypting means 302 of the bidding device 320 first calculates Q_{v}=H_{1}(v) (step F220), and then calculates g_{v}=e(P_{pub},Q_{v}) (step F320). The IBE encrypting means then selects r_{i} from Z_{q} at random (F420). The IBE encrypting means then calculates X_{i}=P^{r_{i}} (F500). It then calculates Y_{i}=M XOR H_{2}((g_{v})^{r_{i}}) (F620).

The bid value knowledge proving means 323 then generates bid value knowledge proving data. In the present Example, the knowledge proving concerning the bid value is by proving the knowledge of r_{i}. The bid value knowledge proving means 323 first calculates h_{i}=H_{3} (Y_{i}||ID_{i}) (step F720), and then calculates proof_{i}=h_{i}^{r_{i}} (step F820). The bid value knowledge proving means 323 then transmits the generated bid value proof data proof_{i} and the encrypted bid data C_{i}=<X_{i},Y_{i}> to the verification device 520 (step F920). The verification device 520 causes proof_{i} and C_{i} of each bidder, received from the bidding device 320, to be stored in the memory that stores the encrypted bid data with bid value knowledge proof 522.

In the above-described method for proving the bid value knowledge, the possibility of finding proof_{i} without having the knowledge concerning r_{i} is extremely low. Should there exist a device that enables this, it should be possible to use such device to solve the discrete logarithm problem. This problem is one on which hinges the integrity of the major portion of the current public key encryption system, and the presence of such device would be so influential as to make most of the current public key encryption system unusable. However, it is extremely unlikely that such device would be available.

On the other hand, ID_{i}, which is a bidder's ID, is included in an input to the hash function H_{3}, so that, even if a bidder having an ID other than ID_{i} has copied this proof, he/she cannot pass verification, due to the collision resistance property of the hash function.

As to bid value knowledge proving, it is also possible to show the knowledge of r_{i} by zero knowledge proof, using the proving method shown in Non-Patent Document 4. In case of using the proving method shown in Non-Patent publication 4, h_{i}=H_{3} (Y_{i}||ID_{i}) is first calculated, and R_{i} is then selected from Z_{q} at random. Then, α_{i}=P^{R_{i}} and t_{i}=R_{i}+h_{i}·r_{i} are calculated in this order. Then, proof_{i}=(α_{i},t_{i}) is set.

Figure 20:
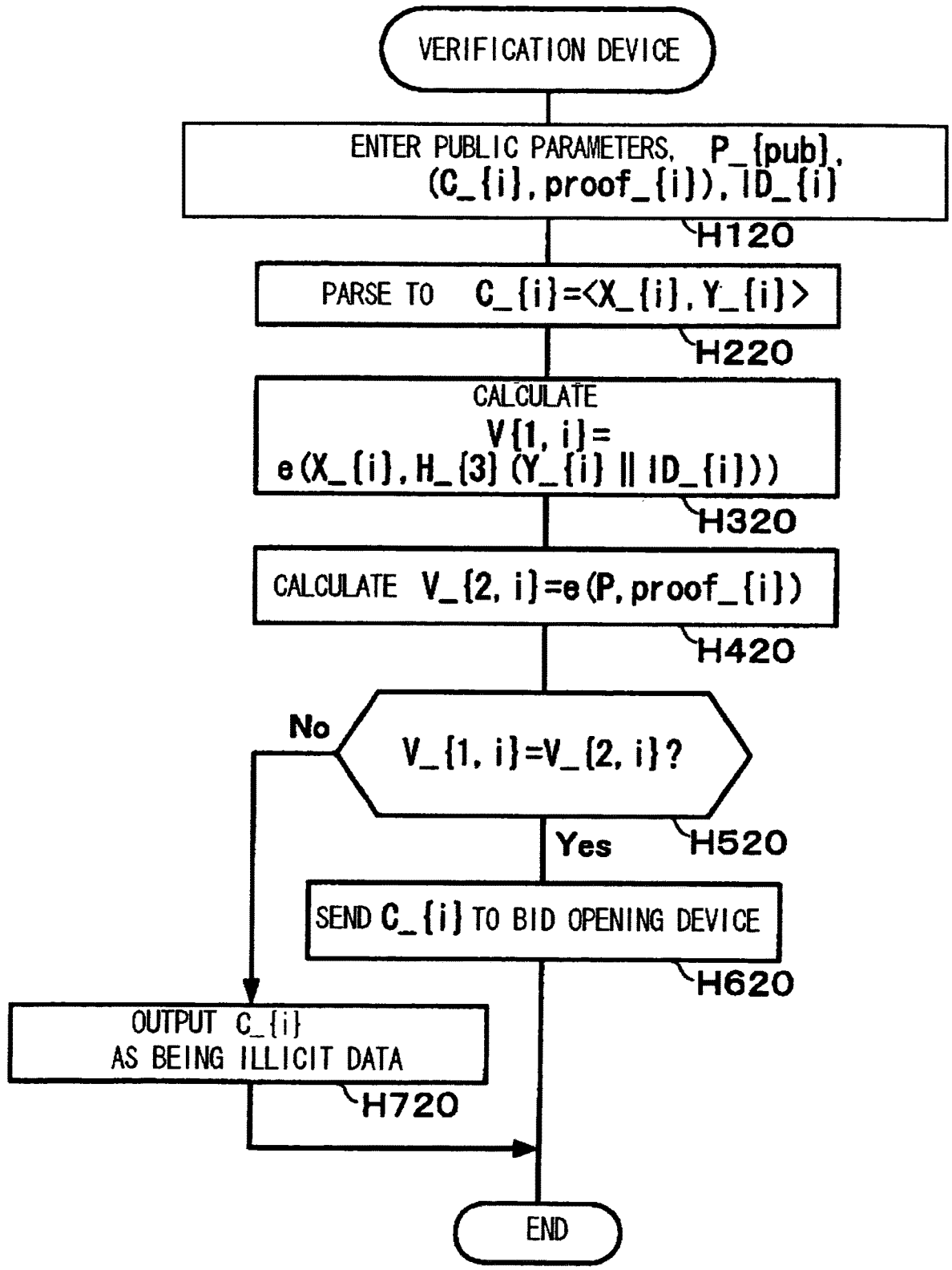
FIG. 20 is a flowchart showing an example of a verification operation of the third exemplary embodiment.

The verification operation is now explained with reference to FIG. 20, which shows an example of the verification operation in Example 3. In the verification device 520, the public parameters, IBE public key P_{pub} and the encrypted bid data with bid value knowledge proving (C_{i},proof_{i}) and ID_{i} have been entered (step H120). The verification means 523 of the verification device 520 parses the encrypted bid data C_{i} into C_{i}=<X_{i}, Y_{i}> (step H220). That is, C_{i} is decomposed into X_{i} and Y_{i}. The verification means then calculates V_{1,i}=e(X_{i},H_{3} (Y_{i}||ID_{i})) (step H320). It further calculates V_{2,i}=e(P,proof_{i}) (step H420).

The verification means 523 then verifies V_{1,i}=V_{2,i} (step H520). Should this equation hold, the verification means verifies the bid value knowledge proof data to be correct and transmits C_{i} to the bid opening device 400 (step H620). If the equation does not hold, the verification means verifies the data to be illicit and outputs that tenor (step H720). This verification operation is carried out for data of all bidders C_{1},proof_{1}), ..., (C_{a}, proof_{a}).

If the proving method of Non-Patent Document 4 is used as the bid value knowledge proving, (α_{i},t_{i}) is entered to the verification device 520 as proof_{i}. By way of the verification operation for such case, V_{1,i}=P^{t_{i}} is calculated, followed by V_{2,i}=α_{i}·X_{i}^(H_{3} (Y_{i}||ID_{i}). It is then verified if V_{1,i}=V_{2,i} holds. If the equation holds, the verification device assumes the bid value knowledge proof data is correct and accordingly sends C_{i} to the bid opening device 400. If the equation does not hold, the verification device assumes that the data is not correct and outputs that tenor.

Example 4

With reference to Example 4, the operation of the present invention is now described. This Example 4 is for a case of implementing an electronic bidding system of the fourth exemplary embodiment of the present invention using the Boneh-Franklin IBE system. The present Example 4 is a combination of Examples 2 and 3. It is assumed that, in the present Example 4, there are provided n bidding devices 110 that perform distributed management of the secret information for decryption. It is also assumed that the partial bid opening device 110-1, partial bid opening device 110-2, . . . , partial bid opening device 110-n are installed on the first, second, . . . , n'th base point, respectively. It is further assumed that there are bidding devices 320, depending on the number of the bidders, and that an ID proper to each bidder is pre-assigned to each bidding device 320. Meanwhile, the public parameters in the present Example are similar to those of the Example 3

Initially, the IBE public key generating operation is described. The operation of generating the IBE public key is similar to that of the Example 2 shown in FIG. 16, and public parameters have been entered to the partial bid opening devices 110-1 to 110-n (step E110). Initially, the partial bid opening device 110-1 is in operation. The partial secret key generating means 102-1 of the partial bid opening device 110-1 first selects $s\_\{1\}$ from $Z\_\{q\}$ (step E210-1) and causes the so selected $s\_\{1\}$ to be stored in the partial secret key memory 103-1. The partial public key generating means 114-1 then calculates $P\_\{pub,1\}=P\^\{s\_\{1\}\}$ (step E310-1). Since the partial bid opening device 110-1 is the first base point, the partial public key generating means 114-1 sets $P\_\{pub\}=P\_\{pub,1\}$ and transmits the public key to a partial bid opening device 110-2 as the next base point (step E410-1, E510-1).

The partial bid opening device 110-2 receives $P\_\{pub\}$ from the partial bid opening device 110-1 as the previous base point. The partial secret key generating means 102-2 of the partial bid opening device 110-2 selects $s\_\{2\}$ from $Z\_\{q\}$ at random (step E210-2) and causes the so selected $s\_\{2\}$ to be stored in the partial secret key memory 103-2. The partial public key generating means 114-2 then calculates $P\_\{pub,2\}=P\^\{s\_\{2\}\}$ (step E310-2). Since the partial bid opening device 110-2 is the second or further following base point, the partial public key generating means 114-2 calculates $P\_\{pub\}=P\^\{s\_\{2\}\}\cdot P\_\{pub\}$ and sends the so calculated $P\_\{pub\}$ to a partial bid opening device 110-3 as the next base point (step A410-2). The operation continues in similar manner up to the partial bid opening device 110-(n−1).

Finally, the partial bid opening device 110-n receives $P\_\{pub\}$ from the partial bid opening device 110-(n−1) as the previous base point. The partial secret key generating means 102-n of the partial bid opening device 110-n selects $s\_\{n\}$ from $Z\_\{q\}$ at random (step E210-n) to cause the so selected $s\_\{n\}$ to be stored in the partial secret key memory 103-n. The partial public key generating means 114-n then calculates $P\_\{pub,n\}=P\^\{s\_\{n\}\}$ (step E310-n). Since the partial bid opening device 110-n is the last base point, the partial public key generating means 114-n calculates $P\_\{pub\}=P\^\{s\_\{n\}\}\cdot P\_\{pub\}$ and discloses the so calculated $P\_\{pub\}$ as an IBE public key (step E410-n).

The bidding operation is now described. The bidding operation is similar to that of the Example 3 shown in FIG. 19. In the bidding device 320, public parameters, IBE public key $P\_\{pub\}$ and the bid value v have been entered (step F120). In the bidding device 320, $ID\_\{i\}$, an ID proper to each bidder, has also been entered (1≤i≤a). The IBE encrypting means 302 of the bidding device 320 first calculates $Q\_\{v\}=H\_\{1\}(v)$ (step F220), and then selects $r\_\{i\}$ from $Z\_\{q\}$ at random. It then calculates $X\_\{i\}=P\^\{r\_\{i\}\}$ (F500) and then calculates $Y\_\{i\}=M \text{ XOR } H\_\{2\}((g\_\{v\})\^\{r\_\{i\}\})$ (F620).

The bid value knowledge proving means 323 then generates bid value knowledge proving data. In the present Example, knowledge proving concerning the bid value is by knowledge proving of $r\_\{i\}$. The bid value knowledge proving means 323 first calculates $h\_\{i\}=H\_\{3\}(Y\_\{i\}\|ID\_\{i\})$ (step F720), and then calculates $proof\_\{i\}=h\_\{i\}\^\{r\_\{i\}\}$ (step F820). The bid value knowledge proving means 323 then transmits the generated bid value knowledge proving data $proof\_\{i\}$ and encrypted bid value data $C\_\{i\}=<X\_\{i\},Y\_\{i\}>$ to the verification device 520 (step F920). The verification device 520 causes $proof\_\{i\}$ and $C\_\{i\}$, received from the bidding device 320, to be stored in the memory that stores the encrypted bid data with bid value knowledge proof 522.

By way of proving the bid value knowledge, the knowledge concerning $r\_\{i\}$ may be proved by zero knowledge proof by using the proving method appearing in Non-Patent Document 4. When using the proving method appearing in Non-Patent Document 4, $h\_\{i\}=H\_\{3\}(Y\_\{i\}\|ID\_\{i\}$ is initially calculated, and $R\_\{i\}$ is selected at random from $Z\_\{q\}$. Then, $\alpha\_\{i\}=P\^\{R\_\{i\}\}$ and $t\_\{i\}=R\_\{i\}+h\_\{i\}\cdot r\_\{i\}$ are calculated in this order. Then, $proof\_\{i\}=(\alpha\_\{i\},t\_\{i\})$ is set.

The operation of verification is now described. This operation of verification is similar to that in the Example 3 shown in FIG. 20. In the verification device 520, the public parameters, IBE public key $P\_\{pub\}$ and the encrypted bid data with bid value knowledge proof $(C\_\{i\},proof\_\{i\}))$ have been entered (step H120). First, the verification means 523 of the verification device 520 parses the encrypted bid data $C\_\{i\}$ into $C\_\{i\}=<X\_\{i\}$ and $Y\_\{i\}>$ (step H220). That is, it decomposes $C\_\{i\}$ into p $X\_\{i\}$ and $Y\_\{i\}$. It then calculates $V\_\{1,i\}=e(X\_\{i\},H\_\{3\}(Y\_\{i\}\|ID\_\{i\}))$ (step H320), and then calculates $V\_\{2,i\}=e(P,proof\_\{i\})$ (step H420).

The verification means 523 then verifies whether or not $V\_\{1,i\}=V\_\{2,i\}$ holds (step H520). If the equation holds, the verification means assumes that the bid value knowledge proving data is correct and sends $C\_\{i\}$ to the bid opening device 400 (step H620). If the equation does not hold, the verification means verifies the data to be illicit and outputs that tenor (step H720). This operation of verification is carried out for $C\_\{1\},proof\_\{1\}), \ldots , (C\_\{a\},proof\_\{a\})$, that is, for data of all bidders.

In case the proving method described in Non-Patent Document 4 is used for proving the bid value knowledge, $(\alpha\_\{i\},t\_\{i\})$ is entered as $proof\_\{i\}$ to the verification device 520. By way of the verification operation for such case, $V\_\{1,i\}=P\^\{t\_\{i\}\}$ is initially calculated. $V\_\{2,i\}=\alpha\_\{i\}\cdot X\_\{i\}\^\{H\_\{3\}(Y\_\{i\}\|ID\_\{i\})\}$ is then calculated, and it is then verified whether or not $V\_\{1,i\}=V\_\{2,i\}$ holds. If the equation holds, the verification device presumes that the bid value knowledge proving data is correct, and sends $C\_\{i\}$ to the bid opening device 400. If the equation does not hold, the verification device presumes that the data is illicit and outputs that tenor.

The bid opening operation is now described. The bid opening operation is similar to that of the Example 2 shown in FIGS. 17 and 18. In the bid opening device 410, the public parameters, the IBE public key $P\_\{pub\}$ and $C\_\{1\}, \ldots , C\_\{a\}$, that is, data of all bidders, have been entered (step G110). Initially, the winning bid value candidate decision means 403 of the bid opening device 410 decides on the winning bid value candidate $v\_\{i\}$ (step G210). Here, the winning bid value candidate decision means 403 initially decides on the highest bid value $v\_\{t\}$ as being the winning bid value candidate, that is, sets i=t.

Then, the bid opening data generating means 414 parses each j (1≤j≤a) of encrypted bid value data of all bidders so that $C\_\{j\}=<X\_\{j\},Y\_\{j\}>$ (step G310): That is, it decomposes $C_{j}$ into $X_{j}$ and $Y_{j}$. The bid opening data generating means then transmits the winning bid value candidate $v_{i}$ and $X_{1}, \ldots, X_{a}$, as bid opening processing data, to the partial bid opening device 110-1 as the first base point (step G410).

On receipt of the bid opening processing data, the partial bid opening device 110-1 commences the operation of combining the bid opening data (step G510). Referring to FIG. 18, the public parameters and the IBE public key $P_{pub}$ have been entered at the outset in each partial bid opening device 110 (step G511). On receipt of the bid opening processing data (step G512-1), the partial bid opening data generating means 115-1 of the partial bid opening device 110-1 initially calculates $Q_{v_{i}} = H_{1}(v_{i})$ (step G513-1). It then calculates $S_{v_{i}, 1} = Q_{v_{i}}^{s_{1}}$ (step G514-1) and calculates $D_{v_{i}, 1, 1} = e(X_{1}, S_{v_{i}, 1})$. It also calculates $D_{v_{i}, 2, 1}, \ldots, D_{v_{i}, a, 1}$ for all bidders, in the same way as it calculates $D_{v_{i}, 1, 1}$ (step G515-1).

Since the partial bid opening device 110-1 is the first base point, the partial bid opening data generating means 115-1 sets $D_{v_{i}, 1} = D_{v_{i}, 1, 1}$, while also setting $D_{v_{i}, 2}, \ldots, D_{v_{i}, a}$ in the same way as it sets $D_{v_{i}, 1}$. The partial bid opening means transmits the data so set to the partial bid opening device 110-2 as the next base point (steps G516-1 and G517-1). It should be noticed that, when the bid opening data is sent to the next base point, $Q_{v_{i}}$ and $X_{1}, \ldots, X_{a}$ are also transmitted included in the bid opening processing data.

The partial bid opening device 110-2 receives bid opening data #1 and bid opening processing data from the partial bid opening device 110-1 as the previous base point. The partial bid opening data generating means 115-2 of the partial bid opening device 110-2 calculates $S_{v_{i}, 2} = Q_{v_{i}}^{s_{2}}$ (step G514-2) and then calculates $D_{v_{i}, 1, 2} = e(X_{1}, S_{v_{i}, 2})$. It also calculates $D_{v_{i}, 2, 2}, \ldots, D_{v_{i}, a, 2}$, in the same way as it calculates $D_{v_{i}, 1, 2}$ (step G515-2). The partial public key generating means 114-2 calculates $D_{v_{i}, 1} = D_{v_{i}, 1, 2} \cdot D_{v_{i}, 1}$, using the bid opening data #1 received from the partial bid opening device 110-1 as the previous base point. It also calculates $D_{v_{i}, 2}, \ldots, D_{v_{i}, a, 2}$, in the same way as it calculates $D_{v_{i}, 1}$ (step G516-2). Then, it transmits so calculated $D_{v_{i}, 1}, \ldots, D_{v_{i}, a}$ as bid opening data #2 to the partial bid opening device 110-3 as the next base point (step G517-2). This sequence of operations continues up to the partial bid opening device 110-($n-1$).

Finally, the partial bid opening device 110-$n$ receives bid opening data #(n-1) and the bid opening processing data from the partial bid opening device 110-($n-1$) as the previous base point. The partial bid opening data generating means 115-$n$ of the partial bid opening device 110-$n$ calculates $S_{v_{i}, n} = Q_{v_{i}}^{s_{n}}$ (step G514-$n$). It also calculates $D_{v_{i}, 1, n} = e(X_{1}, S_{v_{i}, n})$, while also calculating $D_{v_{i}, 2, n}, \ldots, D_{v_{i}, a, n}$ in the same way as it calculates $D_{v_{i}, 1, n}$ (step G515-$n$). The partial public key generating means 114-$n$ calculates $D_{v_{i}, 1} = D_{v_{i}, 1, n} \cdot D_{v_{i}, 1}$, using the bid opening data #(n-1) as received from the partial bid opening device 110-($n-1$) as the previous base point. The partial public key generating means 114-$n$ also calculates $D_{v_{i}, 2}, \ldots, D_{v_{i}, a}$, in the same way as it calculates $D_{v_{i}, 1}$ (step G516-$n$). Since the partial bid opening device 110-$n$ is the last base point, the partial public key generating means 114-$n$ sends $D_{v_{i}, 1}, \ldots, D_{v_{i}, a}$ as bid opening data to the bid opening device 410 (step G517-$n$).

The bid opening data generating means 414 of the bid opening device 410, which has received bid opening data from the partial bid opening device 110-$n$, outputs the received bid opening data to the IBE decrypting means 405. The subsequent operations are the same as those of the first exemplary embodiment and hence the description thereof is dispensed with.

Example 5

With reference to Example 5, the operation of the present invention is now described. This Example 5 is for a case of implementing an electronic bidding system of the first exemplary embodiment of the present invention using the Boneh-Franklin IBE system. It is assumed that, in the present Example 5, there are provided n partial bidding devices 110 that perform distributed management of the secret information for decryption. The satisfying number of group decryption in the present Example is n.

Figure 21:
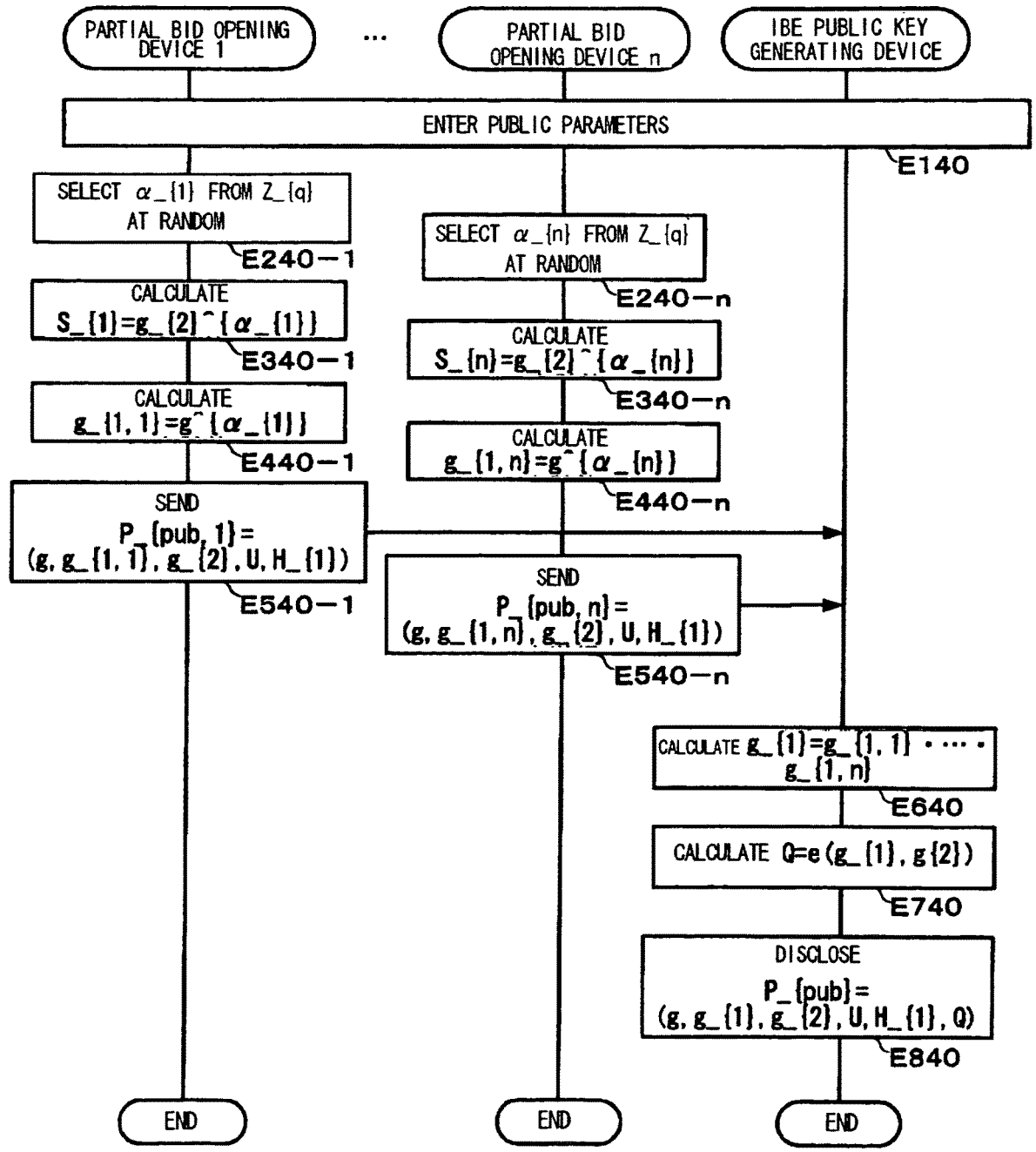
FIG. 21 is a flowchart showing an example of an IBE public key generating operation of a fifth exemplary embodiment.

The operation of generating the IBE public key is now described with reference to FIG. 21, which shows an exemplary operation of generating the IBE public key of the present Example 5. In the partial bid opening devices 100-1 to 100-$n$ and in the IBE public key generating device 200, public parameters are entered (step E140). As the public parameters, the list of bid prices $v_{t} = \{v_1, \ldots, v_t\}$, a security parameter k ($1 \le k$), the alphabet size s, a set $\Sigma$ of alphabets made up of s symbols, primes q, pairing sets $(G_{1}, G_{T}, e(\cdot, \cdot))$, range N of the hash function, a group $\{H\}$ of the hash function, a hash function $H_{1}$, a message for bidding M, generators g, $g_{2}$ and a N×m matrix $U = (u_{i}\{j\})$ ($1 \le i \le N, 1 \le j \le m$) are entered.

The list of bid prices $v_{t} = \{t_1, \ldots, v_t\}$ is a set of bid values that may be coped with by bidding, where $v_t$ denotes the highest value in the bid price band. The prime q is the number of elements of $G_{1}, G_{T}$ in the pairing set. The pairing set $(G_{1}, G_{T}, e(\cdot, \cdot))$ is a finite group in which $G_{1}$ and $G_{T}$ have the same order q, and $e(\cdot, \cdot)$ is a mapping from $G_{1} \times G_{1}$ to $G_{T}$. For arbitrary elements g, h in $G_{1}$, x and y, $e(g^x, h^y) = e(g, h)^{xy}$ holds and, in case g is a generator of $G_{1}$, $e(g, g) \ne 1$ holds. The hash function $H_{1}$ is a hash function from a set of binary sequences of an arbitrary length to $G_{1}$. The hash function $H_{1}$ is a hash function selected at random from the group $\{H\}$ from a set of binary sequences of an arbitrary length to a set of an entire column of a length N provided by $\Sigma$. The message for bidding M is an element of $G_{T}$. Moreover, both g and $g_{2}$ are generators of $G_{1}$. The matrix U is such that $U = (u_{i}\{j\})$ ($1 \le N, 1 \le j \le m$), with $u_{i}\{j\}$ being an element of $G_{1}$.

The partial bid opening devices 100-1 to 100-$n$ each operate as shown below. The partial bid opening device 100-1 is taken as an example for explanation. First, the partial secret key generating means 102-1 of the partial bid opening device 100-1 selects $\alpha_{1}$ from $Z_{q}$ at random (step E240-1). Then, $S_{1} = g_{2}^{\{\alpha_{1}\}}$ is calculated and $S_{1}$ is stored in the partial secret key memory 103-1 (step E340-1). The partial public key generating means 104-1 then calculates $g_{1,1} = g^{\{\alpha_{1}\}}$ (step E440-1). The partial public key generating means then sets $P_{pub, 1} = (g, g_{1,1}, g_{2}, U, H_{1})$ and sends it to the IBE public key generating device 200 (step E540-1).

The other partial bid opening devices 1 operate in similar manner. First, the partial secret key generating means 102-$n$ of the partial bid opening device 100-*n* selects $\alpha\_\{n\}$ from $Z\_\{q\}$ at random (step E240-*n*). Then, $S\_\{n\}=g\_\{2\}^{\{\alpha\_\{n\}\}}$ is calculated and $S\_\{n\}$ is stored in the partial secret key memory 103-1 (step E340-*n*). The partial public key generating means 104-1 then calculates $g\_\{1,n\}=g^{\{\alpha\_\{n\}\}}$ (step E440-*n*). The partial public key generating means then sets $P\_\{pub,n\}=(g,g\_\{1,n\},g\_\{2\},U,H\_\{1\})$ and sends it to the IBE public key generating device 200 (step E540-*n*).

The IBE public key generating device 200 receives $P\_\{pub,1\},\ldots,P\_\{pub,n\}$ from the partial bid opening devices 100-1 to 100-*n*. The IBE public key generating means 202 of the IBE public key generating device 200 calculates $g\_\{1\}=g\_\{1,1\}\cdot g\_\{1,2\}\cdot\ldots\cdot g\_\{1,n\}$, with $P\_\{pub,1\},\ldots,P\_\{pub,n\}$ as inputs (step E640). The IBE public key generating means then calculates $Q=e(g\_\{1\},g\_\{2\})$ (step E740). The IBE public key generating means then discloses $P\_\{pub\}=(g,g\_\{1\},g\_\{2\},U,H\_\{1\},Q)$ as the IBE public key (step E840).

Figure 22:
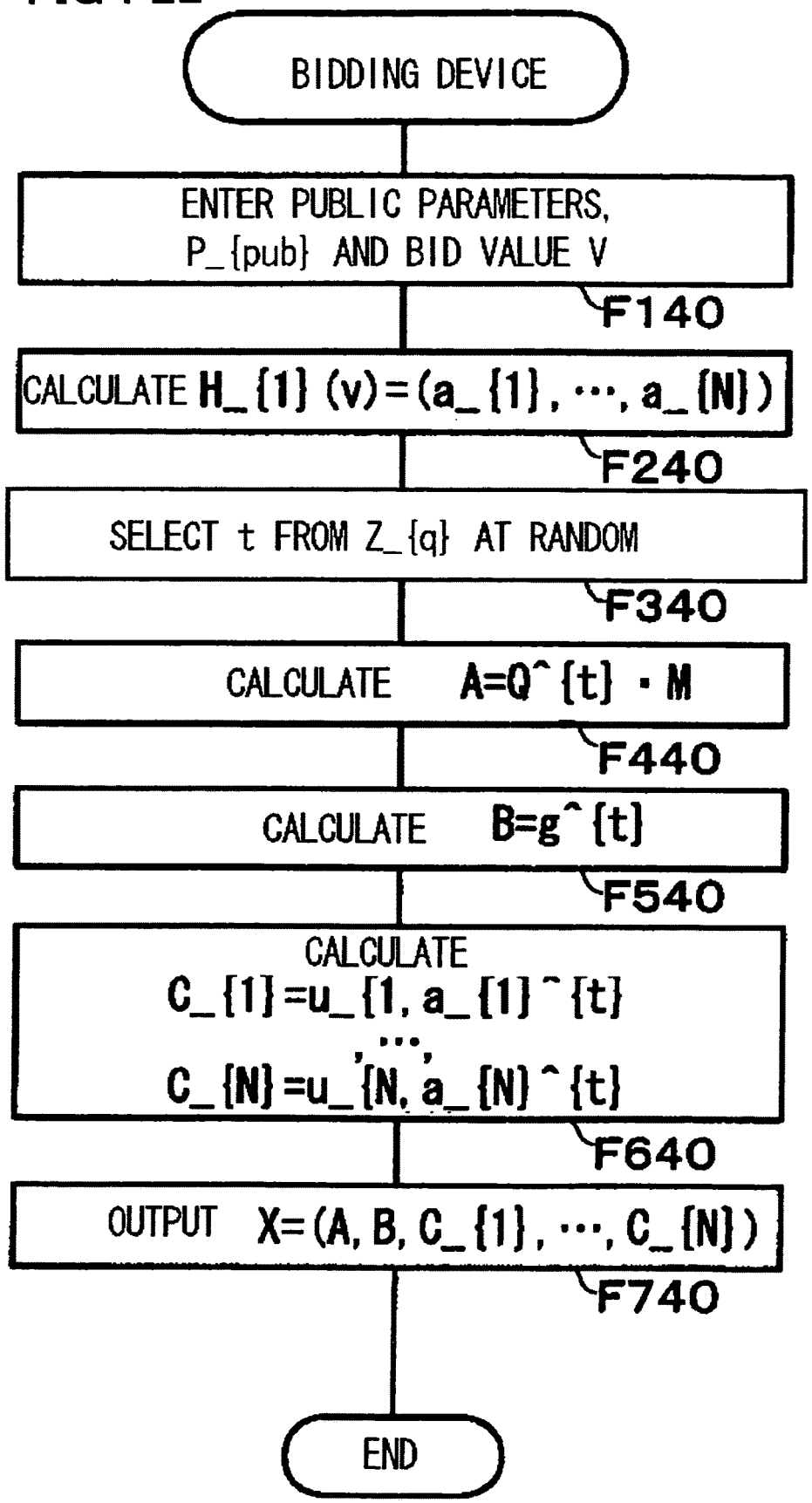
FIG. 22 is a flowchart showing an example of a bidding operation of the fifth exemplary embodiment.

The bidding operation is now described with reference to FIG. 22, which shows an exemplary bidding operation of Example 5. In the bidding device 300, the public parameters, the IBE public key $P\_\{pub\}$ and the bid value v have been entered (step F140). The IBE encrypting means 302 of the bidding device 300 initially calculates $H\_\{1\}(v)=(a\_\{1\},\ldots,a\_\{N\})$ (step F240), and selects t from $Z\_\{q\}$ at random (step F340). Then, it calculates $A=Q^{\{t\}}\cdot M$ (step F440) and then calculates $B=g^{\{t\}}$ (step F540). Then, it calculates $C\_\{1\}=u\_\{1,a\{1\}\}^{\{t\}},\ldots,C\_\{N\}=u\_\{N,a\_\{N\}\}^{\{t\}}$ (step F640). Then, it transmits $X=(A,B,C\_\{1\},\ldots,C\_\{N\})$ as encrypted bid data to the bid opening device 400 (step F740).

The bid opening device 400 receives encrypted bid data of each bidder from the bidding device 300. It is assumed that the bid opening device 400 has received the encrypted bid data from a bidders until closure of the bidding. If the bidders need to be discriminated from one another, the encrypted bid data of the bidders are expressed as $X\_\{j\}$, $X\_\{j\}=(A\_\{j\},B\_\{j\},C\_\{j,1\},\ldots,C\_\{j,N\})$, where $1\leq j\leq a$. The bid opening device 400 causes the received $X\_\{1\},\ldots,X\_\{a\}$ to be stored in the encrypted bid data memory 402.

Figure 23:
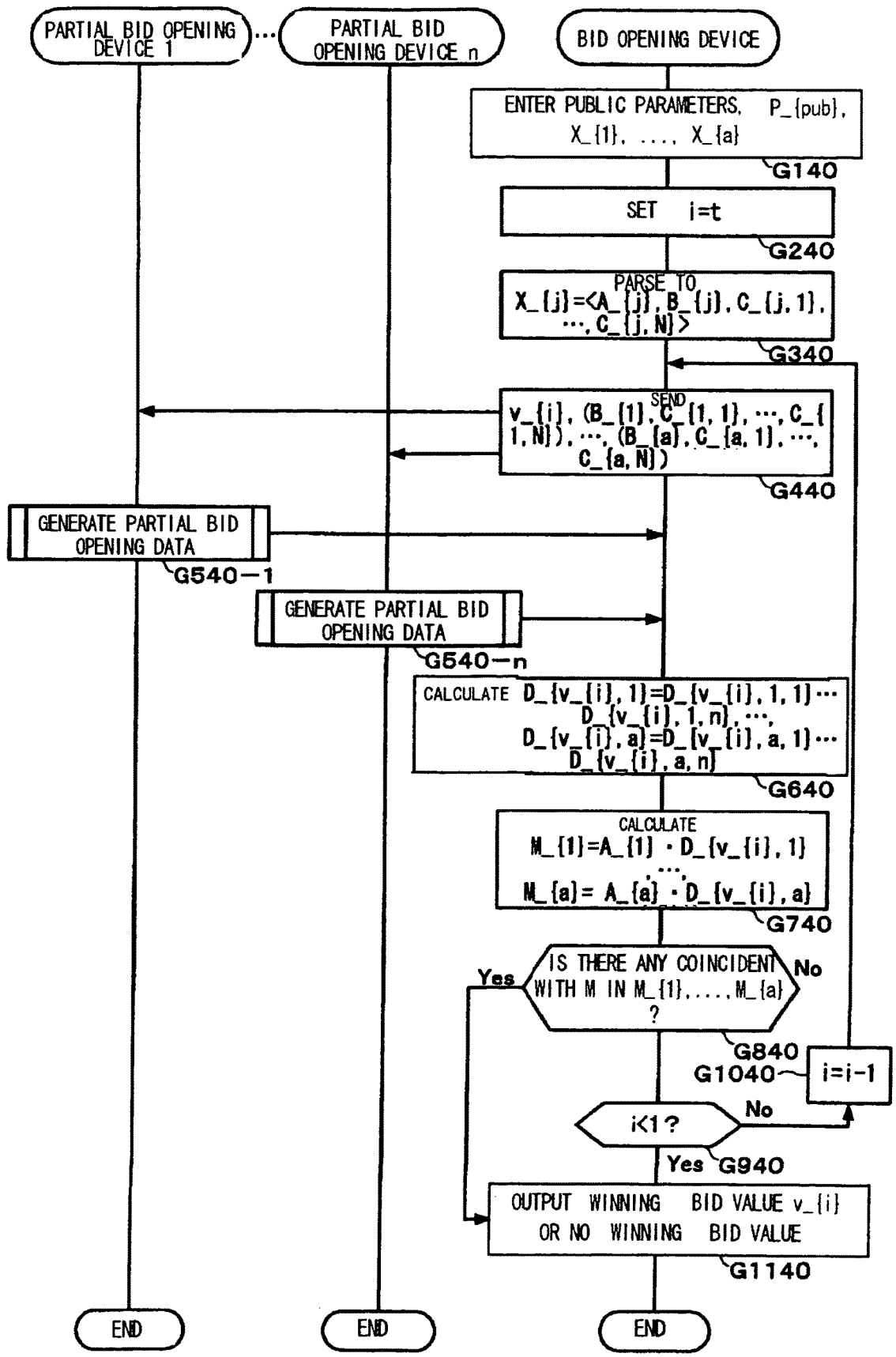
FIG. 23 is a flowchart showing an example of a bid opening operation of the fifth exemplary embodiment.
Figure 24:
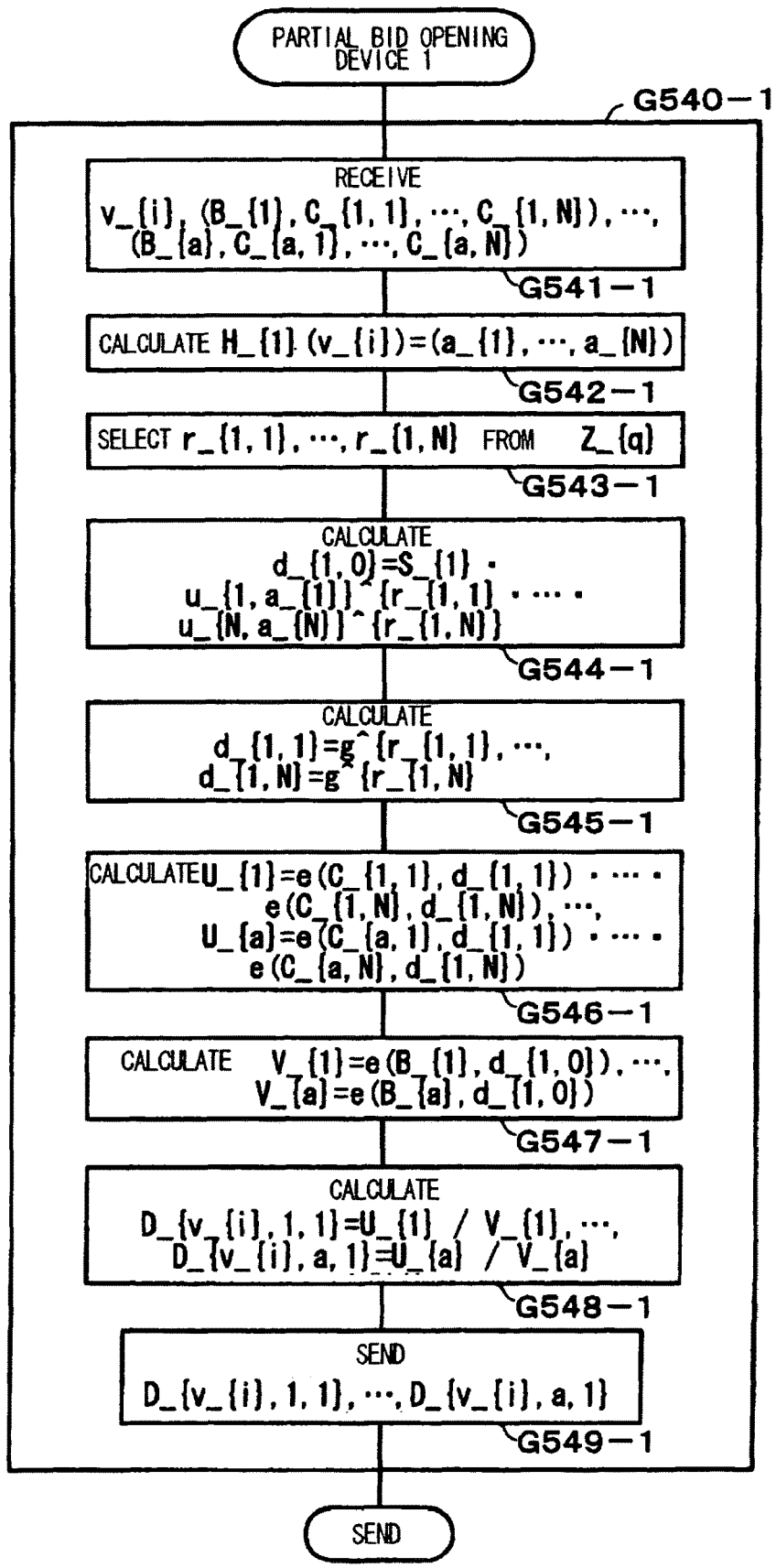
FIG. 24 is a flowchart showing an example of the operation of combining partial bid opening of the bid opening operation of the fifth exemplary embodiment.

The bid opening operation is described with reference to FIGS. 23 and 24. FIG. 23 depicts a flowchart showing an example of a bid opening operation of Example 5 and FIG. 24 depicts a flowchart showing the operation of generating partial bid opening data by the partial bid opening device 100-1, which is part of the bid opening operation of Example 5. In the bid opening device 400, the public parameters, the IBE public key $P\_\{pub\}$ and the encrypted bid data $X\_\{1\},\ldots,X\_\{a\}$ of all bidders have been entered (step G140). Initially, the winning bid value candidate decision means 403 of the bid opening device 400 decides on the winning bid value candidate $v\_\{i\}$ (step G240). Here, the winning bid value candidate decision means 403 first sets the highest bid price $v\_\{t\}$ as being the winning bid value candidate, that is, sets i=t.

The bid opening data generating means 404 initially parses j ($1\leq j\leq a$) of the encrypted bid data of all bidders in accordance with $X\_\{j\}=<A\_\{j\},B\_\{j\},C\_\{j,1\},\ldots,C\_\{j,N\}>$ (step C340). That is, it decomposes $X\_\{j\}$ into $A\_\{j\},B\_\{j\},C\_\{j,1\},\ldots,C\_\{j,N\}$. Then, it transmits the winning bid value candidate $v\_\{i\}$ and $B\_\{1\},C\_\{1,1\},\ldots,C\_\{1,N\}),\ldots,(B\_\{a\},C\_\{a,1\},\ldots,C\_\{a,N\})$, as bid opening processing data to the partial bid opening devices 100-1 to 100-*n* (step G440).

On receipt of the bid opening processing data, the partial bid opening device 100 performs a partial bid data generating operation (step G500). The partial bid opening device 100-1 receives the winning bid value candidate $v\_\{i\}$ and $(B\_\{1\},C\_\{1,1\},\ldots,C\_\{1,N\}),\ldots,(B\_\{a\},C\_\{a,1\},\ldots,C\_\{a,N\})$ from the bid opening device 400 as bid opening processing data (step G541-1).

The partial bid opening data generating means 105-1 of the partial bid opening device 100-1 first calculates $H\_\{1\}(v\_\{i\})=(a\_\{1\},\ldots,a\_\{N\})$ (step G542-1). The partial bid opening data generating means then selects $r\_\{1,1\},r\_\{1,2\},\ldots,r\_\{1,N\}$ from an element of $Z\_\{q\}$ at random (step G543-1). It then calculates $d\_\{1,0\}=S\_\{1\}\cdot u\_\{1,a\_\{1\}\}^{\{r\_\{1,1\}\}}\cdot\ldots\cdot u\_\{N,a\_\{N\}\}^{\{r\_\{1,N\}\}}$ (step G544-1) and $d\_\{1,1\}=g^{\{r\_\{1,11\}\}},d\_\{1,2\}=g^{\{r\_\{1,2\}\}},\ldots,d\_\{1,N\}=g^{\{r\_\{1,N\}\}}$ (step G545-1). It then calculates $U\_\{1\}=e(C\_\{1,1\},d\_\{1,1\})\cdot\ldots\cdot e(C\_\{1,N\},d\_\{1,N\})$. It then calculates $U\_\{2\}=e(C\_\{2,1\},d\_\{1,1\})\cdot\ldots\cdot e(C\_\{2,N\},d\_\{1,N\}),\ldots,U\_\{a\}$, in the same way as it calculates $U\{1\}$ (step G546-1). It then calculates $V\_\{1\}=e(B\_\{1\},d\_\{1,0\})$ and, in the same way as it calculates $V\_\{1\}$, it calculates $V\_\{2\}=e(B\_\{2\},d\_\{1,0\}),\ldots,V\_\{a\}$ (step G547-1).

It then calculates $D\_\{v\_\{i\},1,1\}=U\_\{1\}\div V\_\{1\}$ and, in the same way as it calculates $D\_\{v\_\{i\},1,1\}$, it calculates $D\_\{v\_\{i\},2,1\}=U\_\{2\}\div V\_\{2\},\ldots,D\_\{v\_\{i\},a,1\}=U\_\{a\}\div V\_\{a\}$ (step G548-1). The partial bid opening data generating means 105-1 transmits the calculated $D\_\{v\_\{i\},1,1\},\ldots,D\_\{v\_\{i\},a,1\}$ as partial bid opening data #1 to the bid opening device 400 (step G549-1). The other partial bid opening devices operate in similar manner.

The bid opening device 400 receives partial bid opening data from the partial bid opening devices 100-1 to 100-*n*. The bid opening data generating means 404 of the bid opening device 400 calculates $D\_\{v\_\{i\},1\}=D\_\{v\_\{i\}1,1\}\cdot D\_\{v\_\{i\},1,2\}\cdot\ldots\cdot D\_\{v\_\{i\},1,n\}$ and, in the same way as it calculates $D\_\{v\_\{i\},1\}$, it calculates $D\_\{v\_\{i\},2\},\ldots,D\_\{v\_\{i\},a\}$ (step G740). It then calculates $M\_\{1\}=A\_\{1\}\cdot D\_\{v\_\{i\},1\}$ and, in the same way as it calculates $M\_\{1\}$, it also calculates $M\_\{2\},\ldots,M\_\{a\}$ (step G840).

The decision means 406 verifies whether or not there is any message in $M\_\{1\},\ldots,M\_\{a\}$ that coincides with the message for bidding M contained in the public parameters (step G940). If there is any such message that is coincident with the message for bidding M, the decision means sets the winning bid value candidate $v\_\{i\}$, as set in the step G240, as being the winning bid value (Yes of step G940 and step G1240). If there is no message coincident with the message for bidding M, similar operations are carried out for the next winning bid value candidate. If there is no value that may prove the next winning bid value candidate (i<1), it is determined that there is no winning bid value (Yes of step G1040 and step G1240). If otherwise, the winning bid value candidate is updated to a value that is next closest to the winning bid condition, that is, i−1 is set for i, and reversion is made to G440 (No of step G1040 and step G1140).

Example 6

With reference to Example 6, the operation of the present invention is now described. This Example 6 is for a case of implementing an electronic bidding system of the second exemplary embodiment of the present invention using the Boneh-Franklin IBE system. It is again assumed that, in the present Example, there are provided n bidding devices 110 that perform distributed management of the secret information for decryption. It is also assumed that the partial bid opening device 110-1, partial bid opening device 110-2, partial bid opening device 110-n are installed as the first base point, second or further following base point, . . . , n'th base point, respectively. The present Example is directed to such a case where both the IBE public key and the bid opening data involved in group decryption are sequentially combined by the partial bid opening devices 110. The satisfying number of the group decryption in the present Example is again set to n. It should be noticed that public parameters similar to those in the Example 5 are stored in the respective devices.

Figure 25:
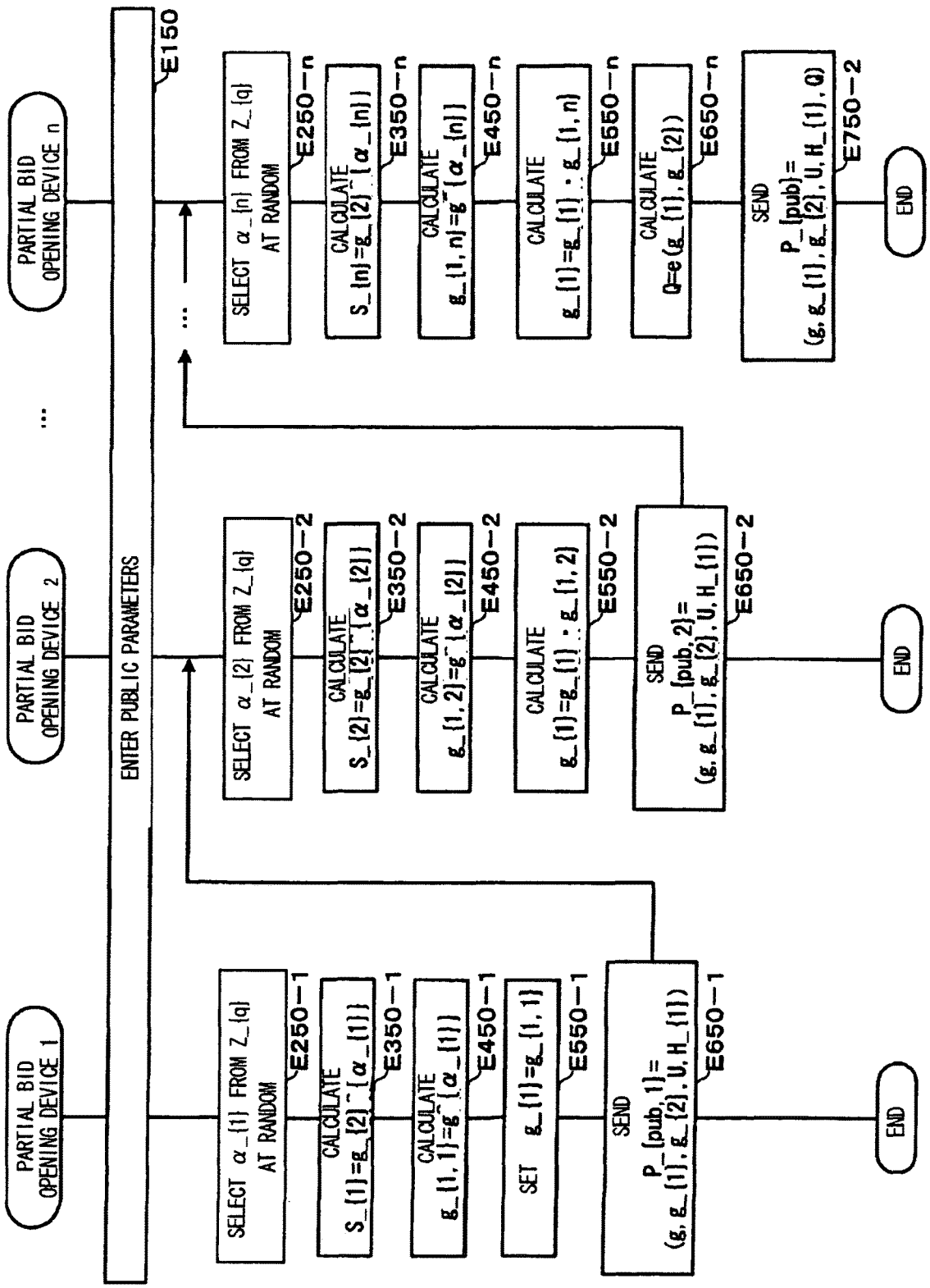
FIG. 25 is a flowchart showing an example of an IBE public key generating operation of the sixth exemplary embodiment.

First, the IBE public key generating operation is described with reference to FIG. 25, which shows an exemplary IBE public key generating operation of Example 6. In the partial bid opening devices 100-1 to 100-n, public parameters have been entered (step E150). Initially, the partial bid opening device 110-1 is in operation. The partial secret key generating means 102-1 of the partial bid opening device 110-1 selects $\alpha\_\{1\}$ from $Z\_\{q\}$ at random (step E250-1). The partial secret key generating means then calculates $S\_\{1\}=g\_\{2\}^{\{\alpha\_\{1\}\}}$ to store it in the partial secret key memory 103-1 (step E350-1). The partial public key generating means 114-1 then calculates $g\_\{1,1\}=g^{\{\alpha\_\{1\}\}}$ and sets $g\_\{1\}=g\_\{1,1\}$ (steps E450-1 and E550-1). It then sets $P\_\{pub,1\}=(g,g\_\{1\},g\_\{2\},U,H\_\{1\})$ to transmit the so set public key to the partial bid opening device 110-2 as the next base point (step E650-1).

The partial bid opening device 110-2 receives $P\_\{pub,1\}$ from the partial bid opening device 110-1 as the previous base point. The partial secret key generating means 102-2 of the partial bid opening device 110-2 first selects $\alpha\_\_\{2\}$ from $Z\_\{q\}$ at random (step E250-2). The partial secret key generating means then calculates $S\_\{2\}=g\_\{2\}^{\{\alpha\_\{2\}\}}$ to store it in the partial secret key memory 103-2 (step E350-2). The partial public key generating means 114-2 then calculates $g\_\{1,2\}=g^{\{\alpha\_\{2\}\}}$ (step E450-2). The partial public key generating means then calculates $g\_\{1\}=g\_\{1,2\}\cdot g\_\{1\}$ (step E550-2) and sets $P\_\{pub,2\}=(g,g\_\{1\},g\_\{2\},U,H\_\{1\})$ to send it to the partial bid opening device 110-3 (step E650-2). The similar sequence of operations continues up to the partial bid opening device 110-(n−1).

The partial bid opening device 110-n receives $P\_\{pub,n\}$ from the partial bid opening device 110-(n−1) as the previous base point. The partial secret key generating means 102-2 of the partial bid opening device 110-2 first selects $\alpha\_\{n\}$ from $Z\_\{q\}$ at random (step E250-n). The partial secret key generating means then calculates $S\_\{n\}=g\_\{2\}^{\{\alpha\_\{n\}\}}$ to store it in the partial secret key memory 103-n (step E350-n). The partial secret key generating means then calculates $g\_\{1,n\}=g\_\{1\}^{\{\alpha\_\{n\}\}}$ (step E450-n), then calculates $g\_\{1\}=g\_\{1,n\}\cdot g\_\{1\}$ (step E550-n), and then calculates $Q=e(g\_\{1\},g\_\{2\})$ (step E650-n). It then discloses $P\_\{pub\}=(g,g\_\{1\}),g\_\{2\},U,H\_\{1\},Q)$ as being the IBE public key (step E750-n).

Figure 26:
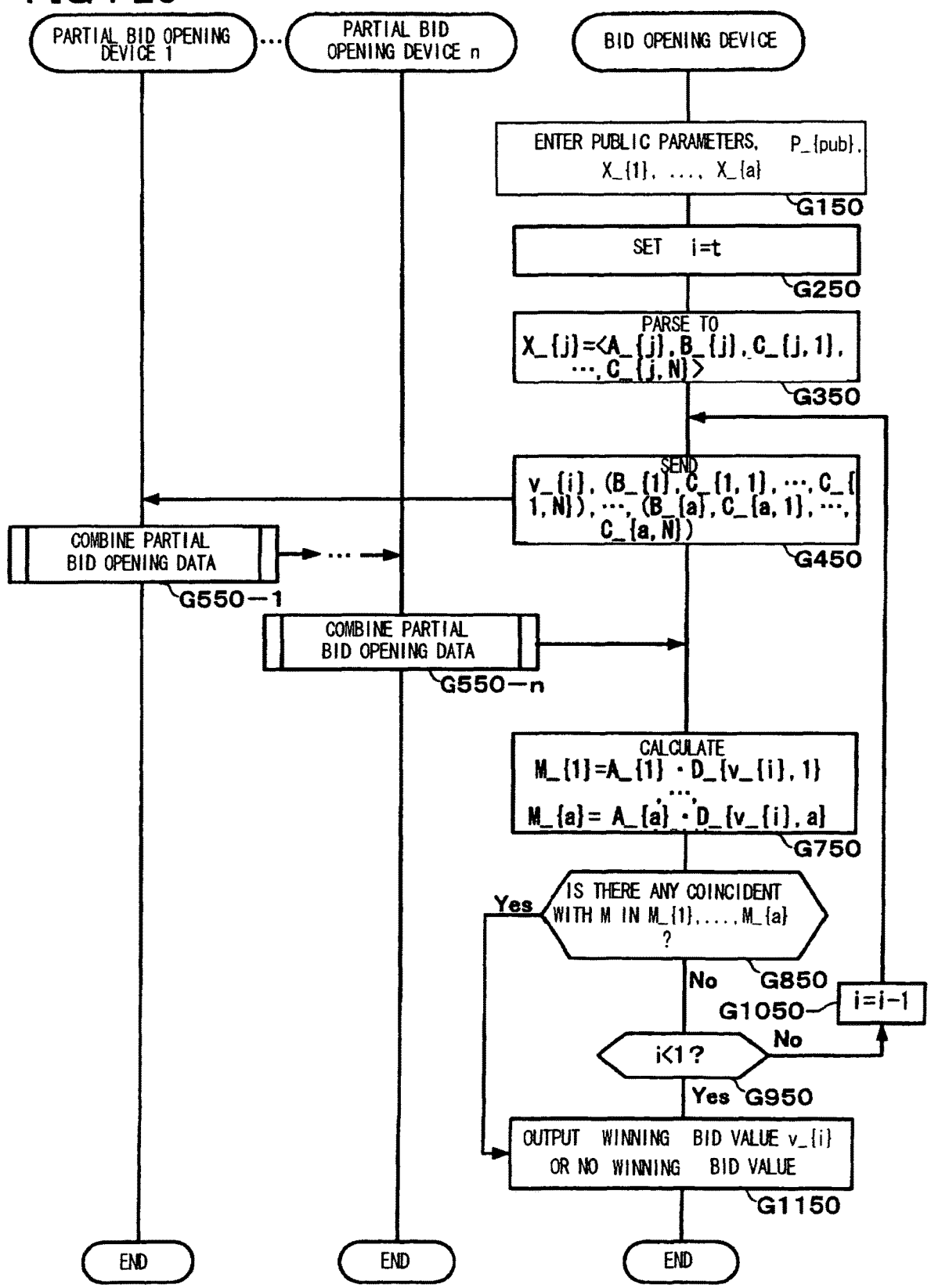
FIG. 26 is a flowchart showing an example of the bid opening operation in the sixth exemplary embodiment.
Figure 27:
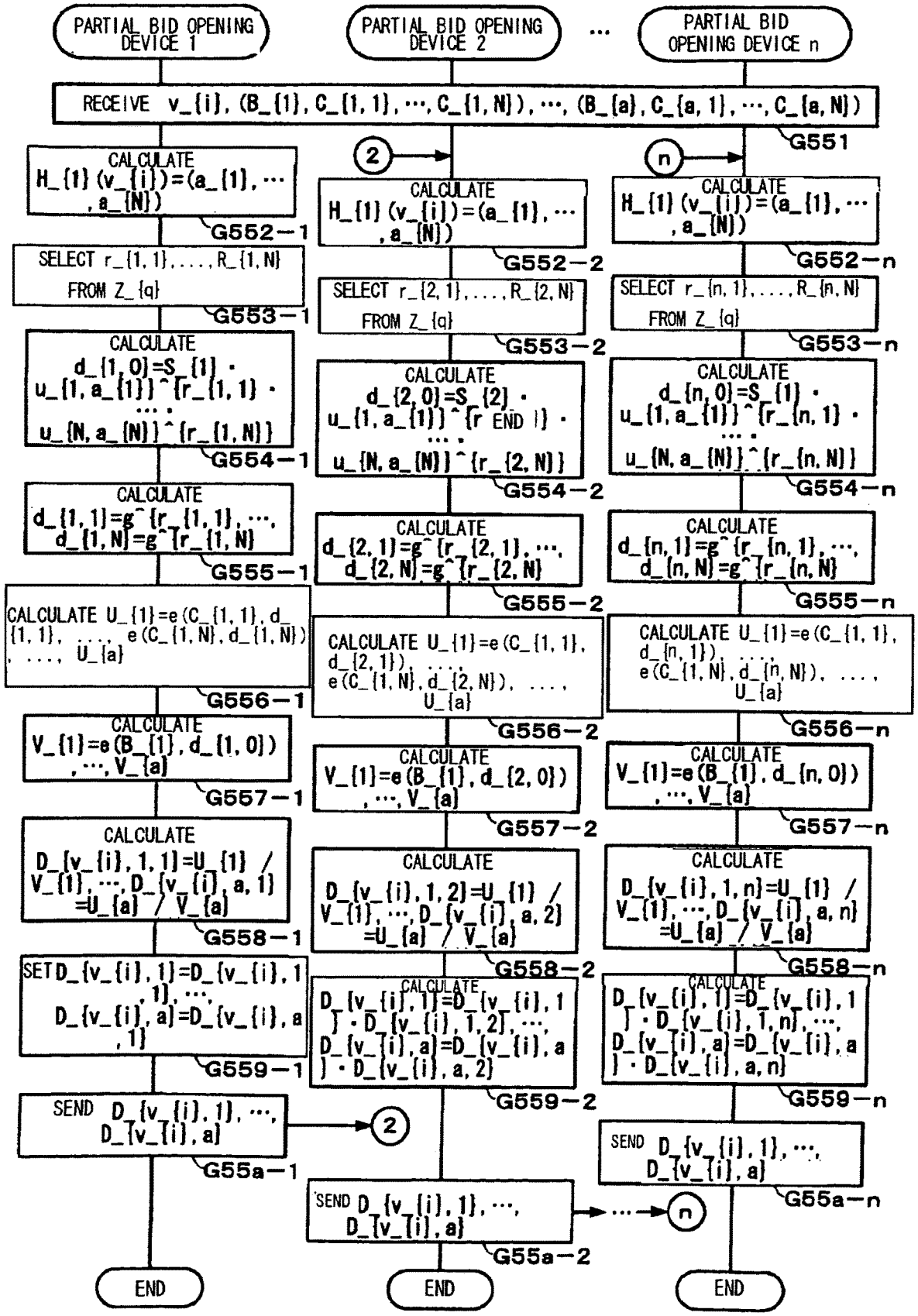
FIG. 27 is a flowchart showing an example of a bid opening data combining operation of the bid opening operation of the sixth exemplary embodiment.

The bid opening operation is now described with reference to FIGS. 26 and 27. The bidding operation is similar to that of Example 5 and hence the description thereof is dispensed with. It is here assumed that the bid opening device 410 has accepted bidding from a bidders. FIG. 26 depicts a flowchart for illustrating an exemplary bid opening operation of Example 6. FIG. 27 depicts a flowchart for illustrating an exemplary operation of combination of bid opening data by the partial bid opening device 110 as a part of bid opening operation in Example 6. In the bid opening device 410, public parameters, IBE public key $P\_\{pub\}$ and $X\_\{1\}, \ldots, X\_\{a\}$ of all bidders have been entered (step G150). Initially, the winning bid value candidate decision means 403 of the bid opening device 410 decides on the winning bid value candidate $v\_\{i\}$ (step G250). Here, the winning bid value candidate decision means 403 initially sets the highest bid value $v\_\{t\}$ as being the winning bid value candidate, that is, it sets i=t.

The bid opening data generating means 414 then parses each j (1≤j≤a) of the encrypted bid data of all bidders in accordance with $X\_\{j\}=<A\_\{j\},B\_\{j\},C\_\{j,1\}, \ldots, C\_\{j,N\}>$ (step C350). That is, it decomposes $X\_\{j\}$ into $A\_\{j\}, B\_\{j\},C\_\{j,1\}, \ldots, C\_\{j,N\}$. Then, it transmits the winning bid value candidate $v\_\{i\}$ and $(B\_\{1\},C\_\{1,1\}, \ldots, C\_\{1,N\}), \ldots, (B\_\{a\},C\_\{a,1\}, \ldots, C\_\{a,N\}), C\_\{1,1\}, \ldots, C\_\{1,N\}), \ldots, (B\_\{a\},C\_\{a,1\}, \ldots, C\_\{a,N\})$, as bid opening processing data to the partial bid opening devices 110-1 (step G450).

On receipt of the bid opening processing data, the partial bid opening device 110-1 commences the operation of combining the bid opening data (step G550). In the partial bid opening devices 110, public parameters and the IBE public key $P\_\{pub\}$ have been entered (step G551). On receipt of the bid opening processing data, the partial bid opening data generating means 115-1 of the partial bid opening devices 110-1 first calculates $H\_\{1\}(v\_\{i\})=(a\_\{1\}, \ldots, a\_\{N\})$ (step G552-1). The partial bid opening means then selects $r\_\{1,1\},r\_\{1,2\}, \ldots, r\_\{1,N\}$ from an element of $Z\_\{q\}$ at random (step G553-1). Then, it calculates $d\_\{1,0\}=S\_\{1\}\cdot u\_\{1,a\}\{\{1\}\}^{\{r\_\{1,1\}\}}\cdot \ldots \cdot u\_\{N, a\_\{N\}\}^{\{r\_\{1,N\}\}}$ (step G554-1), then calculates $d\_\{1,1\}=g^{\{r\_\{1,1\}\}},d\_\{1,2\}=g^{\{r\_\{1,2\}\}}, \ldots, d\_\{1,N\}=g^{\{r\{1,N\}\}}$ (step G555-1), and then calculates $U\_\{1\}=e(C\_\{1,1\},d\_\{1,1\})\cdot \ldots \cdot e(C\_\{1,N\},d\_\{1,N\})$. Then, it calculates $U\_\{2\}=e(C\_\{2,1\},d\_\{1,1\})\cdot \ldots \cdot e(C\_\{2,N\}, d\_\{1,N\}), \ldots, U\_\{a\}$, in the same way as it calculates $U\_\{1\}$ (step G556-1). Then, it calculates $V\_\{1\}=e(B\_\{1\}, d\_\{1,0\})$, and then calculates $V\_\{2\}=e(B\_\{2\}, d\_\{1,0\}), \ldots, V\_\{a\}$, in the same way as it calculates $V\_\{1\}$ (step G557-1).

Then, it calculates $D\_\{v\_\{i\},1,1\}=U\_\{1\}\div V\_\{1\}$, and calculates $D\_\{v\_\{i\},2,1\}=U\_\{2\}\div V\_\{2\}, \ldots, D\_\{v\_\{i\}, a,1\}=U\_\{a\}\div V\_\{a\}$ in the same way as it calculates $D\_\{v\_\{i\},1,1\}$ (step E558-1). Since the partial bid opening device 110-1 is the first base point, the partial bid opening data generating means 115-1 sets $D\_\{v\_\{i\},1\}=D\_\{v\_\{i\}, 1,1\}, \ldots, D\_\{v\_\{i\},a\}=D\_\{v\_\{i\},a,1\}$ and transmits it as partial bid opening data #1 to the partial bid opening device 110-2 (step E55a-1). When transmitting bid opening data to the next base point, $v\_\{i\}$ and $(B\_\{1\},C\_\{1,1\}, \ldots, C\_\{1,N\}), \ldots, (B\_\{a\},C\_\{a,1\}, \ldots, C\_\{a,N\})$ are transmitted as they are included in the bid opening data.

The partial bid opening device 110-2 receives the partial bid opening data #1 and the bid opening processing data from the partial bid opening device 110-1 as the previous base point. Initially, the partial bid opening data generating means 115-2 of the partial bid opening device 110-2 initially calculates $H\_\{1\}(v\_\{i\})=(a\_\{1\}, \ldots, a\_\{N\})$ (step E552-2). It then selects $r\_\{2,1\},r\_\{2,2\}, \ldots, r\_\{2,N\}$ at random from an element of $Z\_\{q\}$ (step E553-2). It then calculates $d\_\{2,0\}=S\_\{2\}\cdot u\_\{1,a\_\{1\}\}^{\{r\_\{2,1\}\}}\cdot \ldots \cdot u\_\{N, a\_\{N\}\}^{\{r\_\{2,N\}\}}$ (step E554-2), then calculates $d\_\{2, 1\}=g^{\{r\_\{2,1\}\}},d\_\{2,2\}=g^{\{r\_\{2,2\}\}}, \ldots, d\_\{2, N\}=g^{\{r\_\{2,N\}\}}$ (step E555-2) and then calculates $U\_\{1\}=e(C\_\{1,1\},d\_\{2,1\})\cdot \ldots \cdot e(C\_\{1,N\},d\_\{2,N\})$. It then calculates $U\_\{2\}=e(C\_\{2,1\},d\_\{2,1\})\cdot \ldots \cdot e(C\_\{2, N\},d\_\{2,N\}), \ldots, U\_\{a\}$ in the same way as it calculates $U\_\{1\}$ (step E556-2). It then calculates $V\_\{1\}=e(B\_\{1\}, d\_\{2,0\})$ and, in the same way as it calculates $V\_\{1\}$, it calculates $V\_\{2\}=e(B\_\{2\},d\_\{2,0\}), \ldots, V\_\{a\}$ (step E557-2).

Then, it calculates $D\_\{v\_\{i\},1,2\}=U\_\{1\}\div V\_\{1\}$ and, in the same way as it calculates $D\_\{v\_\{i\},1,2\}$, it also calculates $D\_\{v\_\{i\},2,2\}=U\_\{2\}\div V\_\{2\}, \ldots, D\_\{v\_\{i\},a,2\}=U\_\{a\}\div V\_\{a\}$ (step E558-2). The partial public key generating means 114-2 then calculates $D\_\{v\_\{i\},1\}=D\_\{v\_\{i\},1,2\}\cdot D\_\{v\_\{i\},1\}$, using the partial bid opening data #1 as received from the partial bid opening device 110-1 as the previous base point. The partial public key generating means calculates $D\_\{v\_\{i\},2\}=D\_\{v\_\{i\},2,2\} D\_\{v\_\{i\},2\}, \ldots, D\_\{v\_\{i\},a\}=D\_\{v\_\{i\},a,2\}\cdot D\_\{v\_\{i\},a\}$ in the same way as it calculates $D\_\{v\_\{i\},1\}$ (step E559-2). It then transmits so calculated $D\_\{v\_\{i\},1\}, \ldots, D\_\{v\_\{i\},a\}$ as bid opening data #2 to the partial bid opening device 110-3 (step E55a-2). The similar sequence of operations is continued up to the partial bid opening device 110-(n−1).

The partial bid opening device 110-n receives the bid opening data #(n−1) and the bid opening processing data from the partial bid opening device 110-(n−1) as the previous base point. The partial bid opening data generating means 115-n of the partial bid opening device 110-n initially calculates $H\_\{1\}v\_\{i\})=(a\_\{1\},\ldots,a\_\{N\})$ (step E552-n). It then selects $r\_\{n,1\},r\_\{n,2\}, \ldots, r\_\{n,N\}$ from an element of $Z\_\{q\}$ at random (step E553-n). It then calculates $d\_\{n,0\}=S\_\{n\}\cdot u\_\{1,a\{1\}\}$ ^$\{r\_\{n,1\}\}, \ldots, u\_\{N,a\_\{N\}\}^r\_\{n,N\}\}$ (step E554-n), then calculates $d\_\{n,1\}=g^\{r\_\{n,1\}\}),d\_\{n,2\}=g^\{r\_\{n,2\}\}, \ldots, d\_\{n,N\}=g^\{r\_\{n,N\}\}$ (step E555-n) and then calculates $U\_\{1\}=e(C\_\{1,1\},d\_\{n,1\})\cdot \ldots \cdot e(C\_\{1,N\},d\_\{n,N\})$. It then calculates $U\_\{2\}=e(C\_\{2,1\},d\_\{n,1\})\cdot \ldots \cdot e(C\_\{2,N\},d\_\{n,N\}), \ldots, U\_\{a\}$, in the same way as it calculates $U\_\{1\}$ (step G546-1) (step E556-n). It then calculates $V\_\{1\}=e(B\_\{1\},d\_\{n,0\})$ and, in the same way as it calculates $V\_\{1\}$, it calculates $V\_\{2\}=e(B\_\{2\},d\_\{n,0\}), \ldots, V\_\{a\}$ (step E557-n).

It then calculates $D\_\{v\_\{i\},1,n\}=U\_\{1\}V\_\{1\}$ and, in the same way as it calculates $D\_\{v\_\{i\},1,n\}$, it calculates $D\_\{v\_\{i\},2,n\}=U\_\{2\}\div V\_\{2\}, \ldots, D\_\{v\_\{i\},a,n\}=U\_\{a\}\div V\_\{a\}$ (step E558-n). The partial public key generating means 114-n calculates $D\_\{v\_\{i\},1\}=D\_\{v\_\{i\},1,n\}\cdot D\_\{v\_\{i\},1\}$, using the bid opening data #(n−1) received from the partial bid opening device 110-(n−1) as the previous base point. It also calculates $D\_\{v\_\{i\},2\}=D\_\{v\_\{i\},2,n\}\cdot D\_\{v\_\{i\},2\}, \ldots, D\_\{v\_\{i\},a\}=D\_\{v\_\{i\},a,n\}\cdot D\_\{v\_\{i\},a\}$, in the same way as it calculates $D\_\{v\_\{i\},1\}$ (step E559-n). Since the partial bid opening device 110-n is the last base point, the partial public key generating means 114-n sends $D\_\{v\_\{i\},1\}, \ldots, D\_\{v\_\{i\},a\}$ as the bid opening data to the bid opening device 410 (step E517-n).

On receipt of the bid opening data from the partial bid opening device 110-n, the bid opening data generating means 414 of the bid opening device 410 outputs the received bid opening data to the IBE decrypting means 405. The subsequent operation is similar to that of Example 5 and hence the description thereof is dispensed with.

Example 7

With reference to Example 7, the operation of the present invention is now described. This Example 7 is for a case of implementing an electronic bidding system of the third exemplary embodiment of the present invention using the Boneh-Franklin IBE system. It is assumed that, in the present Example 7, there are provided a bidding devices 320, depending on the number of bidders, and an ID proper to each bidder is assigned to each bidding device 320. The ID of a bidding device 320-1 is labeled ID_{1}, while the ID of a bidding device 320-2 is labeled ID_{2}. The ID may, for example, be a name or a membership number and may be issued subject to pre-registration or by any other suitable method.

The public parameters of the present Example comprise a hash function $H\_\{2\}$, in addition to the public parameters shown in Example 6. The hash function $H\_\{2\}$ is a hash function from a set of binary sequences of arbitrary lengths to $G\_\{1\}$.

Figure 28:
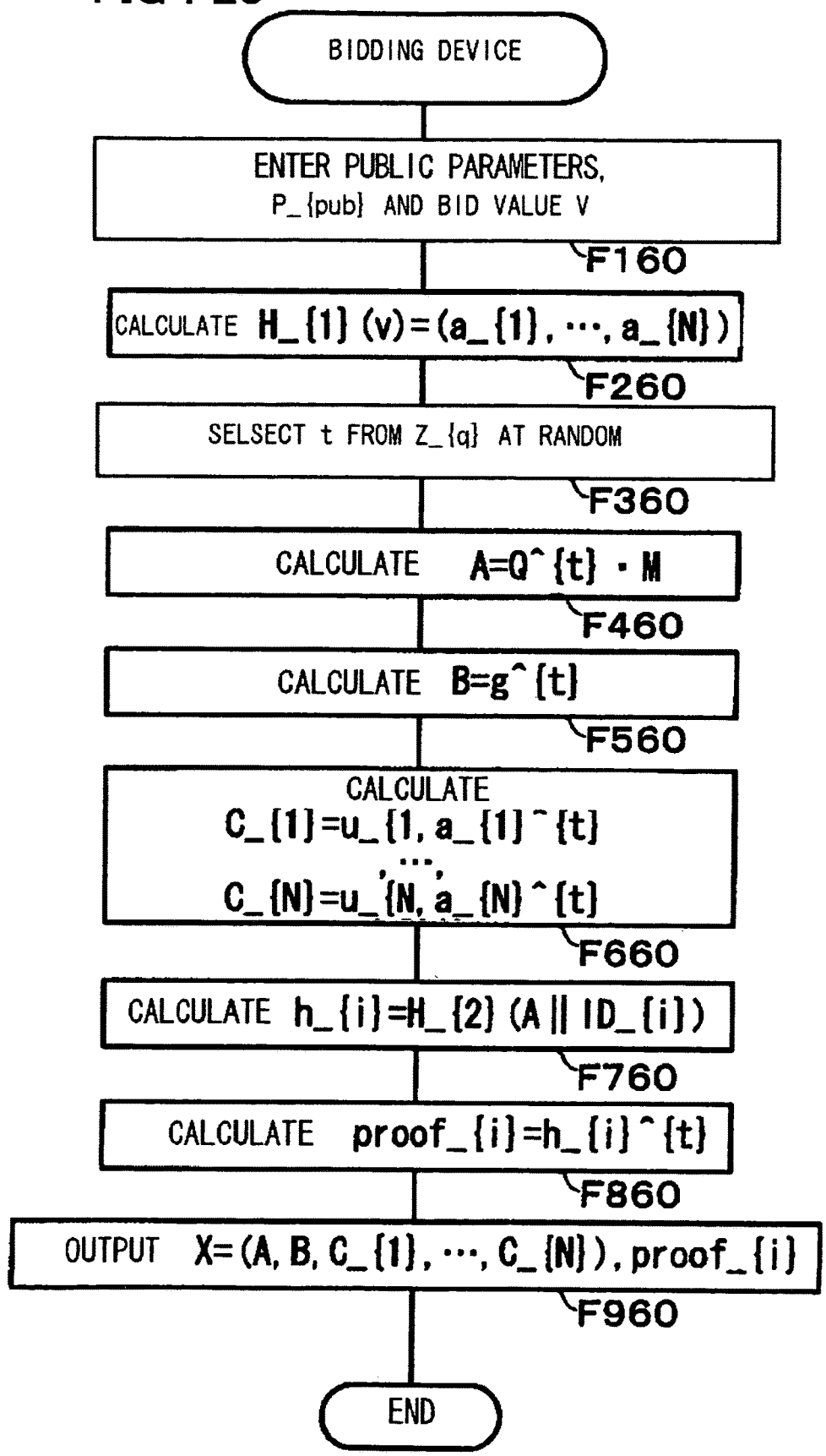
FIG. 28 is a flowchart showing an example of the bid opening operation of a seventh exemplary embodiment.

The present Example shows a concrete Example of the bidding operation and the verification operation in an electronic bidding system capable of proving the knowledge as regards the bid value. Meanwhile, the IBE public key generating operation and the bid opening operation are similar to those of the Example 1 and hence the description thereof is dispensed with. First, the bidding operation is described with reference to FIG. 28, which is a flowchart showing an example of the bidding operation of Example 7. The public parameters, the IBE public key P-(pub) and the bid value v have been entered to the bidding device 320 (step F160). In the bidding device 320, ID_{i}, an ID proper to the bidder, has been entered (1≤i≤a).

The IBE encrypting means 302 of the bidding device 320 first calculates $H\_\{1\}(v)=(a\_\{1\}),\ldots,a\_\{N\})$ (step F260), and then selects t from $Z\_\{q\}$ at random (step F360). The IBE encrypting means then calculates $A=Q^\{t\}\cdot M$ (step F460), then calculates $B=g^\{t\}$ (step F560) and then calculates $C\_\{1\}=u\_\{1,a\_\{1\}\}^\{t\}, \ldots, C\_\{N\}=u\_\{N,a\_\{N\}\}^\{t\}$ (step F660).

The bid value knowledge proving means 323 then generates bid value knowledge proof data. In the present Example, bid value knowledge proving is by proving the knowledge of t. The bid value knowledge proving means 323 initially calculates $h\_\{i\}=H\_\{2\}(A\|ID\_\{i\})$ (step F760), and calculates $proof\_\{i\}=h\_\{i\}^\{t\}$ (step F860). The bid value knowledge proving means 323 sends the so generated bid value knowledge proof data $proof\_\{i\}$ and encrypted bid data $X=(A,B,C\_\{1\}, \ldots, C\_\{N\})$ to the verification device 520 (step F960). The verification device 520 causes the $proof\_\{i\}$ and encrypted bid data $X=(A,B,C\_\{1\}, \ldots, C\_\{N\})$ of the bidders, received from the bidding device 320, to be stored in the memory that stores the encrypted bid data with bid value knowledge proof 522.

In the above-described method for proving the bid value knowledge, the possibility of finding $proof\_\{i\})$ without having the knowledge concerning t is extremely low. Should there exist a device that enables this, it should be possible to use such device to solve the discrete logarithm problem. This problem is one on which hinges the integrity of the major portion of the current public key encryption system, and the presence of such device would be so influential as to make most of the current public key encryption system unusable. However, it is extremely unlikely that such device should be available.

On the other hand, ID_{i}, which is a bidder's ID, is included in an input to the hash function $H\_\{2\}$, so that, even if a bidder having an ID other than ID_{i} has copied this proof, he/she cannot pass verification, due to collision resistance of the hash function.

As to bid value knowledge proving, it is also possible to show the knowledge of t, using the proving method shown in Non-Patent Document 4. In case of using the proving method shown in Non-Patent publication 4, $h\_\{i\}=H\_\{2\}(A\|ID\_\{i\})$ is first calculated, and $r\_\{i\}$ is then selected from $Z_{q}$ at random. Then, $\alpha_{i}=g^{r_{i}}$ and $s_{i}=r_{i}+h_{i}\cdot t$ are calculated in this order. Then, $proof_{i}=(\alpha_{i}, s_{i})$ is set.

Figure 29:
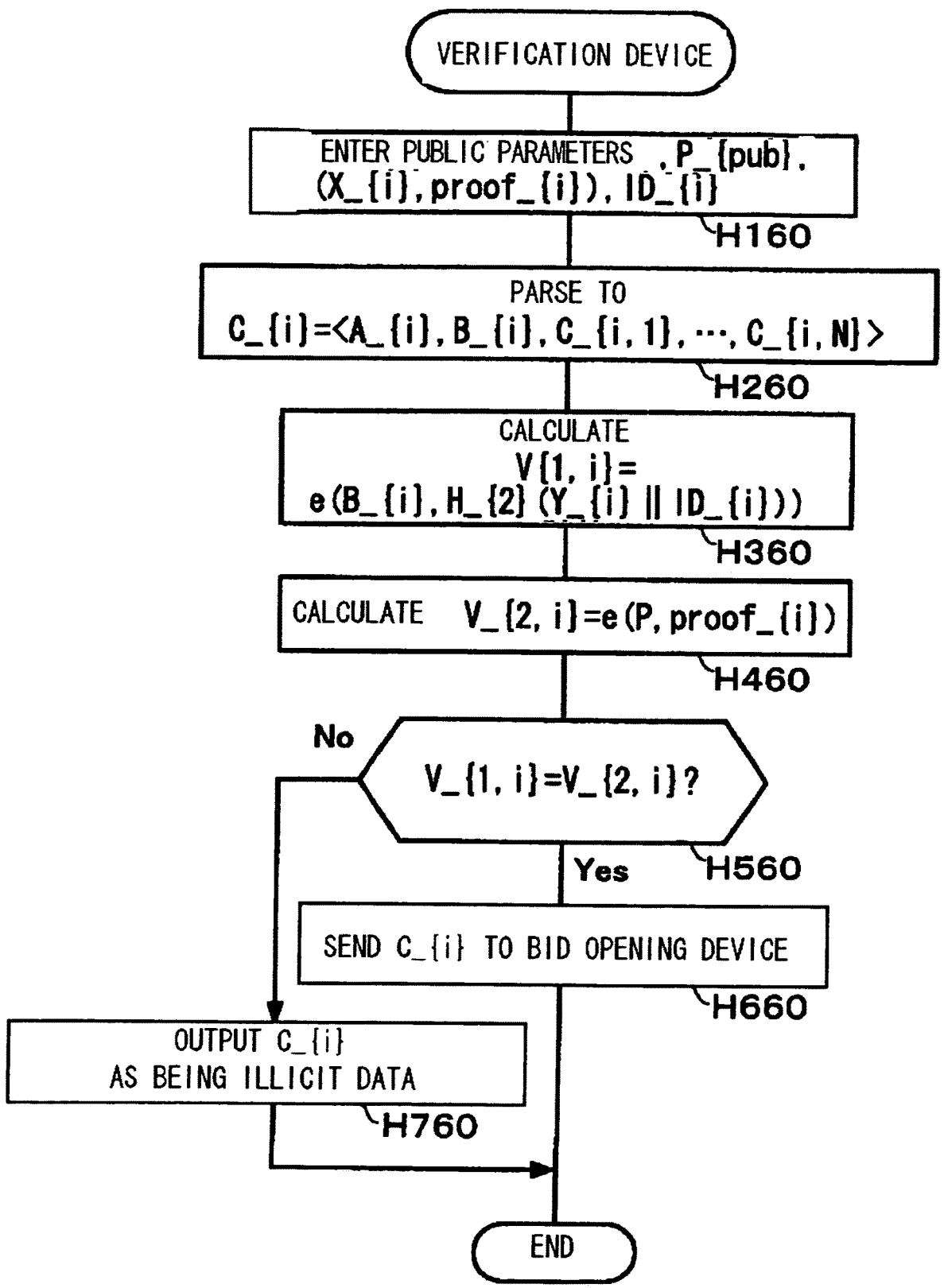
FIG. 29 is a flowchart showing an example of the verification operation of the seventh exemplary embodiment.

The verification operation is then explained with reference to FIG. 29, which shows an example of the verification operation in Example 7. In the verification device 520, the public parameters, IBE public key $P_{pub}$ and the encrypted bid data with bid value knowledge proving $(X_{i}, proof_{i})$ have been entered (step H160). The verification means 523 of the verification device 520 parses the encrypted bid data $X_{i}$ into $X_{i}=<A_{i}, B_{i}, C_{i,1}, \ldots, C_{i,N}>$ (step H260). That is, $X_{i}$ is decomposed into $A_{i}, B_{i}, C_{i,1}), \ldots, C_{i,N}$. The verification means then calculates $V_{1,i}=e(B_{i}, H_{2}(Y_{i}\|ID_{i}))$ (step H360). It further calculates $V_{2,i}=e(g, proof_{i})$ (step H460).

The verification means 523 then verifies $V_{1,i}=V_{2,i}$ (step H560). Should this equation hold, the verification means verifies the bid value knowledge proving data to be correct and transmits $C_{i}$ to the bid opening device 400 (step H660). If the equation does not hold, the verification means verifies the data to be illicit and outputs that tenor (step H760). This verification operation is carried out for data of all bidders $X_{1}, proof_{1}), \ldots, (X_{a}, proof_{a})$.

If the proving method of Non-Patent Document 4 is used as the bid value knowledge proving, $(\alpha_{i}, s_{i})$ is entered to the verification device 520 as $proof_{i}$. By way of the verification operation for such case, $V_{1,i}=P^{s_{i}}$ is calculated, followed by $V_{2,i}=\alpha_{i}\cdot B_{i}^{H_{2}(A_{i}\|ID_{i})}$. It is then verified if $V_{1,i}=V_{2,i}$ holds. If the equation holds, the verification device assumes the bid value knowledge proof data is correct and accordingly sends $X_{i}$ to the bid opening device 400. If the equation does not hold, the verification device assumes that the data is not correct and outputs that tenor.

Example 8

With reference to Example 8, the operation of the present invention is now described. This Example 8 is for a case of implementing an electronic bidding system of the fourth exemplary embodiment of the present invention using the Boneh-Franklin IBE system. The present Example 8 is a combination of Examples 6 and 7. It is assumed that, in the present Example, there are provided n partial bidding devices 110 that perform distributed management of the secret information for decryption. It is also assumed that the partial bid opening device 110-1, partial bid opening device 110-2, ..., partial bid opening device 110-n are installed as the first, second, ..., n'th base points, respectively. It is further assumed that there are a bidding devices 320, depending on the number of the bidders, and that an ID proper to each bidder has been pre-assigned to each bidding device 320. Meanwhile, the public parameters in the present Example are similar to those of the Example 7.

Initially, the IBE public key generating operation is described. The operation of generating the IBE public key is similar to that of the Example 6 shown in FIG. 25, and public parameters have been entered to the partial bid opening devices 110-1 to 110-n (step E150). Initially, the partial bid opening device 110-1 is in operation. The partial secret key generating means 102-1 of the partial bid opening device 110-1 first selects $\alpha\{1\}$ from $Z_{q}$ at random (step E250-1) and calculates $S_{1}=g_{2}^{\alpha_{1}}$ to store the so selected $S_{1}$ in the partial secret key memory 103-1 (step E350-1). The partial public key generating means 114-1 calculates $g_{1,1}=g^{\alpha_{1}}$ and sets $g_{1}=g\{1,1\}$ (steps E450-1, 550-1). It then sets $P_{pub,1}=(g, g_{1}, g_{2}, U, H_{1})$ and transmits the so set public key to the partial bid opening device 110-2 as the next base point (step E650-1).

The partial bid opening device 110-2 receives $P_{pub,1}$ from the partial bid opening device 110-1 as the previous base point. The partial secret key generating means 102-2 of the partial bid opening device 110-2 initially selects $\alpha\{2\}$ from $Z_{q}$ at random (step E250-2). It then calculates $S_{2}=g_{2}^{\alpha_{2}}$ to store it in the partial secret key memory 103-2 (step E350-2). The partial public key generating means 114-2 then calculates $g_{1,2}=g^{\alpha_{2}}$ (step E450-2) and then calculates $g_{1}=g_{1,2}\cdot g_{1}$ (step E550-2). It then sets $P_{pub,2}=(g,g_{1}, g_{2}, U, H_{1})$ and then sends the so set public key to the partial bid opening device 110-3 (step E650-2). The similar sequence of operations continues up to the partial bid opening device 110-(n-1).

The partial bid opening device 110-n receives $P_{pub,n}$ from the partial bid opening device 110-(n-1) as the previous base point. The partial secret key generating means 102-2 of the partial bid opening device 110-2 initially selects $\alpha\{n\}$ from $Z_{q}$ at random (step E250-n). It then calculates $S_{n}=g_{2}^{\alpha_{n}}$ to store it in the partial secret key memory 103-n (step E350-n). It then calculates $g_{1,n}=g_{1}^{\alpha_{n}}$ (step E450-n), then calculates $g_{1}=g_{1,n}\cdot g_{1}$ (step E550-n) and then calculates $Q=e(g_{1},g_{2})$ (step E650-n). It then discloses $P_{pub}=(g,g_{1},g_{2},U,H_{1},Q)$ as IBE public key (step E750-n).

The bidding operation is now described. The bidding operation is similar to Example 7 shown in FIG. 28. In the bidding device 320, public parameters, the IBE public key $P_{pub}$ and the bid value v have been entered (step F160). In the bidding device 320, $ID_{i}$, an ID proper to each bidder, has been entered, where $1\leq i\leq a$.

The IBE encrypting means 302 of the bidding device 320 initially calculates $H_{1}(v)=(a_{1}, \ldots, a_{N})$ (step F260). The IBE encrypting means selects t from $Z_{q}$ at random (step F360). It then calculates $A=Q^{t}\cdot M$ (step F460), then calculates $B=g^{t}$ (step F560) and then calculates $C_{1}=u_{1,a_{1}}^{t}, \ldots, C_{N}=u_{N,a_{N}}^{t}$ (step F660).

The bid value knowledge proving means 323 then generates bid value knowledge proof data. With the present Example, knowledge proving concerning the bid value is by proving the knowledge concerning t. The bid value knowledge proving means 323 first calculates $h_{i}=H_{2}(A\|ID_{i})$ (step F760), and then calculates $proof_{i}=h_{i}^{t}$ (step F860). The bid value knowledge proving means 323 sends the generated bid value knowledge proof data proof_µl and encrypted bid data $X=(A,B,C_{1}, \ldots, C_{N})$ to the verification device 520 (step F960). The verification device 520 then causes the $proof_{i}$ and $X_{i}=(A\{i\},B_{i},C_{i,1}, \ldots, C_{i,N})$ of the bidders, received from the bidding device 320, to be stored in the memory that stores the encrypted bid data with bid value knowledge proof 522.

As to bid value knowledge proving, it is also possible to show the knowledge of t by zero knowledge proof, using the proving method shown in Non-Patent Document 4. In case of using the proving method shown in Non-Patent Document 4, $h_{i}=H_{2}(A\|ID_{i})$ is first calculated, and $r_{i}$ is then selected from $Z_{q}$ at random. Then, $\alpha_{i}=g^{r_{i}}$ and $s_{i}=r_{i}+h_{i}\cdot t$ are calculated in this order. Then, $proof_{i}=(\alpha_{i}, s_{i})$ is set.

The verification operation is now explained. The verification operation is similar to that shown in with reference to FIG. 29. In the verification device 520, the public parameters, IBE public key $P_{\{pub\}}$ and the encrypted bid data with bid value knowledge proving $(X_{\{i\}}, proof_{\{i\}})$ have been entered (step H160). The verification means 523 of the verification device 520 parses the encrypted bid data $X_{\{i\}}$ to $X_{\{i\}} = <A_{\{i\}}, B_{\{i\}}, C_{\{i,1\}}, \ldots, C_{\{i,n\}}>$ (step H260). That is, $X_{\{i\}}$ is decomposed into $A_{\{i\}}, B_{\{i\}}, C_{\{i,n\}}$. The verification means then calculates $V_{\{1,i\}} = e(B_{\{i\}}, H(Y_{\{i\}} \| ID_{\{i\}}))$ (step H360). It further calculates $V_{\{2,i\}} = e(g, proof_{\{i\}})$ (step H460).

The verification means 523 then verifies $V_{\{1,i\}} = V_{\{2,i\}}$ (step H560). Should this equation hold, the verification means verifies the bid value knowledge proving data to be correct and transmits $C_{\{i\}}$ to the bid opening device 400 (step H660). If the equation does not hold, the verification means verifies the data to be illicit and outputs that tenor (step H760). This verification operation is carried out for data of all bidders $X_{\{1\}}, proof_{\{1\}}), \ldots, (X_{\{a\}}, proof_{\{a\}})$.

If the proving method of Non-Patent Document 4 is used as the bid value knowledge proving, $(\alpha_{\{i\}}, s_{\{i\}})$ is entered to the verification device 520 as $proof_{\{i\}}$. By way of the verification operation for such case, $V_{\{1,i\}} = P^{\{s_{\{i\}}\}}$ is calculated, followed by $V_{\{2,i\}} = \alpha_{\{i\}} \cdot B_{\{i\}}^{(H_{\{2\}}(A_{\{i\}} \| ID_{\{i\}}))}$. It is then verified if $V_{\{1,i\}} = V_{\{2,i\}}$ holds. If the equation holds, the verification device assumes the bid value knowledge proof data is correct and accordingly sends $X_{\{i\}}$ to the bid opening device 400. If the equation does not hold, the verification device assumes that the data is not correct and outputs that tenor.

The bid opening operation is now described. The bid opening operation is similar to that of Example 6 shown in FIGS. 26 and 27. In the bid opening device 410, the public parameters, the IBE public key $P_{\{pub\}}$ and the encrypted bid data of all bidders $X_{\{1\}}, \ldots, X_{\{a\}}$ are entered (step G150). Initially, the winning bid value candidate decision means 403 of the bid opening device 410 decides on the winning bid value candidate $v_{\{i\}}$ (step G250). Here, the winning bid value candidate decision means 403 decides on the highest bid value $v_{\{t\}}$ as the winning bid value candidate, that is, it sets i=t.

The bid opening data generating means 414 then parses each j ($1 \leq j \leq a$) of the encrypted bid data X of all bidders in accordance with $X_{\{j\}} = <A_{\{j\}}, B_{\{j\}}, C_{\{j,1\}}, \ldots, C_{\{j,N\}}>$ (step C350). That is, it decomposes $X_{\{j\}}$ into $A_{\{j\}}, B_{\{j\}}, C_{\{j,1\}}, \ldots, C_{\{j,N\}}$. Then, it transmits the winning bid value candidate $v_{\{i\}}$ and $(B_{\{1\}}, C_{\{1,1\}}, \ldots, C_{\{1,N\}}), \ldots, (B\{a\}, C_{\{a,1\}}, \ldots, C_{\{a,N\}})$, as bid opening processing data to the partial bid opening devices 110-1 (step G450).

On receipt of the bid opening processing data, the partial bid opening device 110-1 commences the operation of combining the bid opening data (step G550). In the partial bid opening devices 110, public parameters and the IBE public key $P_{\{pub\}}$ have been entered (step G551), as shown in FIG. 27. On receipt of the bid opening processing data, the partial bid opening data generating means 115-1 of the partial bid opening device 110-1 first calculates $H_{\{1\}}(v_{\{i\}}) = (a_{\{1\}}, \ldots, a_{\{N\}})$ (step E552-1). The partial bid opening means then selects $r_{\{1,1\}}, r_{\{1,2\}}, \ldots, r_{\{1,N\}}$ from an element of $Z_{\{q\}}$ at random (step E553-1). Then, it calculates $d_{\{1,0\}} = S_{\{1\}} \cdot u_{\{1, a_{\{1\}}\}}^{\{r_{\{1,1\}}\}} \cdot \ldots \cdot u_{\{N, a_{\{N\}}\}}^{\{r_{\{1,N\}}\}}$ (step E554-1), then calculates $d_{\{1,1\}} = g^{\{r_{\{1,1\}}\}}, d_{\{1,2\}} = g^{\{r_{\{1,2\}}\}}, \ldots, d_{\{1,N\}} = g^{\{r_{\{1,N\}}\}}$ (step E555-1), and then calculates $U_{\{1\}} = e(C_{\{1,1\}}, d_{\{1,1\}}) \cdot \ldots \cdot e(C_{\{1,N\}}, d_{\{1,N\}})$. Then, it calculates $U_{\{2\}} = e(C_{\{2,1\}}, d_{\{1,1\}}) \cdot \ldots \cdot e(C_{\{2,N\}}, d_{\{1,N\}}), \ldots, U_{\{a\}}$, in the same way as it calculates $U_{\{1\}}$ (step E556-1). Then, it calculates $V_{\{1\}} = e(B_{\{1\}}, d_{\{1,0\}})$, and then calculates $V_{\{2\}} = e(B_{\{2\}}, d_{\{1,0\}}), \ldots, V_{\{a\}}$, in the same way as it calculates $V_{\{1\}}$ (step E557-1).

Then, it calculates $D_{\{v_{\{i\}}, 1, 1\}} = U_{\{1\}} \cdot V_{\{1\}}$, and calculates $D_{\{v_{\{i\}}, 2, 1\}} = U_{\{2\}} \div V_{\{2\}}, \ldots, D_{\{v_{\{i\}}, a, 1\}} = U_{\{a\}} \div V_{\{a\}}$ in the same way as it calculates $D_{\{v_{\{i\}}, 1, 1\}}$ (step E558-1). Since the partial bid opening device 110-1 is the first base point, the partial bid opening data generating means 115-1 sets $D_{\{v_{\{i\}}, 1\}} = D_{\{v_{\{i\}}, 1, 1\}}, \ldots, D_{\{v_{\{i\}}, a\}} = D_{\{v_{\{i\}}, a, 1\}}$ and transmits it as partial bid opening data #1 to the partial bid opening device 110-2 (step E55a-1). When transmitting bid opening data to the next base point, $v_{\{i\}}$ and $(B_{\{1\}}, C_{\{1,1\}}, \ldots, C_{\{1,N\}}), \ldots, (B_{\{a\}}, C_{\{a,1\}}, \ldots, C_{\{a,N\}})$ are transmitted included in the bid opening data.

The partial bid opening device 110-2 receives the partial bid opening data #1 and the bid opening processing data from the partial bid opening device 110-1 as the previous base point. Initially, the partial bid opening data generating means 115-2 of the partial bid opening device 110-2 initially calculates $H_{\{1\}}(v_{\{i\}}) = (a_{\{1\}}, \ldots, a_{\{N\}})$ (step E552-2). It then selects $r_{\{2,1\}}, r_{\{2,2\}}, \ldots, r_{\{2,N\}}$ from an element of $Z_{\{q\}}$ (step E553-2). It then calculates $d_{\{2,0\}} = S_{\{2\}} \cdot u_{\{1, a_{\{1\}}\}}^{\{r_{\{2,1\}}\}} \cdot \ldots \cdot u_{\{N, a_{\{N\}}\}}^{\{r_{\{2,N\}}\}}$ (step E554-2), then calculates $d_{\{2,1\}} = g^{\{r_{\{2,1\}}\}}, d_{\{2,2\}} = g^{\{r_{\{2,2\}}\}}, \ldots, d_{\{2,N\}} = g^{\{r_{\{2,N\}}\}}$ (step E555-2) and then calculates $U_{\{1\}} = e(C_{\{1,1\}}, d_{\{2,1\}}) \cdot \ldots \cdot e(C_{\{1,N\}}, d_{\{2,N\}})$. It then calculates $U_{\{2\}} = e(C_{\{2,1\}}, d_{\{2,1\}}) \cdot \ldots \cdot e(C_{\{2,N\}}, d_{\{2,N\}}), \ldots, U_{\{a\}}$ in the same way as it calculates $U_{\{1\}}$ (step E556-2). It then calculates $V_{\{1\}} = e(B_{\{1\}}, d_{\{2,0\}})$ and, in the same way as it calculates $V_{\{1\}}$, it calculates $V_{\{2\}} = e(B_{\{2\}}, d_{\{2,0\}}), \ldots, V_{\{a\}}$ (step E557-2).

Then, it calculates $D_{\{v_{\{i\}}, 1, 2\}} = U_{\{1\}} \div V_{\{1\}}$ and, in the same way as it calculates $D_{\{v_{\{i\}}, 1, 2\}}$, it also calculates $D_{\{v_{\{i\}}, 2, 2\}} = U_{\{2\}} \div V_{\{2\}}, \ldots, D_{\{v_{\{i\}}, a, 2\}} = U_{\{a\}} \div V_{\{a\}}$ (step E558-2). The partial public key generating means 114-2 then calculates $D_{\{v_{\{i\}}, 1\}} = D_{\{v_{\{i\}}, 1, 2\}} \cdot D_{\{v_{\{i\}}, 1\}}$, using the partial bid opening data #1 as received from the partial bid opening device 110-1 as the previous base point. The partial public key generating means calculates $D_{\{v_{\{i\}}, 2\}} = D_{\{v_{\{i\}}, 2, 2\}} D_{\{v_{\{i\}}, 2\}}, \ldots, D_{\{v_{\{i\}}, a\}} = D_{\{v_{\{i\}}, a, 2\}} \cdot D_{\{v_{\{i\}}, a\}}$ in the same way as it calculates $D_{\{v_{\{i\}}, 1\}}$ (step E559-2). It then transmits so calculated $D_{\{v_{\{i\}}, 1\}}, \ldots, D_{\{v_{\{i\}}, a\}}$ as bid opening data #2 to the partial bid opening device 110-3 (step E55a-2). The similar sequence of operations is continued up to the partial bid opening device 110-(n−1).

The partial bid opening device 110-n receives the bid opening data #(n−1) and the bid opening processing data from the partial bid opening device 110-(n−1) as the previous base point. The partial bid opening data generating means 115-n of the partial bid opening device 110-n initially calculates $H_{\{1\}}(v_{\{i\}}) = (a_{\{1\}}, \ldots, a_{\{N\}})$ (step E552-n). It then selects $r_{\{n,1\}}, r_{\{n,2\}}, \ldots, r_{\{n,N\}}$ from an element of $Z_{\{q\}}$ at random (step E553-n). It then calculates $d_{\{n,0\}} = S_{\{n\}} \cdot u_{\{1, a_{\{1\}}\}}^{\{r_{\{n,1\}}\}} \cdot \ldots \cdot u_{\{N, a_{\{N\}}\}}^{\{r_{\{n,N\}}\}}$ (step E554-n), then calculates $d_{\{n,1\}} = g^{\{r_{\{n,1\}}\}}, d_{\{n,2\}} = g^{\{r_{\{n,2\}}\}}, \ldots, d_{\{n,N\}} = g^{\{r_{\{n,N\}}\}}$ (step E555-n) and then calculates $U_{\{1\}} = e(C_{\{1,1\}}, d_{\{n,1\}}) \cdot \ldots \cdot e(C_{\{1,N\}}, d_{\{n,N\}})$. It then calculates $U_{\{2\}}=e(C_{\{2,1\}},d_{\{n,1\}})\cdots \cdot e(C_{\{2,N\}},d_{\{n,N\}})$, ..., $U_{\{a\}}$, in the same way as it calculates $U_{\{1\}}$ (step G546-1) (step E556-$n$). It then calculates $V_{\{1\}}=e(B_{\{1\}},d_{\{n,0\}})$ and, in the same way as it calculates $V_{\{1\}}$, it calculates $V_{\{2\}}=e(B_{\{2\}},d_{\{n,0\}})$, ..., $V_{\{a\}}$ (step E557-$n$).

It then calculates $D_{\{v_{\{i\}},1,n\}}=U_{\{1\}}\div V_{\{i\}}$ and, in the same way as it calculates $D_{\{v_{\{i\}},1,n\}}$, it calculates $D_{\{v_{\{i\}},2,n\}}=U_{\{2\}}\div V_{\{2\}}$, ..., $D_{\{v_{\{i\}},a,n\}}=U_{\{a\}}\div V_{\{a\}}$ (step E558-$n$). The partial public key generating means 114-$n$ calculates $D_{\{v_{\{i\}},1\}}=D_{\{v_{\{i\}},1,n\}}\cdot D_{\{v_{\{i\}},1\}}$, using the bid opening data #($n$−1) received from the partial bid opening device 110-($n$−1) as the previous base point. It also calculates $D_{\{v_{\{i\}},2\}}=D_{\{v_{\{i\}},2,n\}}\cdot D_{\{v_{\{i\}},2\}}$, ..., $D_{\{v_{\{i\}},a\}}=D_{\{v_{\{i\}},a,n\}}\cdot D_{\{v_{\{i\}},a\}}$, in the same way as it calculates $D_{\{v_{\{i\}},1\}}$ (step E559-$n$). Since the partial bid opening device 110-$n$ is the last base point, the partial public key generating means 114-$n$ sends $D_{\{v_{\{i\}},1\}}$, ..., $D_{\{v_{\{i\}},a\}}$ as the bid opening data to the bid opening device 410 (step E517-$n$).

On receipt of the bid opening data from the partial bid opening device 110-$n$, the bid opening data generating means 414 of the bid opening device 410 outputs the received bid opening data to the IBE decrypting means 405. The subsequent operation is similar to that of Example 5 and hence the description thereof is dispensed with.

Example 9

The operation of the present invention is now described with reference to Example 9. In this Example, the business style of an electronic bidding system of the present invention is described in connection with the first exemplary embodiment of the present invention. In the electronic bidding system, shown in FIG. 1, the partial bid opening system 100 is managed by an entrepreneur taking charge of part of the bid opening operation. Such entrepreneur is referred to below as a partial bid opening entrepreneur. Preferably, the partial bid opening devices 100-1 to 100-$n$ are managed by different partial bid opening entrepreneurs. The IBE public key generating device 200 is managed by, for example, an entrepreneur hosting the electronic bidding, referred to below as a bidding hosting entrepreneur. The bidding hosting entrepreneur may be a local public entity desirous to decide by bidding on an outside business organization that is to undertake a general public work by out-sourcing. The bid opening device 400 is managed by, for example, an entrepreneur supervising the bid opening operation (termed a bidding entrepreneur).

In this business style, the bidding hosting entrepreneur sets public parameters and publicly announces by, for example, advertising in a newspaper, the so set public parameters, with the purport that bidding shall be held. The bid opening entrepreneur then instructs the partial bid opening entrepreneurs to enter the public parameters in the partial bid opening devices 100 and the bid opening device 400. The resulting output IBE public key is disclosed. Each bidder desirous to tender a bid enters the public parameters, the IBE public key and a bid value and has the encrypted bid data sent to the bid opening device 400. The encrypted bid data of each bidder, sent in this manner, are received by the bid opening device 400, which opens the bids. The resulting winning bid is output and transmitted by the bid opening entrepreneur to the hosting entrepreneur.

The business style of the electronic bidding system according to the first exemplary embodiment has been specifically described in the foregoing. It should be noticed however that similar business styles may similarly be envisaged for the other exemplary embodiments. In the case of the electronic bidding system in accordance with the third or fourth exemplary embodiment, the verification device 520 is managed by an entrepreneur who verifies bid value knowledge proof (bid value knowledge proof verifying entrepreneur). The bid value knowledge proof verifying entrepreneur and the bid opening entrepreneur may be one and the same entrepreneur, if desired.

The present invention is not restricted to the above Examples which Examples may be suitably modified or adapted by those skilled in the art within the scope of the technical concept of the invention.

INDUSTRIAL APPLICABILITY

The present invention may preferably be applied to electronic bidding in which bidding is held over the communication network as the bid values are kept in secrecy.

The invention claimed is:

1. An electronic bidding system, comprising:
a plurality of partial bid opening computer devices, each partial bid opening computer device programmed to:
generate a partial secret key based on public parameters, the public parameters including information concerning the bidding and an ID-based encryption (IBE) system;
generate a partial public key based on the partial secret key; and
transmit the partial public key to an IBE public key generating computer device;
an IBE public key generating computer device programmed to:
receive a plurality of partial public keys from the plurality of partial bid opening computer devices;
generate an IBE public key by using the public parameters and the plurality of partial public keys as input and performing calculations based on preset conditions for the combination of the IBE public key, the preset conditions conforming to the cryptographic theory of the ID-based encryption system; and
transmit the generated IBE public key to a plurality of bidding computer device and a main bid opening computer device;
a plurality of bidding computer devices, each bidding computer device programmed to:
receive the IBE public key from the IBE public key generating computer device;
generate encrypted bid data using the ID-based encryption system by using the public parameters, the IBE public key, and a bid value to encrypt a preset message for bidding and to generate the encrypted bid data for a tendered bid in the ID-based encryption system; and
transmit the encrypted bid data to a main bid opening computer device; and
a main bid opening computer device programmed to:
receive a plurality of encrypted bid data from the plurality of bidding computer devices;
receive bid opening data from the plurality of partial bid opening computer devices;
decrypt the plurality of encrypted bid data by using the public parameters, the IBE public key, and the bid opening data; and select a winning bid value and an identity that corresponds to the tendered bid having the winning bid value based on the list of decrypted bid data.

2. The electronic bidding system according to claim 1, wherein the electronic bidding system executes calculations on said public parameters and the winning value of the tendered bid, based on a cryptographic theory of the ID-based encryption system comprising a value of the tendered bid as the ID, to generate an encryption key matched to the wining value of the tendered bid, wherein said public parameters comprise information disclosed in advance of bidding, the information including:

information indicating the bidding price;

said preset message for bidding; and encryption parameters indicating information used for encryption and decryption in the ID-based encryption system, wherein the electronic bidding system encrypts said preset message for bidding, using the encryption key, wherein the electronic bidding system executes a plurality of calculations to decrypt the encrypted data, the plurality of calculations including:

a calculation on secret information to be used for decryption, the secret information indicating a secret necessary to decrypt the encrypted data;

a calculation on said public parameters;

a calculation on the encrypted data of each tendered bid; and a calculation on a candidate value selected out of the tendered bids having the bidding price in accordance with a preset condition, based on the cryptographic theory of the ID-based encryption system having the candidate value as the ID, wherein, when the decrypted data obtained by the electronic bidding system coincides with said preset message for bidding, the electronic bidding system decides that the candidate value used for the decryption comprises a secret bid value.

3. The electronic bidding system according to claim 1, wherein the electronic bidding system matches the tendered bid to the encryption key, and then encrypts the encrypted data.

4. The electronic bidding system according to claim 1, wherein the electronic bidding system associates a value of each tendered bid with the encryption key.

5. The electronic bidding system according to claim 4, wherein the electronic bidding system generates the encryption key using a value of the tendered bid.

6. The electronic bidding system according to claim 1, wherein the electronic bidding system selects a candidate value from the tendered bids that satisfy a preset condition of the preset conditions.

7. The electronic bidding system according to claim 1, wherein, in said encrypting data using the ID-based encryption system, a sender generates the encryption key, using the ID, to a receiver.

8. The electronic bidding system according to claim 7, wherein in said encrypting data, a message is encrypted using the encryption key.

* * * * *